US012493813B1

(12) United States Patent
Chamberland et al.

(10) Patent No.: US 12,493,813 B1
(45) Date of Patent: Dec. 9, 2025

(54) DISTILLATION TILE LAYOUTS AND SCHEDULING WITHIN A MAGIC STATE FACTORY FOR MAGIC STATE DISTILLATION TECHNIQUES

(71) Applicant: Amazon Technologies, Inc., Seattle, WA (US)

(72) Inventors: Christopher Chamberland, Pasadena, CA (US); Prithviraj Prabhu, Los Angeles, CA (US)

(73) Assignee: Amazon Technologies, Inc., Seattle, WA (US)

( * ) Notice: Subject to any disclaimer, the term of this patent is extended or adjusted under 35 U.S.C. 154(b) by 533 days.

(21) Appl. No.: 18/064,906

(22) Filed: Dec. 12, 2022

Related U.S. Application Data

(60) Provisional application No. 63/381,246, filed on Oct. 27, 2022.

(51) Int. Cl.
*G06F 9/50* (2006.01)
*G06N 10/60* (2022.01)

(52) U.S. Cl.
CPC ........... *G06N 10/60* (2022.01); *G06F 9/5027* (2013.01)

(58) Field of Classification Search
CPC ...................................................... G06N 10/60
See application file for complete search history.

(56) References Cited

U.S. PATENT DOCUMENTS 11,308,252 B1 * 4/2022 Piveteau ................. G06F 30/39
11,580,436 B2 2/2023 Chamberland

| 2016/0191077 | A1 * | 6/2016 | Goto | ...................... G06N 10/70 |
| 2021/0365315 | A1 | 11/2021 | Reilly | |
| 2021/0374588 | A1 | 12/2021 | Gidney | |
| 2022/0253742 | A1 | 8/2022 | Zheng | |
| 2022/0414509 | A1 | 12/2022 | Haah | |

(Continued)

OTHER PUBLICATIONS

U.S. Appl. No. 17/545,895, filed Dec. 8, 2021, Christopher Chamberland, et al.

(Continued)

*Primary Examiner* — Mark D Featherstone
*Assistant Examiner* — Victor Perry
(74) *Attorney, Agent, or Firm* — Alexander A. Knapp; Kowert, Hood, Munyon, Rankin & Goetzel, P.C.

(57) ABSTRACT

Techniques for optimizing distillation tile layouts for distillation tiles in a magic state factory of a quantum computer and a scheduling of distilled magic state production (e.g., using temporally encoded lattice surgery based (TELS-based) magic state distillation) using said distillation tiles are disclosed. Customized designs for distillation tile layouts that reduce space-time costs when executing a given quantum algorithm are presented, wherein the designs may be customized based, at least in part, on a selected classical error-correcting code and distillation circuit, on a decision whether to perform parallelized TELS-based magic state distillation, etc. Production of distilled magic states may then be configured using a round robin scheduling design in order to minimize potential time in which a processing core of the quantum computer is waiting for another newly distilled magic state from the magic state factory to use for logical computation related to the given quantum algorithm being executed.

20 Claims, 25 Drawing Sheets

(56) References Cited

U.S. PATENT DOCUMENTS

2023/0071000 A1     3/2023   Higgott
2023/0394350 A1    12/2023   Bremner

OTHER PUBLICATIONS

U.S. Appl. No. 17/545,906, filed Dec. 8, 2021, Christopher Chamberland, et al.
U.S. Appl. No. 17/545,914, filed Dec. 8, 2021, Christopher Chamberland, et al.
U.S. Appl. No. 17/545,921, filed Dec. 8, 2021, Christopher Chamberland, et al.
U.S. Appl. No. 17/707,811, filed Mar. 29, 2022, Christopher Chamberland, et al.
U.S. Appl. No. 18/064,908, filed Dec. 12, 2022, Christopher Chamberland, et al.
U.S. Appl. No. 18/064,906, filed Dec. 12, 2022, Christopher Chamberland, et al.
A. G. Fowler, M. Mariantoni, J. M. Martinis, and A. N. Cleland, "Surface codes: Towards practical large-scale quantum computation," Phys. Rev. A 86, 032324 (2012 American Physical Society), pp. 1-48.
S. Bravyi and J. Haah, "Magic-state distillation with low overhead," Phys. Rev. A 86, 052329 (2012 American Physical Society), pp. 1-10.
C. Jones, "Low-overhead constructions for the fault-tolerant Toffoli gate," Phys. Rev. A 87, 022328 (2013); arXIV Preprint arXiv:1212.5069v1 pp. 1-5.
T. J. Yoder, R. Takagi, and I. L. Chuang, "Universal faul-ttolerant gates on concatenated stabilizer codes," Phys. Rev. X 6, 031039 (Published by the American Physical Society 2016), pp. 1-25.
C. Chamberland, T. Jochym-O'Connor, and R. Laflamme, "Overhead analysis of universal concatenated quantum codes," Phys. Rev. A 95, 022313 (2017); arXiv preprint: arXiv:1609.07497v3, pp. 1-25.
C. Chamberland and T. Jochym-O'Connor, "Error suppression via complementary gauge choices in Reed-Muller codes," Quantum Science and Technology 2, 035008 (2017), pp. 1-15.
M. E. Beverland, A. Kubica, and K. M. Svore, "Cost of universality: a comparative study of the overhead of state distillation and code switching with color codes," PRX Quantum 2, 020341 (Published by the American Physical Society 2021), pp. 1-46.
C. Chamberland and A. W. Cross, "Fault-tolerant magic state preparation with flag qubits," Quantum vol. 3, pp. 1-26 (2019).
D. Litinski, "A game of surface codes: Large-scale quantum computing with lattice surgery," Quantum vol. 3, 128 (2019), pp. 1-37.
D. Litinski, "Magic State Distillation: Not as Costly as You Think," Quantum 3, 205 (2019), pp. 1-22.
C. Chamberland and K. Noh, "Very low overhead fault-tolerant magic state preparation using redundant ancilla encoding and flag qubits", npj Quantum Information 6, 91 (2020), pp. 1-12.
C. Chamberland, K. Noh, P. Arrangoiz-Arriola, E. T. Campbell, C. T. Hann, J. Iverson, C. Bohdanowicz, S. T. Flammia, A. Keller, G. Refael, J. Preskill, L. Jiang, A. H. Safavi-Naeini, O. Painter, and F. G. Brandao, "Building a fault-tolerant quantum computer using concatenated cat codes," PRX Quantum 3, 010329 (Published by the American Physical Society 2022), pp. 1-117.
C. Chamberland and E. T. Campbell, "Universal quantum computing with twist-free and temporally encoded lattice surgery," PRX Quantum 3, 010331 (2022), pp. 1-25.
N. Shutty and C. Chamberland, "Decoding Merged Color-Surface Codes and Finding Fault-Tolerant Clifford Circuits Using Solvers for Satisfiability Modulo Theories," Phys. Rev. Applied 18, 014072 (Published by the American Physical Society 2022), pp. 1-25.
S. Bravyi and A. Kitaev, "Universal quantum computation with ideal clifford gates and noisy ancillas," Phys. Rev. A 71, 022316 (The American Physical Society 2005), pp. 1-14.
A. M. Meier, B. Eastin, and E. Knill, "Magic-state distillation with the four-qubit code," Quantum Info. Comput. 13, 195-209 (2013); arXiv preprint: arXiv:1204.4221v1, pp. 1-10.
H. Bombin and M. A. Martin-Delgado, "Topological quantum distillation," Phys. Rev. Lett. 97, 180501 (2006); arXiv preprint: arXiv:quant-ph/0605138v3, pp. 1-4.
E. T. Campbell and M. Howard, Magic state parity-checker with pre-distilled components, Quantum 2, 56 (2018); arXiv Preprint: arXiv:1709.02214v3, pp. 1-18.
A. G. Fowler and C. Gidney, "Low overhead quantum computation using lattice surgery," arXiv preprint arXiv:1808.06709 (2018), pp. 1-15.
D. Litinski and F. v. Oppen, "Lattice surgery with a twist: Simplifying Clifford gates of surface codes," Quantum 2, 62 (2018); arXiv Preprint: arXiv:1709.02318v2, pp. 1-16.
C. Chamberland and E. T. Campbell, "Circuit-level protocol and analysis for twist-based lattice surgery," Phys. Rev. Research 4, 023090 ( Published by the American Physical Society 2022), pp. 1-11.
H. Bombin, C. Dawson, R. V. Mishmash, N. Nickerson, F. Pastawski, and S. Roberts, Logical blocks for fault-tolerant topological quantum computation, arXiv preprint: arXiv:2112.12160 (2021), pp. 1-34.
C. Gidney, "Stability experiments: The overlooked dual of memory experiments," Quantum 6, 786 (2022), arXiv Preprint arXiv:2204.13834v2, pp. 1-12.
O. Higgott, T. C. Bohdanowicz, A. Kubica, S. T. Flammia, and E. T. Campbell, "Fragile boundaries of tailored surface codes and improved decoding of circuit-level noise," arXiv preprint , arXiv:2203.04948 (2022), pp. 1-17.
D. Deutsch, "Quantum computational networks," Proceedings of the Royal Society of London. Series A, Mathematical and Physical Sciences 425, 73-90 (1989).
A. Barenco, C. H. Bennett, R. Cleve, D. P. DiVincenzo, N. Margolus, P. Shor, T. Sleator, J. A. Smolin, and H. Weinfurter, "Elementary gates for quantum computation," Phys. Rev. A 52, 3457 (1995); arXiv preprint arXiv:quant-ph/9503016, pp. 1-31.
E. Farhi, J. Goldstone, S. Gutmann, J. Lapan, A. Lundgren, and D. Preda, "A Quantum Adiabatic Evolution Algorithm Applied to Random Instances of an NP-Complete Problem," Science 292, 472 (2001), arXiv preprint arXiv:quant-ph/0104129, pp. 1-15.
D. Gottesman and I. L. Chuang, Quantum Teleportation is a Universal Computational Primitive, Nature (London) 402, 390 (1999), arXiv preprint arXiv:quant-ph/9908010, pp. 1-6.
P. Aliferis and D. W. Leung, "Computation by measurements: a unifying picture," Phys. Rev. A 70, 062314, ( The American Physical Society 2004), pp. 1-11.
H. J. Briegel, D. E. Browne, W. Dur, R. Raussendorf, and M. Van den Nest, "Measurement-based quantum computation," Nature Physics 5, 19 (2009), arXiv preprint arXiv:0910.1116v2, pp. 1-20.
S. Bartolucci, p. Birchall, H. Bombin, H. Cable, C. Dawson, M. Gimeno-Segovia, E. Johnston, K. Kieling, N. Nickerson, M. Pant, F. Pastawski, T. Rudolph, and C. Sparrow, Fusion-based quantum computation, arXiv preprint 10.48550/arXiv.2101.09310 (2021), pp. 1-25.
S. Bravyi, G. Smith, and J. A. Smolin, "Trading Classical and Quantum Computational Resources," Phys. Rev. X 6, 021043 (2016), arXiv preprint arXiv:1506.01396v1, pp. 1-14.
I. H. Kim, Y.-H. Liu, S. Pallister, W. Pol, S. Roberts, and E. Lee, "Fault-tolerant resource estimate for quantum chemical simulations: Case study on Li-ion battery electrolyte molecules," Phys. Rev. Research 4, 023019 (2022), arXiv preprint arXiv:2104.10653v1, pp. 1-26.
A. J. Landahl and C. Ryan-Anderson, "Quantum computing by color-code lattice surgery," arXiv preprint (2014), arXiv:1407.5103.
C. Horsman, A. G. Fowler, S. Devitt, and R. V. Meter, "Surface code quantum computing by lattice surgery," New Journal of Physics 14, 123011 ( IOP Publishing Ltd and Deutsche Physikalische Gesellschaft 2012), pp. 1-28.
M. G. Gowda and p. K. Sarvepalli, "Color codes with twists: Construction and universal-gate-set implementation," Phys. Rev. A 104, 012603 (2021), arXiv preprint arXiv:2104.03669 , pp. 1-22.

(56) References Cited

OTHER PUBLICATIONS

D. Herr, A. Paler, S. J. Devitt, and F. Nori, "Time versus Hardware: Reducing Qubit Counts with a (Surface Code) Data Bus," arXiv preprint (2019), arXiv:1902.08117, pp. 1-24.

J. Haah and M. B. Hastings, "Codes and protocols for distilling T, controlled-S, and Toffoli gates," Quantum 2, 71 (2018), 1709.02832, pp. 1-29.

S. Aaronson and D. Gottesman, "Improved simulation of stabilizer circuits," Phys. Rev. A 70, 052328 (2004), pp. 1-15.

C. Vuillot, L. Lao, B. Criger, C. G. Almud'ever, K. Bertels, and B. M. Terhal, "Code deformation and lattice surgery are gauge fixing," New Journal of Physics 21, 033028 (2019), pp. 1-21.

S. Singh, A. S. Darmawan, B. J. Brown, and S. Puri, "High-fidelity magic-state preparation with a biased-noise architecture," Phys. Rev. A 105, 052410 (2022 American Physical Society), pp. 1-9.

S. Bravyi and A. Kitaev, "Universal quantum computation with ideal Clifford gates and noisy ancillas," Phys. Rev. A 71, 022316 (2005 The American Physical Society), pp. 1-14.

J. Haah, M. B. Hastings, D. Poulin, and D. Wecker, "Magic state distillation with low space overhead and optimal asymptotic input count," Quantum 1, 31 (2017), pp. 1-42.

L. Skoric, D. E. Browne, K. M. Barnes, N. I. Gillespie, and E. T. Campbell, "Parallel window decoding enables scalable fault tolerant quantum computation," arXiv eprints, arXiv:2209.08552 (2022), pp. 1-12.

C. Chamberland, L. Goncalves, P. Sivarajah, E. Peterson, and S. Grimberg, "Techniques for combining fast local decoders with global decoders under circuit-level noise," arXiv e-prints, arXiv:2208.01178 (2022), pp. 1-29.

S. C. Smith, B. J. Brown, and S. D. Bartlett, "A local pre-decoder to reduce the bandwidth and latency of quantum error correction," arXiv e-prints, arXiv:2208.04660 (2022), pp. 1-16.

X. Tan, F. Zhang, R. Chao, Y. Shi, and J. Chen, "Scalable surface code decoders with parallelization in time," arXiv e-prints, arXiv:2209.09219 (2022), pp. 1-24.

H. Bombin, C. Dawson, R. V. Mishmash, N. Nickerson, F. Pastawski, and S. Roberts, "Logical blocks for fault-tolerant topological quantum computation," arXiv e-prints, arXiv:2112.12160 (2021), pp. 1-34.

\* cited by examiner

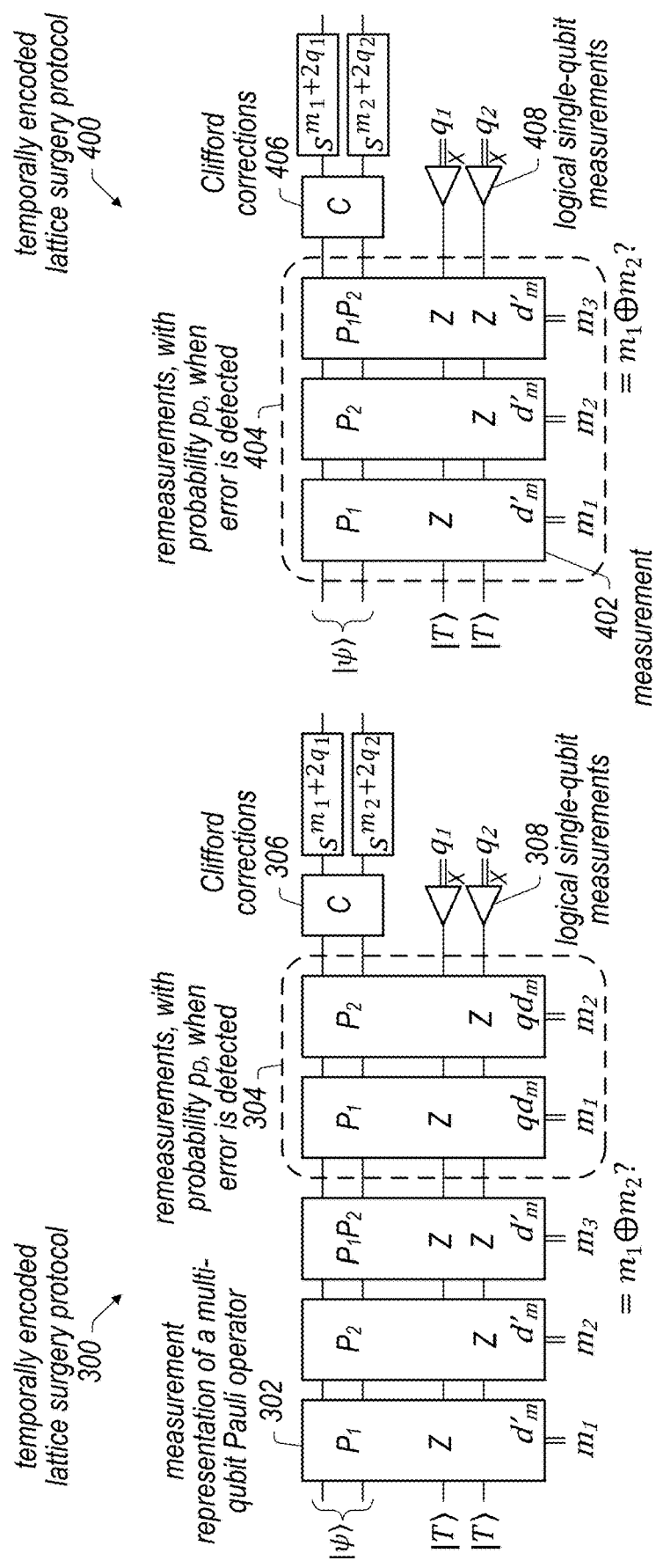

non-Clifford measurement gadget 820

Clifford measurement gadget 840

Non-Clifford measurement gadget 860

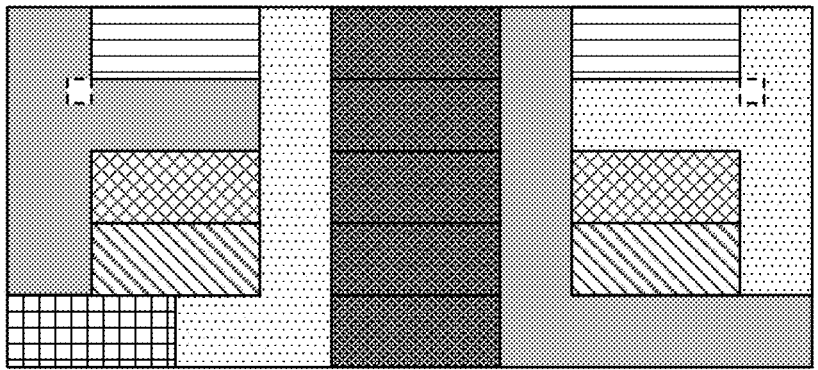
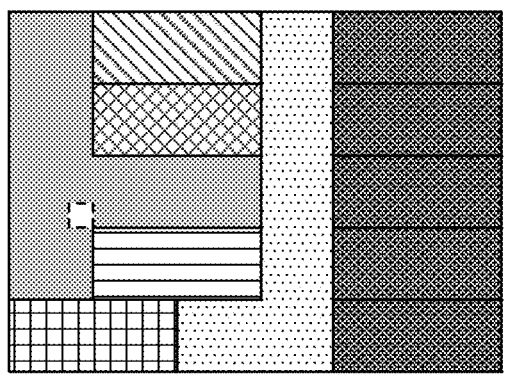
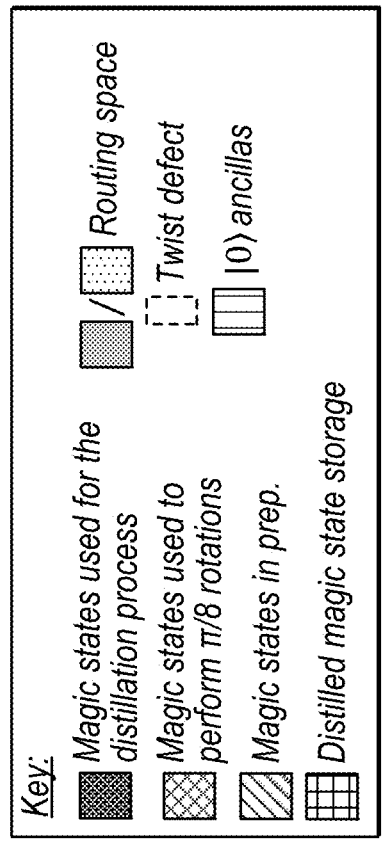
FIG. 10A
FIG. 10B

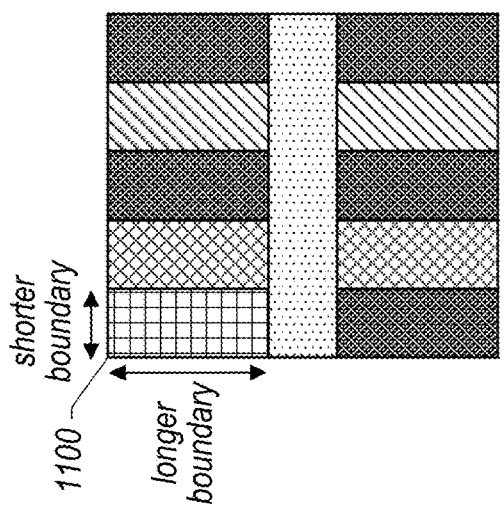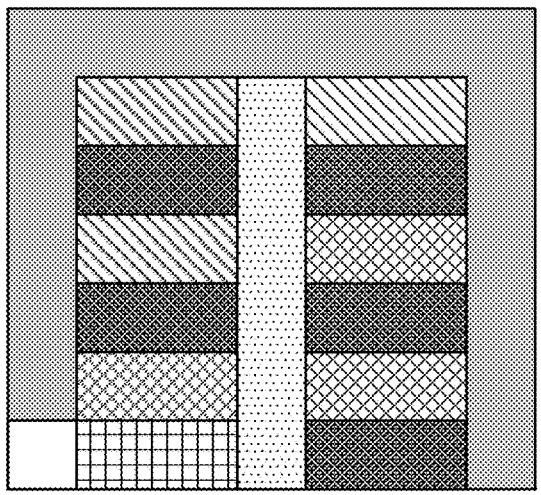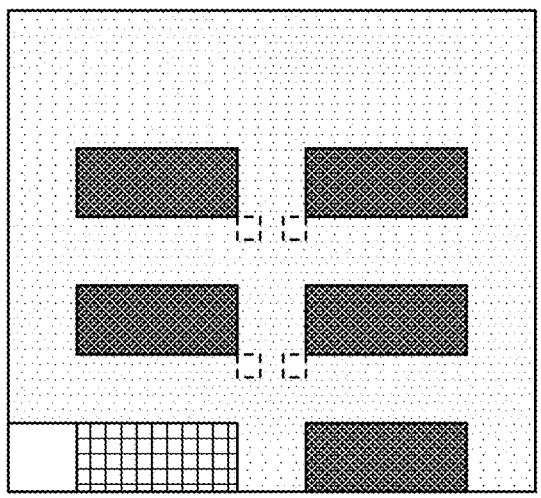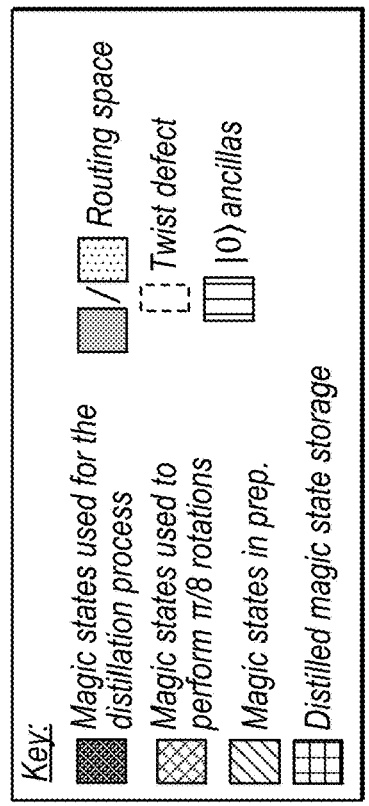
FIG. 11A  FIG. 11B  FIG. 11C

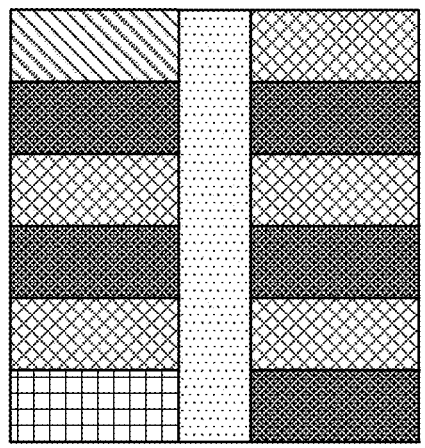
FIG. 12A
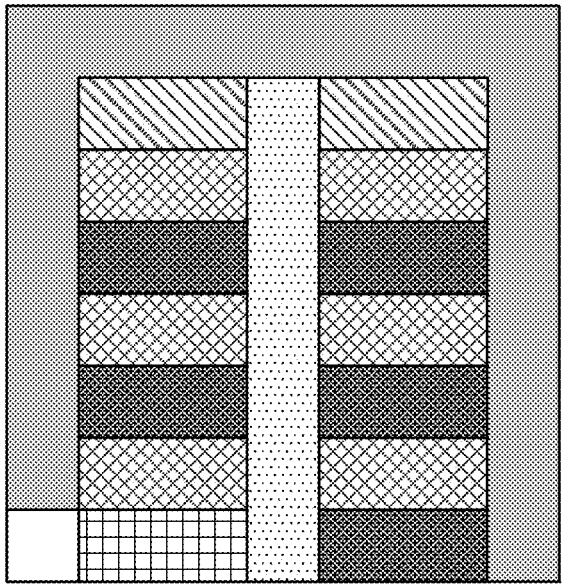
FIG. 12B
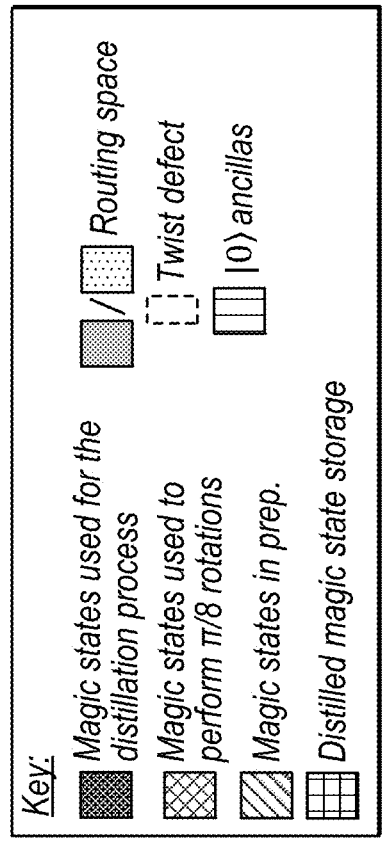

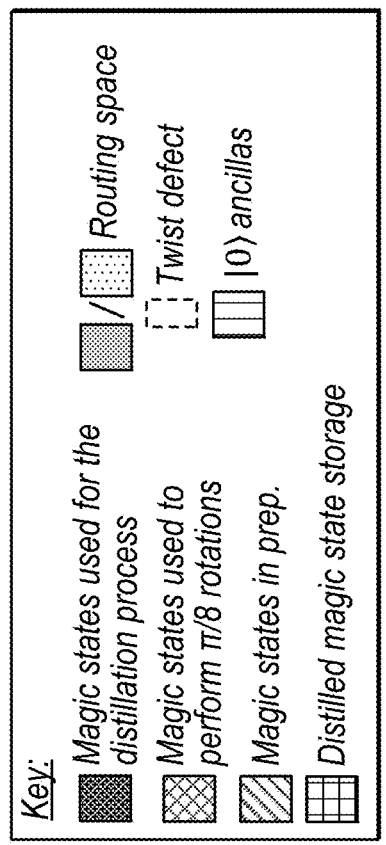
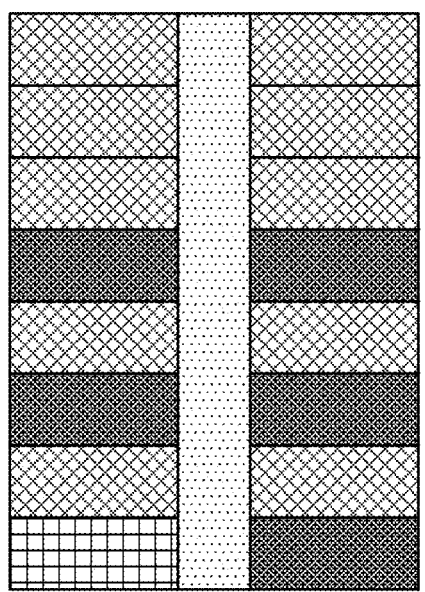
FIG. 13A
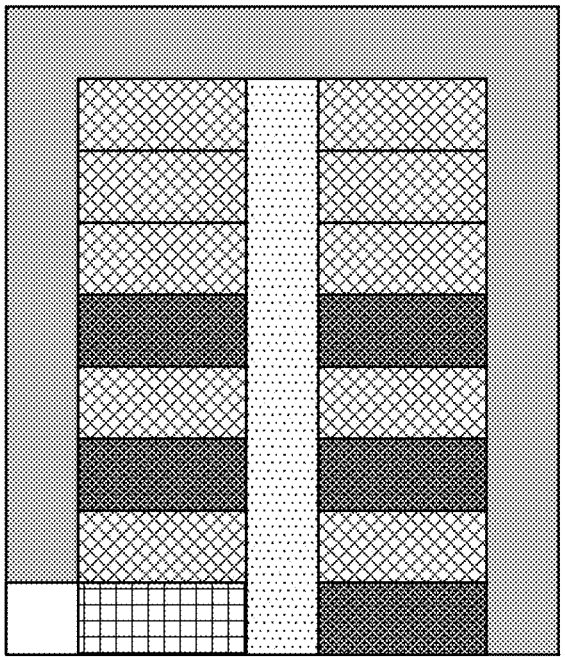
FIG. 13B

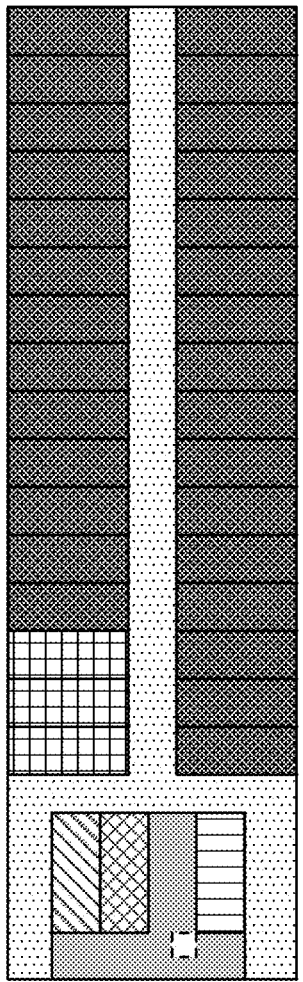
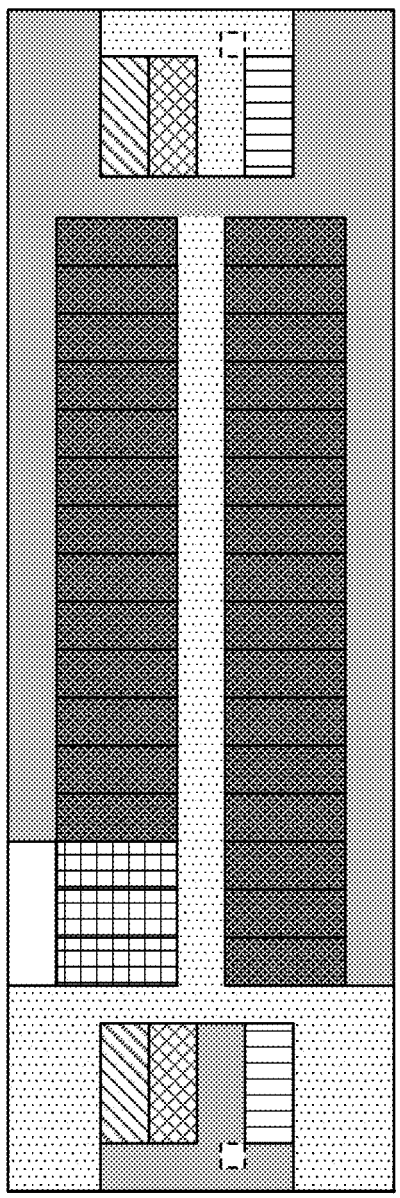
FIG. 14A
FIG. 14B

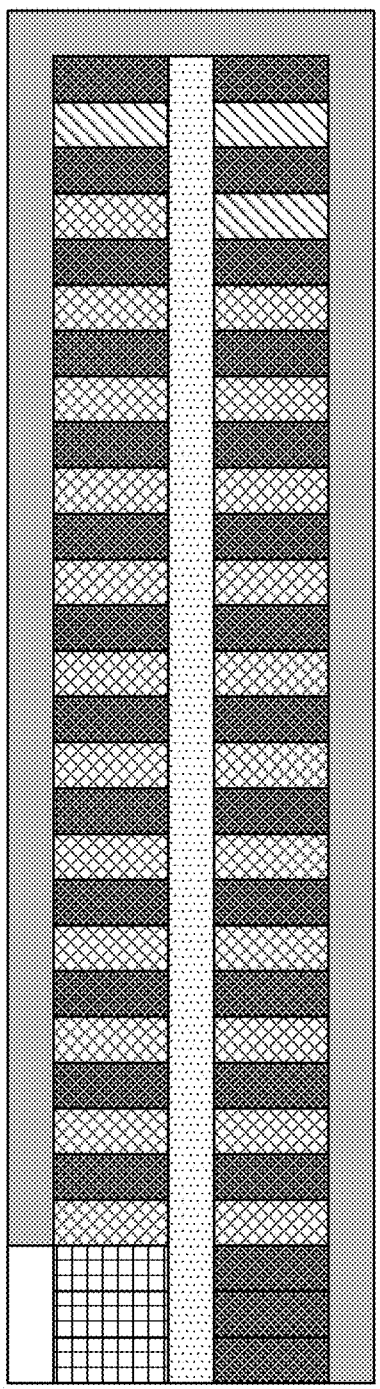
FIG. 15
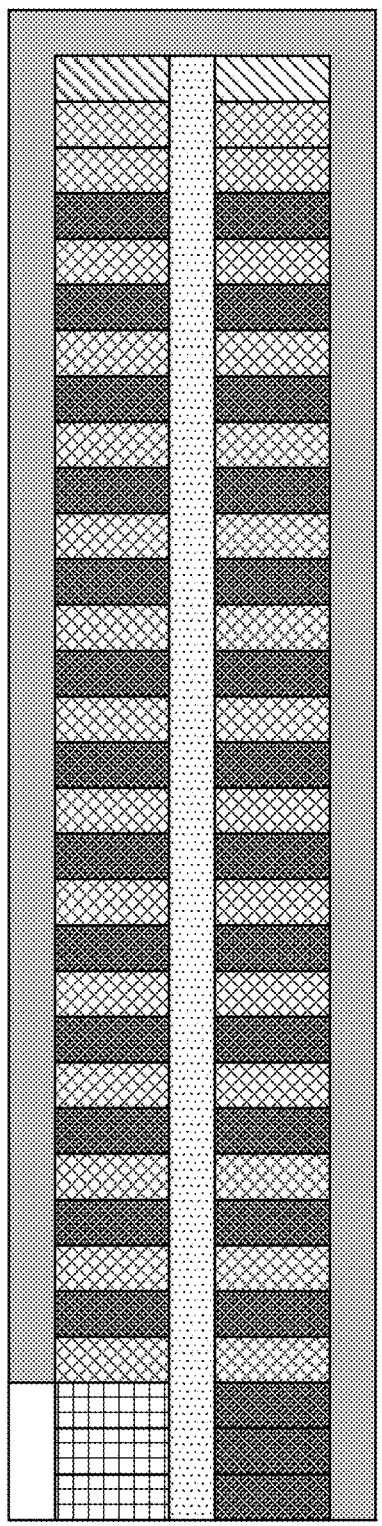
FIG. 16
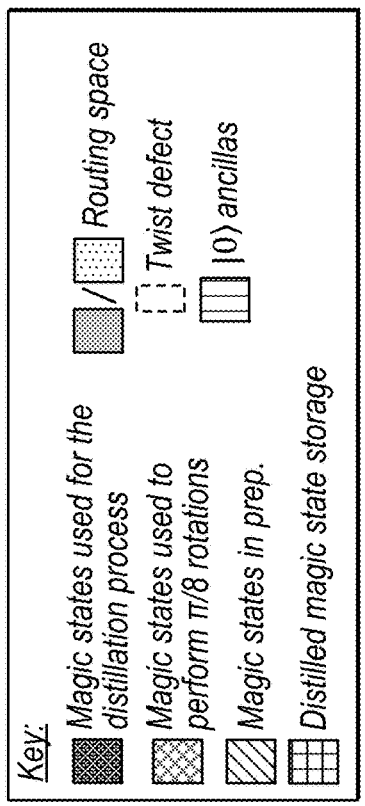

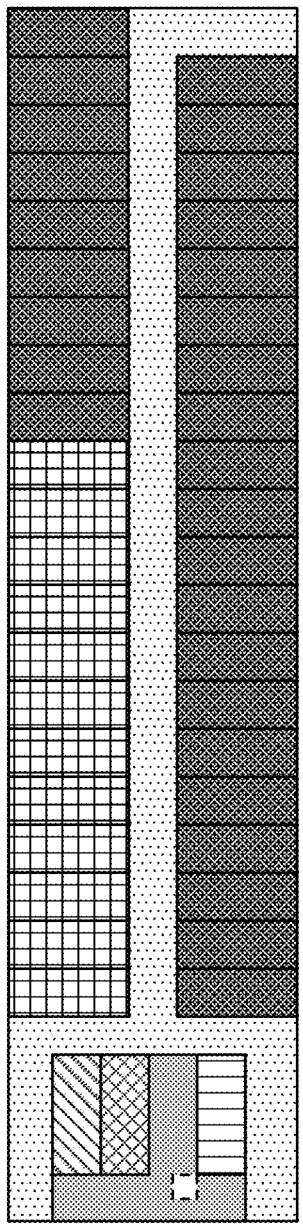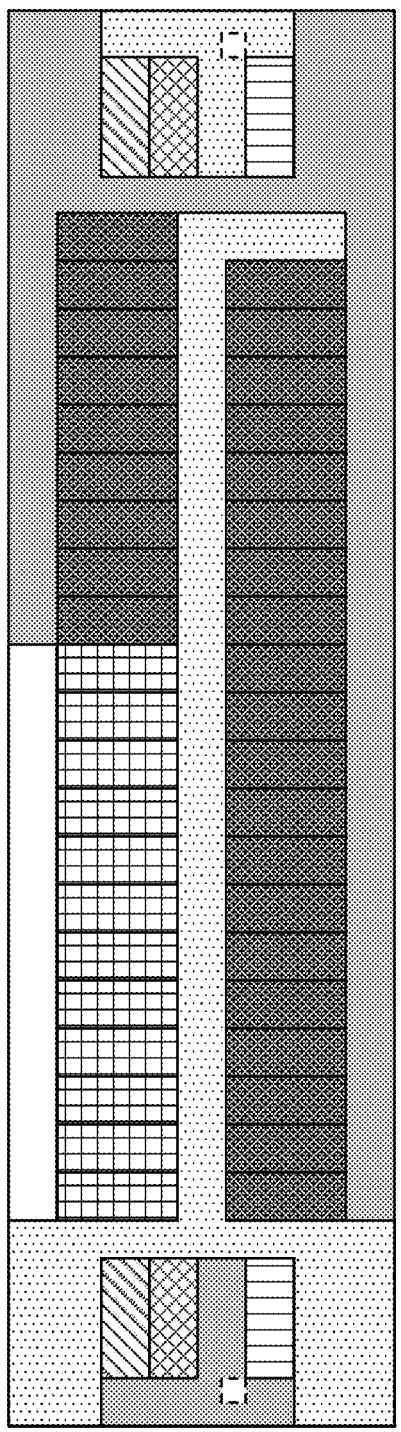
FIG. 17A
FIG. 17B

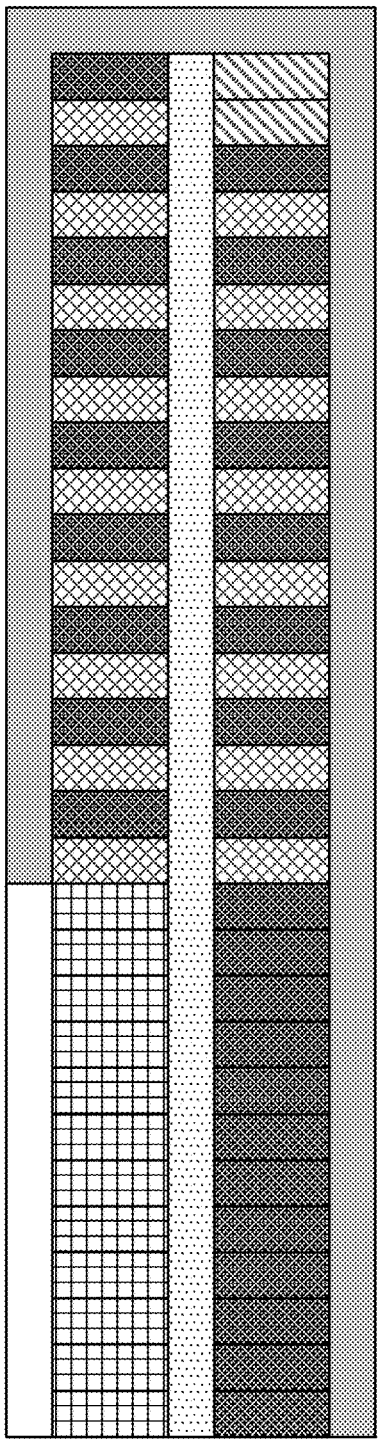
FIG. 18
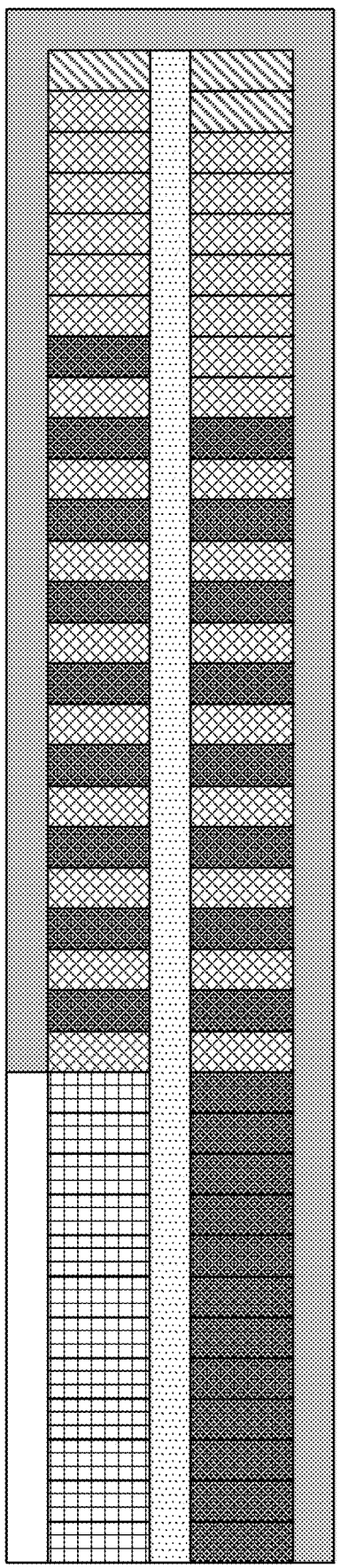
FIG. 19
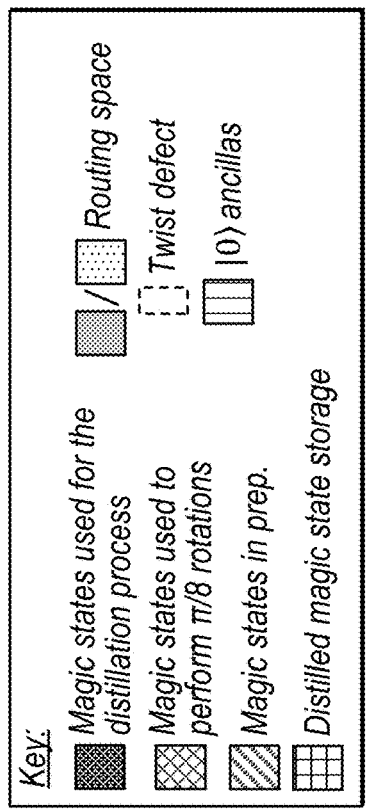

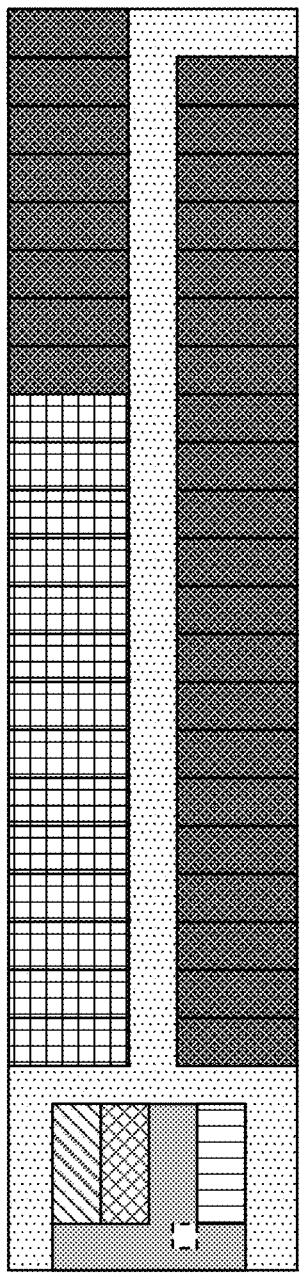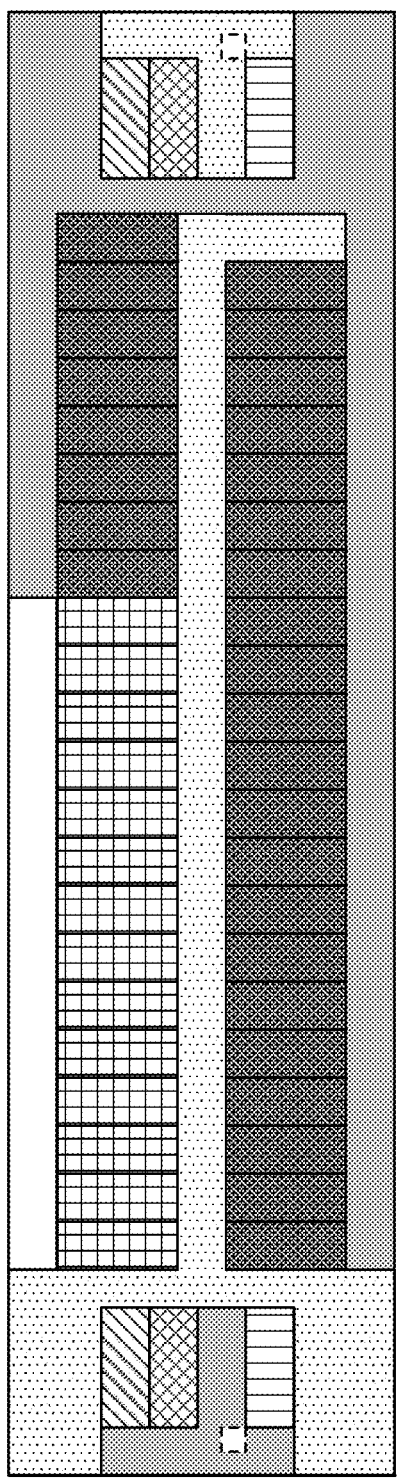
FIG. 20A
FIG. 20B

DISTILLATION TILE LAYOUTS AND SCHEDULING WITHIN A MAGIC STATE FACTORY FOR MAGIC STATE DISTILLATION TECHNIQUES

RELATED APPLICATION

This application claims benefit of priority to U.S. Provisional Application Ser. No. 63/381,246, entitled "Temporally encoded lattice surgery protocols for hybrid error detection and correction and for applications to magic state distillation techniques," filed Oct. 27, 2022, and which is incorporated herein by reference in its entirety.

Quantum computing utilizes the laws of quantum physics to process information. Quantum physics is a theory that describes the behavior of reality at the fundamental level. It is currently the only physical theory that is capable of consistently predicting the behavior of microscopic quantum objects like photons, molecules, atoms, and electrons.

A quantum computer is a device that utilizes quantum mechanics to allow one to write, store, process and read out information encoded in quantum states, e.g., the states of quantum objects. A quantum object is a physical object that behaves according to the laws of quantum physics. The state of a physical object is a description of the object at a given time.

In quantum mechanics, the state of a two-level quantum system, or simply a qubit, is a list of two complex numbers whose squares sum up to one. Each of the two numbers is called an amplitude, or quasi-probability. The square of an amplitude gives a potentially negative probability. Hence, each of the two numbers correspond to the square root that event zero and event one will happen, respectively. A fundamental and counterintuitive difference between a probabilistic bit (e.g., a traditional zero or one bit) and the qubit is that a probabilistic bit represents a lack of information about a two-level classical system, while a qubit contains maximal information about a two-level quantum system.

Quantum computers are based on such quantum bits (qubits), which may experience the phenomena of "superposition" and "entanglement." Superposition allows a quantum system to be in multiple states at the same time. For example, whereas a classical computer is based on bits that are either zero or one, a qubit may be both zero and one at the same time, with different probabilities assigned to zero and one. Entanglement is a strong correlation between quantum particles, such that the quantum particles are inextricably linked in unison even if separated by great distances.

A quantum algorithm is a reversible transformation acting on qubits in a desired and controlled way, followed by a measurement on one or multiple qubits. For example, if a system has two qubits, a transformation may modify four numbers; with three qubits this becomes eight numbers, and so on. As such, a quantum algorithm acts on a list of numbers exponentially large as dictated by the number of qubits. To implement a transform, the transform may be decomposed into small operations acting on a single qubit, or a set of qubits, as an example. Such small operations may be called quantum gates and the arrangement of the gates to implement a transformation may form a quantum circuit.

There are different types of qubits that may be used in quantum computers, each having different advantages and disadvantages. For example, some quantum computers may include qubits built from superconductors, trapped ions, semiconductors, photonics, etc. Each may experience different levels of interference, errors and decoherence. Also, some may be more useful for generating particular types of quantum circuits or quantum algorithms, while others may be more useful for generating other types of quantum circuits or quantum algorithms.

For some types of quantum computations, such as fault tolerant computation of large-scale quantum algorithms, overhead costs for performing such quantum computations may be high. For example, for types of quantum gates that are not naturally fault tolerant, the quantum gates may be encoded in error correcting code, such as a surface code. However, this may add to the overhead number of qubits required to implement the large-scale quantum algorithms. Also, performing successive quantum gates, measurement of quantum circuits, etc. may introduce probabilities of errors in the quantum circuits and/or measured results of the quantum circuits. In some situations, error rates for a quantum algorithm may be reduced by increasing a number of times measurements are repeated when executing the quantum algorithm. However, this may increase a run-time for executing the quantum algorithm. Thus, overhead may be evaluated as a space-time cost that takes into account both run-times and qubit costs to achieve results having at least a threshold level of certainty (e.g., probability of error less than a threshold amount).

BRIEF DESCRIPTION OF THE DRAWINGS

FIG. 3 illustrates a previously used method of using a temporally encoded lattice surgery (TELS) protocol solely for error detection of measurement results of a given series of multi-qubit Pauli measurements as shown in the figure, according to some embodiments.

FIG. 4 illustrates a method of using a hybrid error detection and correction temporally encoded lattice surgery (TELS) protocol for measurement results of a given series of multi-qubit Pauli measurements performed on a size-2 parallelizable Pauli set, as shown in the figure, according to some embodiments.

FIG. 10A illustrates an example of a distillation tile located within a magic state factory that may be used for unencoded (e.g., without the use of a TELS protocol) lattice-surgery-based magic state distillation (e.g., a 15-to-1 distillation), according to some embodiments.

FIG. 10B illustrates an example of a distillation tile located within a magic state factory that may be used for parallelized, unencoded (e.g., without the use of a TELS protocol) lattice-surgery-based magic state distillation (e.g., a 15-to-1 distillation), according to some embodiments.

FIG. 11A illustrates an example of a distillation tile located within a magic state factory that may be used for TELS-based magic state distillation (e.g., a 15-to-1 distillation) implemented with a first type of classical error-correcting code, according to some embodiments.

FIG. 11B illustrates an example of a distillation tile located within a magic state factory that may be used for parallelized, TELS-based magic state distillation (e.g., a 15-to-1 distillation) implemented with the first type of classical error-correcting code, discussed with regard to FIG. 11A, according to some embodiments.

FIG. 11C illustrates an example of how a layout of a distillation tile shown in FIG. 11B may be arranged for a second stage of the parallelized, TELS-based magic state distillation process discussed with regard to FIG. 11B, according to some embodiments.

FIG. 12A illustrates an example of a distillation tile located within a magic state factory that may be used for TELS-based magic state distillation (e.g., a 15-to-1 distillation) implemented with a second type of classical error-correcting code, according to some embodiments.

FIG. 12B illustrates an example of a distillation tile located within a magic state factory that may be used for parallelized, TELS-based magic state distillation (e.g., a 15-to-1 distillation) implemented with the second type of classical error-correcting code, discussed with regard to FIG. 12A, according to some embodiments.

FIG. 13A illustrates an example of a distillation tile located within a magic state factory that may be used for TELS-based magic state distillation (e.g., a 15-to-1 distillation) implemented with a third type of classical error-correcting code, according to some embodiments.

FIG. 13B illustrates an example of a distillation tile located within a magic state factory that may be used for parallelized, TELS-based magic state distillation (e.g., a 15-to-1 distillation) implemented with the third type of classical error-correcting code, discussed with regard to FIG. 13A, according to some embodiments.

FIG. 14A illustrates an example of a distillation tile located within a magic state factory that may be used for unencoded (e.g., without the use of a TELS protocol) lattice-surgery-based magic state distillation (e.g., a 125-to-3 distillation), according to some embodiments.

FIG. 14B illustrates an example of a distillation tile located within a magic state factory that may be used for parallelized, unencoded (e.g., without the use of a TELS protocol) lattice-surgery-based magic state distillation (e.g., a 125-to-3 distillation), according to some embodiments.

FIG. 15 illustrates a first example of a distillation tile located within a magic state factory that may be used for parallelized, TELS-based magic state distillation (e.g., a 125-to-3 distillation) implemented with a first type of classical error-correcting code, according to some embodiments.

FIG. 16 illustrates a second example of a distillation tile located within a magic state factory that may be used for parallelized, TELS-based magic state distillation (e.g., a 125-to-3 distillation) implemented with a second type of classical error-correcting code, according to some embodiments.

FIG. 17A illustrates an example of a distillation tile located within a magic state factory that may be used for unencoded (e.g., without the use of a TELS protocol) lattice-surgery-based magic state distillation (e.g., a 116-to-12 distillation), according to some embodiments.

FIG. 17B illustrates an example of a distillation tile located within a magic state factory that may be used for parallelized, unencoded (e.g., without the use of a TELS protocol) lattice-surgery-based magic state distillation (e.g., a 116-to-12 distillation), according to some embodiments.

FIG. 18 illustrates a first example of a distillation tile located within a magic state factory that may be used for parallelized, TELS-based magic state distillation (e.g., a 116-to-12 distillation) implemented with a first type of classical error-correcting code, according to some embodiments.

FIG. 19 illustrates a second example of a distillation tile located within a magic state factory that may be used for parallelized, TELS-based magic state distillation (e.g., a 116-to-12 distillation) implemented with a second type of classical error-correcting code, according to some embodiments.

FIG. 20A illustrates an example of a distillation tile located within a magic state factory that may be used for unencoded (e.g., without the use of a TELS protocol) lattice-surgery-based magic state distillation (e.g., a 114-to-14 distillation), according to some embodiments.

FIG. 20B illustrates an example of a distillation tile located within a magic state factory that may be used for parallelized, unencoded (e.g., without the use of a TELS protocol) lattice-surgery-based magic state distillation (e.g., a 114-to-14 distillation), according to some embodiments.

Figure 1:
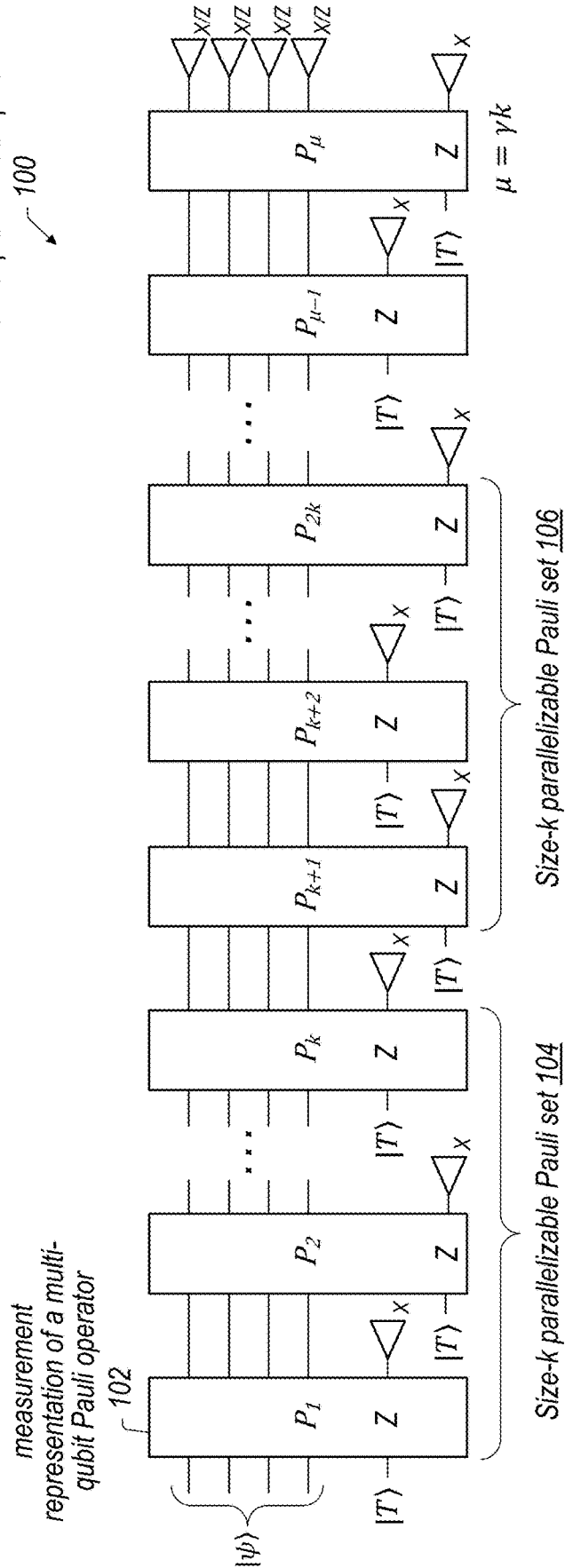
FIG. 1 illustrates an example of a parallelizable Pauli set that may be used to perform Pauli-based computation for a given quantum algorithm, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to. When used in the claims, the term "or" is used as an inclusive or and not as an exclusive or. For example, the phrase "at least one of x, y, or z" means any one of x, y, and z, as well as any combination thereof.

DETAILED DESCRIPTION

The present disclosure relates to methods and apparatus for temporally encoded lattice surgery protocols. In some embodiments, universal fault-tolerant quantum computers may be required in order to implement large scale quantum algorithms. However, both space and time costs due to an implementation of corresponding fault-tolerant quantum error correction protocols may be limiting factors in the overall success of such universal fault-tolerant quantum computers. Furthermore, for universal fault-tolerant quantum computers in which qubits are encoded in topological quantum error correcting codes, lattice surgery techniques paired with magic state distillation protocols provide efficient ways to implement universal quantum gate sets while being compatible with locality requirements of two-dimensional planar hardware architectures. However, lattice surgery protocols may also cause additional space costs to be incurred arising from a need to protect against space-like failures (e.g., wherein a given space-like distance of a given topological quantum code is needed to protect qubits of the code from errors), in combination with other time costs arising from a need to protect against time-like failures (e.g., time-like failures which may result in logical parity measurement failures when comparing lattice surgery measurement results to a parity check matrix of a classical error-correcting code). In addition, a time-like distance of a lattice surgery protocol may be defined by a number of syndrome measurement rounds which may be performed during measurement of a given multi-qubit Pauli operator within a given quantum algorithm, and a larger time-like distance may result in a slowdown of a given quantum algorithm's runtime.

In some embodiments, temporally encoded lattice surgery (TELS) protocols may be used to mitigate space-time costs, such as those introduced above, and reduce a required time-like distance (e.g., a number of rounds of syndrome measurements) of such lattice surgery protocols, thus reducing runtimes of corresponding quantum algorithms. A quantum algorithm may be written as a sequence of multi-qubit Pauli measurements which respectively perform multi-qubit non-Clifford gates, and the multi-qubit Pauli measurements may be ordered such that there are subsequences of commuting multi-qubit Pauli operators acting on data qubits, according to some embodiments. Furthermore, a given multi-qubit non-Clifford gate may resemble a corresponding multi-qubit Pauli measurement executed with an ancillary, high-fidelity $|T\rangle$-type magic state. Such high-fidelity $|T\rangle$-type magic states may also be referred to as resource magic states, defined by $|T\rangle=|0\rangle+e^{i\pi/4}|1\rangle$. A person having ordinary skill in the art should understand that while (T)-type magic states may be referred to herein for the sake of providing example embodiments using magic states, other types of magic states may similarly be used, and that description herein pertaining to $|T\rangle$-type magic states should not be mistaken as having a restrictive sense.

A temporally encoded lattice surgery protocol, therefore, may resemble first dividing multi-qubit Pauli measurements, defined as $\{P_1, P_2, \ldots, P_\mu\}$, that are to be used to execute a given quantum algorithm into subsequences of parallelizable Pauli sets of an average size k, wherein multi-qubit Pauli operators in a given parallelizable Pauli set commute (e.g., $P_{[t,t+k]}=\{P_t, P_t, \ldots, P_{t+k}\}$), and any additional Clifford corrections (e.g., due to the use of multi-qubit non-Clifford gates) may be conjugated to the end of a given subsequence of the corresponding parallelizable Pauli set.

In some embodiments, a temporally encoded lattice surgery protocol may then measure a larger, "over-complete" set of multi-qubit Pauli operators for a given parallelizable Pauli set, wherein respective multi-qubit Pauli operators in the over-complete set are products of multi-qubit Pauli operators from the original parallelizable Pauli set of size k. For example, in a parallelizable Pauli set defined as $\{P_1, P_2\}$, an over-complete set may resemble $\{P_1, P_2, P_1P_2\}$, in which multi-qubit Pauli operators respectively corresponding to $P_1$, $P_2$, and $P_1P_2$ are measured. In some embodiments, measurements of products of multi-qubit Pauli operators from the original parallelizable Pauli set (e.g., $P_1P_2$) may be referred to as making redundant measurements. A person having ordinary skill in the art should understand that various combinations of redundant measurements may be used according to a given parallelizable Pauli set. For example, redundant measurements may comprise one or more measurements of products of multi-qubit Pauli operators, one or more remeasurements of a Pauli operator of the original parallelizable Pauli set, etc. Multi-qubit Pauli operators in the over-complete set may be associated with respective codewords of a classical [n, k, d] error correcting code, wherein n bits of the given classical error-correcting code with distance parameter d of said code are represented in the measurement results. In some embodiments, applying a parity check matrix of the classical error-correcting code to such measurement outcomes enables a detection of time-like measurement failures. As the time-like measurement failures may be detected (e.g., through use of the over-complete set and redundant measurements, as described above), this allows for fewer rounds of syndrome measurements for each multi-qubit Pauli operator to need to be performed, due to extra protection offered by the overlaying classical error-correcting code.

This written description continues with a general description of temporally encoded lattice surgery protocols that reduce space-time costs for fault-tolerant quantum error correction protocols during performance of quantum algorithms using a quantum computer. In some embodiments, a hybrid error detection and correction scheme for a temporally encoded lattice surgery protocol may be used to reduce runtimes of quantum algorithms in comparison to a scheme that only uses error detection or only uses error correction. In other embodiments, one or more temporally encoded lattice surgery protocols may be applied to a magic state distillation process (also referred to herein as a TELS-based magic state distillation process) such that space-time costs may be reduced during generation of distilled magic states. Space-time costs of such TELS-based magic state distillation processes may be further reduced via optimization of distillation tile layouts and scheduling of the distilled magic state(s) production within distillation tiles implemented in magic state factories of a given quantum computer. A description of an example computing system upon which the various components, modules, systems, devices, and/or temporally encoded lattice surgery protocols may be implemented is then provided. Various examples are provided throughout the specification. A person having ordinary skill in the art should also understand that the previous and following description of temporally encoded lattice surgery protocols is not to be construed as limiting as to the implementation of said quantum algorithm executions and/or TELS-based magic state distillation processes, or portions thereof.

Furthermore, as related to the description herein, it may be understood that quantum hardware, such as quantum hardware device(s), may be used to implement quantum computers, and/or various components of quantum computers (e.g., quantum processing cores, routing spaces, magic state distillation factories, etc.). For example, a given quantum hardware device may resemble "building blocks" of a quantum computer, such as a grid (e.g., a one-dimensional grid, a two-dimensional grid, etc.) of qubits that may be initialized in various ways in order to form various components of a quantum computer, such as topological quantum codes. Quantum hardware devices may be further configured such that single qubit gates, multi-qubit gates, and/or other operations of quantum circuits may be performed between qubits of the quantum hardware devices. A person having ordinary skill in the art should also understand that, depending upon factors such as type(s) of qubit technologies used, type(s) of gates performed between said qubits, etc., quantum hardware devices may also comprise various control devices (e.g., function generators, devices for temperature, magnetic, and/or other environmental controls pertaining to local environments of the grid of qubits, etc.) that may be used to maintain and/or transform various properties of the qubits and/or other physical components of a given quantum computer. Moreover, a person having ordinary skill in the art should understand that a qubit may refer to both a logical bit (e.g., a one or a zero with some probability) and to one or more physical components used to construct the given qubit based, at least in part, on the type of qubit technology being applied. For example, a superconducting qubit (e.g., a transmon) may be constructed using at least a superconducting material and a non-superconducting material in which the non-superconducting material is located in between sections of superconducting material. With regard to this understanding, it should also be understood that quantum hardware may therefore be used to implement physical qubits, in ways such as those as described above, that may again be combined in various ways to implement one or more logical qubits such that logical quantum operations may be performed using said physical elements of said quantum hardware.

Hybrid Error Detection and Correction Schemes for Temporally Encoded Lattice Surgery (TELS) Protocols In some previous implementations of temporally encoded lattice surgery protocols, if a lattice surgery failure is detected while measuring an over-complete set of a given series of multi-qubit Pauli operators corresponding to a parallelizable Pauli set, multi-qubit Pauli operators from the original parallelizable Pauli set would be remeasured (e.g., remeasurements 304 as shown in FIG. 3). Such previous implementations may be referred to herein as error-detection-only schemes (e.g., without an error correction component) for temporally encoded lattice surgery protocols. In contrast, hybrid error detection and correction schemes (e.g., with error correction and error detection components) for temporally encoded lattice surgery protocols, such as those described herein, may be applied to reduce a time-like distance requirement for lattice surgery protocols by measuring an over-complete set of mutually commuting multi-qubit Pauli operators (e.g., a parallelizable Pauli set k) which form codewords of a classical error correcting code, according to some embodiments. Results of the over-complete set of multi-qubit Pauli measurements may then be used to detect or correct time-like lattice surgery failures, as described with regard to at least FIGS. 1, 4, and 7 herein. Further time savings may be obtained if, during a re-measurement step of such a hybrid error detection and correction scheme, multi-qubit Pauli operators from the given over-complete set are repeatedly measured until success (e.g., no logical time-like failures) of the temporally encoded lattice surgery protocol, according to some embodiments.

FIG. 1 illustrates an example of a parallelizable Pauli set that may be used to perform Pauli-based computation for a given quantum algorithm, according to some embodiments.

Models for quantum computation, such as circuit models of quantum computation, adiabatic models of quantum computation, measurement-based models of quantum computation, fusion-based models of quantum computation, etc., may be used to execute quantum algorithms on a given quantum computer. A given model for quantum computation may be quantum-hardware-specific, and may perform better or worse than other models depending upon a quantum technology, architecture, or other hardware design feature. In some embodiments, for a universal quantum computing architecture which uses two-dimensional planar topological codes (e.g., a quantum surface code), a quantum algorithm may be implemented using a Pauli-based model of quantum computation.

In Pauli-based computation methods, logical gates (e.g., logical T gates, etc.) may be applied by measuring multi-qubit Pauli operators (e.g., measurement representation of a multi-qubit Pauli operator 102) along with application of ancillary magic states such as |T⟩-type magic states, as shown in FIG. 1 for general model of Pauli-based quantum computation 100. A person having ordinary skill in the art should understand that |T⟩-type magic states may be defined as |T⟩=(|0⟩+$e^{i\pi/4}$|1⟩)/√2. Quantum algorithms may then be executed using a pool of purified magic states (e.g., high fidelity |T⟩-type magic states) and a sequence of multi-qubit Pauli measurements. As shown in FIG. 1, general model of Pauli-based quantum computation 100 demonstrates how a given quantum algorithm may be written as a sequence of multi-qubit Pauli measurements (e.g., multi-qubit Pauli measurements performed according to an arrangement of multi-qubit Pauli operators) which may perform both Clifford and non-Clifford operations (wherein an implementation of non-Clifford gates is shown in FIG. 1). In some embodiments, multi-qubit Pauli measurements may be performed using a lattice surgery protocol, such as that which is discussed with regard to FIGS. 2A-2C, and/or may be sped up by using one or more temporally encoded lattice surgery protocols, such as those discussed herein.

In the interest of speeding up execution of said quantum algorithms (e.g., decreasing a given amount of time to execute a given quantum algorithm), a sequence of multi-qubit Pauli measurements may be grouped into subsequences of mutually commuting measurements, according to some embodiments. For example, size-k parallelizable Pauli set 104 may be written as $\{P_1, P_2, \ldots P_k\}$ and may represent such a subsequence of mutually commuting multi-qubit Pauli measurements. General model of Pauli-based quantum computation 100 also demonstrates a second subsequence of mutually commuting multi-qubit Pauli measurements, e.g., size-k parallelizable Pauli set 106, which may be written as $\{P_{k+1}, P_{k+2}, \ldots P_{2k}\}$. Overall, general model of Pauli-based quantum computation 100 demonstrates multiple subsequences of mutually commuting measurements that, together, represent Pauli-based computation of a given quantum algorithm executing μ T-gates with T-depth γ which may be broken down into γ parallelizable Pauli sets of average size k=μ/γ. Furthermore, later measurements in the sequence may depend on measurement outcomes of earlier measurements in the sequence. For example, using notation as shown in FIG. 1 (and later in FIGS. 3 and 4), $P_2$ may denote a conditional on a measurement outcome of $P_1$ (see also $m_1$, $m_2$, $m_3$, etc., as shown in FIGS. 3 and 4), wherein said conditionality may occur because each Pauli measurement would be followed by a conditional Clifford operation. However, as further discussed with regard to FIGS. 3 and 4, Pauli-based computation allows for such conditional Clifford operations to be conjugated at the end of computation of a given model of Pauli-based quantum computation.

Such explanations of parallelizable Pauli sets may also be applied to magic state distillation processes, such as those described herein, wherein a given magic state distillation process may be expressed as sequence(s) of multi-qubit Pauli measurements, wherein all non-Clifford gates commute and thus form parallelizable Pauli sets. For example, a 15-to-1 magic state distillation process, such as that which is shown in TELS-based magic state distillation circuit 800 in FIG. 8A (which is a 15-to-1 magic state distillation process that has been enhanced by one or more temporally encoded lattice surgery protocols), may have a parallelizable Pauli set of size 11, as indicated by multi-qubit Pauli operators 806 shown in FIG. 8A.

Figure 2A:
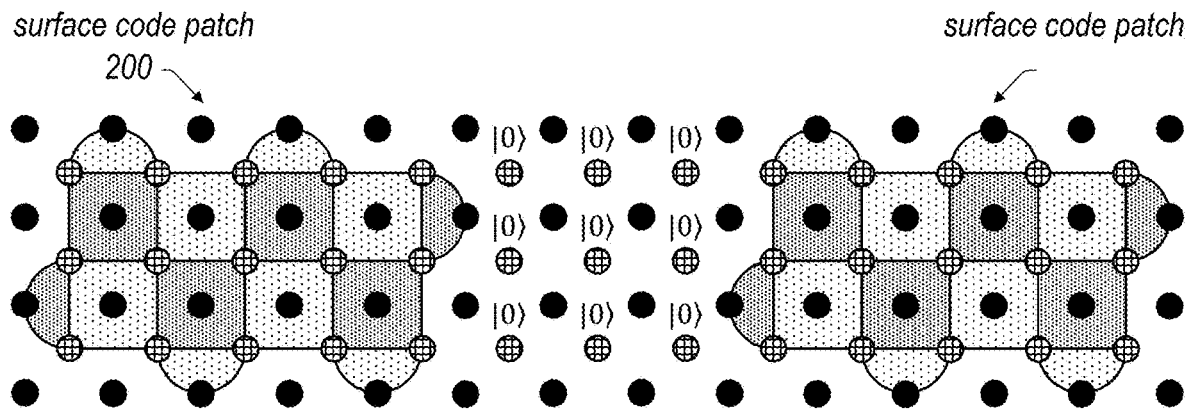
FIGS. 2A-2C illustrate a process of performing a $X \otimes X$ measurement via lattice surgery between logical qubits encoded in respective surface code patches, according to some embodiments.
Figure 2B:
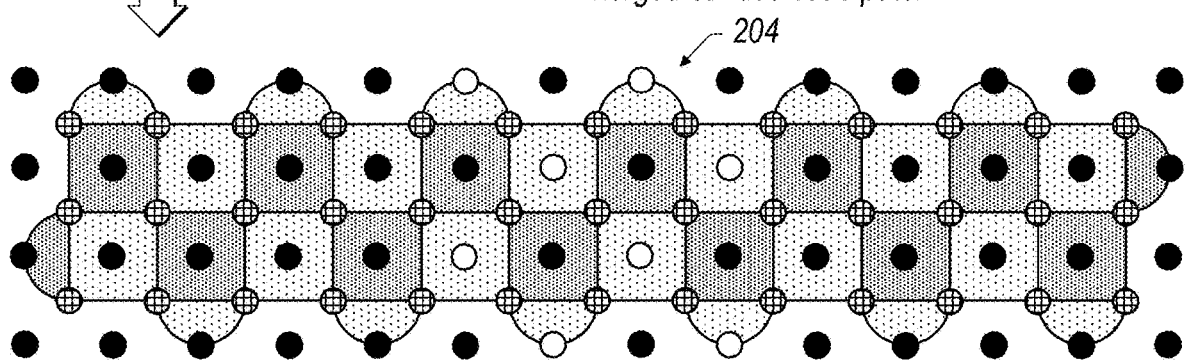
Figure 2C:
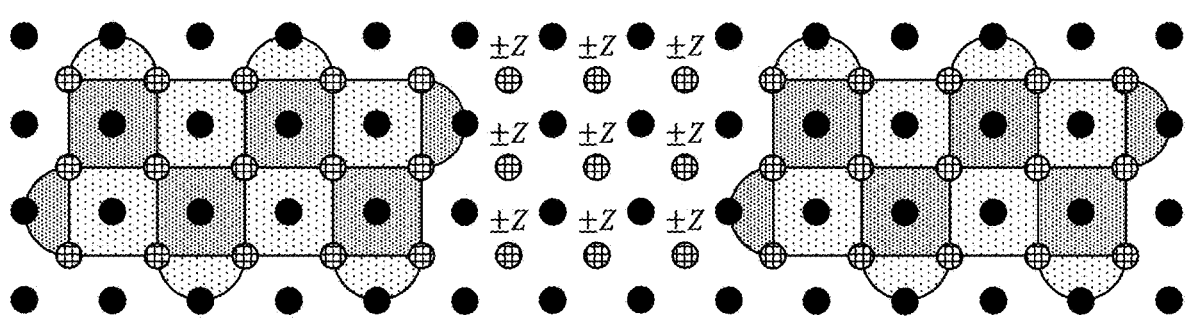

FIGS. 2A-2C illustrate a process of performing a X⊗X measurement via lattice surgery between logical qubits encoded in respective surface code patches, according to some embodiments.

In topological codes (e.g., a quantum surface code, a quantum color code, etc.), lattice surgery is a dominant mechanism used to perform multi-qubit Pauli measurements. FIGS. 2A-2C demonstrate performance of a X⊗X lattice surgery measurement between two logical qubits encoded in the surface code. As shown in FIG. 2A, respective logical qubits are encoded into surface code patches 200 and 202, wherein each of said surface code patches has dimensions $d_x$=3 and $d_z$=5 and data and ancilla qubits of the surface code patches are indicated via the Key shown in the figure.

Prior to measuring X⊗X, data qubits in the routing space (e.g., the region in between surface code patches 200 and 202) are initialized in the |0⟩ state, as shown in FIG. 2A. In some embodiments, routing space dimensions may be functions of $d_x$ and $d_z$, which may correspond to X and Z distances of the given surface code, respectively (e.g., wherein surface code patches 200 and 202 are patches of a given surface code with distances X and Z). Further examples of the uses of routing spaces may be found with regard to discussion for at least FIGS. 11D and 11E herein.

Through a lattice surgery protocol such as that which is shown in FIGS. 2A-2C, the X⊗X measurement outcome is obtained by measuring X operators in the routing space region, as shown in FIG. 2B. A person having ordinary skill in the art should understand that a minimum-weight representative of the logical X operator of the surface code is given by the product of X operators along the vertical boundaries of the patch. The measurement outcomes of the X stabilizers in the routing space may be random, while the product of all such X stabilizers in the routing space give the parity of the X⊗X measurement outcome (see ancilla qubits which encode the parity of the multi-qubit Pauli measurement outcome as shown in the Key for FIGS. 2A-2C). The stabilizers of merged surface code patch 204 are measured for $d_m$ rounds, after which merged surface code patch 204 is split back up, as shown in FIG. 2C, into surface code patch 200, surface code patch 202, and the routing space by measuring the qubits located in the routing space in the Z basis. In some embodiments, measurement and reset of qubits, such as data qubits and ancilla qubits of surface code patches 200 and 202, may take a longer amount of time than the implementation of physical CNOT gates used to measure stabilizers of said surface code patches. In such embodiments, it may be assumed that qubits of the routing space, such as qubits in the routing space used to measure X⊗X as shown in FIGS. 2A-2C, are available (e.g., ready to be reinitialized for a following round of syndrome measurements according to a given lattice surgery protocol being used) one syndrome measurement round after the split of the merged surface code patch (e.g., as shown in FIG. 2C), bringing a total number of rounds of syndrome measurements to $d_m$+1 rounds.

In some embodiments, a logical time-like failure may occur during a lattice surgery protocol, such as that which is shown in FIGS. 2A-2C, when a wrong parity of the multi-qubit Pauli measurement is obtained. However, a logical time-like failure rate is exponentially suppressed with the number of syndrome measurement rounds $d_m$, creating a tradeoff between trying (generally speaking) to decrease a number of syndrome measurement rounds measured while maintaining an acceptable logical time-like failure rate.

In some embodiments, numerical results such as those that are described herein may be obtained using the following biased circuit-level noise model, wherein the bias η=100:

Each single-qubit gate location is followed by a Pauli Z error with probability p/3 and Pauli X and Y errors each with probability $$\frac{p}{3\eta}.$$

Each two-qubit gate is followed by a {Z⊗I, I⊗Z, Z⊗Z} error with probability p/15 each, and a {X⊗I, I⊗X, X⊗X, Z⊗X, Y⊗I, Y⊗X, I⊗Y, Y⊗Z, X⊗Z, Z⊗Y, X⊗Y, Y⊗Y} each with probability $$\frac{p}{15\eta}.$$

With probability $$\frac{2p}{3\eta},$$

the preparation of the |0⟩ state is replaced by |1⟩=X|0⟩. Similarly, with probability 2p/3, the preparation of the |+⟩ state is replaced by |−⟩=Z|+⟩.

With probability $$\frac{2p}{3\eta},$$

a single-qubit Z basis measurement outcome is flipped. With probability 2p/3, a single-qubit X-basis measurement outcome is flipped.

Each idle gate location is followed by a Pauli Z with probability p/3, and a {X, Y} error each with probability $$\frac{p}{3\eta}.$$

In some example implementations of the above circuit-level noise model and a minimum-weight perfect-matching (MWPM) decoder, it may be shown that a time-like logical failure rate of an X⊗X multi-qubit Pauli measurement with $d_m$ syndrome measurement rounds may be given by $$p_m(d_m) = 0.01634A(21.93p)^{(d_m+1)/2},$$

wherein p is below a threshold and A corresponds to an area of a given routing space used to connect (e.g., connect into merged surface code patch 204) various surface code patches (e.g., surface code patches 200 and 202) of a multi-qubit Pauli measurement. The above equation may also be used when considering multi-qubit Pauli measurements containing Z and Y terms, according to some embodiments.

Depending on accuracy requirements of a given quantum algorithm, a target (e.g., maximum) logical error rate per Pauli δ may set an upper bound on the maximum tolerable noise, according to some embodiments. This condition may be written as $p_m < \delta$, and to achieve low $p_m$, a measurement distance $d_m$ (e.g., a number of rounds of syndrome measurements) therefore may be increased. Furthermore, surface codes with X and Z boundaries, such as those shown in FIGS. 2A-2C, may perform X⊗X, Z⊗Z, and Z⊗X measurements using lattice surgery protocols such as some embodiments described by FIGS. 2A-2C. In order to access a Y boundary of a given surface code patch, however, twist defects may be used (see also the discussion with regard to FIG. 11E herein). A person having ordinary skill in the art should understand that twist defects as they pertain to lattice surgery protocols, such as those described herein, have been studied extensively in quantum surface codes and quantum in color codes, and that such the methods may also be used to implement Y-type measurements as described herein. Twist defects as they pertain to lattice surgier protocols may be referred to herein as twist-based lattice surgery protocols, according to some embodiments.

In some embodiments, encoding lattice surgery measurement results into a classical error-correcting code (e.g., a temporally encoded lattice surgery protocol) may be an effective method for reducing a measurement distance $d_m$ of each multi-qubit Pauli measurement. For example, Pauli operators of a given parallelizable Pauli set $\mathcal{P} = \{P_t, P_{t+1}, \ldots, P_{t+k-1}\}$ may be replaced by a new set $\mathcal{S} = \{Q[x^1], [x^2], \ldots, [x^n]\}$ wherein $$Q[x] = \prod_{j=0}^{k-1} P_{t+j}^{x_j},$$

and x is a binary vector of length k. Such a replacement of Pauli set $\mathcal{P}$ to set $\mathcal{S}$ follows ⟨$\mathcal{S}$⟩=⟨$\mathcal{P}$⟩. In such an encoding of lattice surgery measurement results into a classical error-correcting code, vectors $\{x^1, x^2, \ldots, x^n\}$ form columns of a generator matrix G of some classical error-correcting code $\mathcal{C}$, wherein rows of G correspond to codewords of $\mathcal{C}$. Furthermore, an encoding of a temporally encoded lattice surgery protocol may take place entirely in the time domain since additional multi-qubit Pauli measurements may be performed without requiring additional qubits, according to some embodiments. By multiplying measurement outcomes of all operators in $\mathcal{S}$ by a parity check matrix of $\mathcal{C}$, possible logical time-like failures that may occur during use of a temporally encoded lattice surgery protocol may be detected if the logical result is equal to 1 instead of 0.

FIG. 3 illustrates a previously used method of using a temporally encoded lattice surgery (TELS) protocol solely for error detection of measurement results of a given series of multi-qubit Pauli measurements as shown in the figure, according to some embodiments.

As shown in FIG. 3, a previously used temporally encoded lattice surgery protocol may be used to detect logical time-like failures while performing multi-qubit Pauli measurements for a given parallelizable Pauli set $\mathcal{P}=\{P_1, P_2\}$, and with corresponding set $\mathcal{S}=\{P_1, P_2, P_1P_2\}$ (e.g., a size of the given parallelizable Pauli set $\mathcal{P}$ is k=2 and a number of codewords corresponding to operators in set $\mathcal{S}$ is n=3). As described above, multi-qubit Pauli measurements for a given quantum algorithm being executed using temporally encoded lattice surgery protocol 300 may be grouped into subsequence(s) of mutually commuting measurements, as shown by multi-qubit Pauli operators (e.g., measurement representation of a multi-qubit Pauli operator 302) corresponding to $P_1$, $P_2$, and $P_1P_2$ in FIG. 3. As the Pauli-based computation described in FIG. 3 may be performed in the Clifford frame, Clifford corrections (e.g., Clifford corrections 306) that may be required may be conjugated through to the end of temporally encoded lattice surgery protocol 300 (see also description for conditional Clifford operations being conjugated at the end as described with regard to FIG. 1). As also described above, set $\mathcal{S}$ may contain one or more redundant measurements (e.g., measurement $P_1P_2$) that may be used to detect logical time-like failures during performance of a given temporally encoded lattice surgery protocol, such as temporally encoded lattice surgery protocol 300. A generator matrix for the set $\mathcal{S}$ may then be given by $$G = \begin{bmatrix} 101 \\ 011 \end{bmatrix},$$

with the rows of G corresponding to codewords of a given classical [n, k, d] code, wherein [n, k, d]=[3,2,2] in the current example, and d corresponds to a distance parameter of the given classical error-correcting code. As a given general-purpose quantum computer may be configured to perform many distinct quantum algorithms, wherein some of the quantum algorithms that may be executed may have different sizes of parallelizable Pauli sets, determining a given classical [n, k, d] code to be used to encode respective multi-qubit Pauli operators of a given quantum algorithm into codewords may be specific to given conditions for performing said quantum algorithm on the given general-purpose quantum computer (see also the description with regard to block 702 herein). For example, determination of a given classical [n, k, d] code (and, by extension, a distance parameter of said classical [n, k, d] code) that may be used to execute the given parallelizable Pauli set $\mathcal{P}$ with a size of k=2, such as that which is shown in FIG. 3, may be based, at least in part, on the size being equal to 2.

When measuring multi-qubit Pauli operators in a given set $\mathcal{S}$, wherein set $\mathcal{S}$ includes one or more redundant measurements, the multi-qubit Pauli operators may be measured using $d'_m < d_m$ syndrome measurement rounds (e.g., wherein $d'_m$ rounds is less than $d_m$ rounds, which may be denoted as a number of rounds required without using the one or more redundant measurements in set $\mathcal{S}$) during a merge step (see description with regard to merged surface code patch 204 herein) of a given temporally encoded lattice surgery protocol, since an ability to detect logical time-like failures allows for noisier lattice surgery operations, according to some embodiments. As shown in FIG. 3, a logical time-like failure may be detected (e.g., with probability $p_D$) when a measurement outcome of $P_1P_2$ (e.g., $m_3$) is inconsistent with respective measurement outcomes of $P_1$ and $P_2$ (e.g., $m_1$ and $m_2$). If, during performance of temporally encoded lattice surgery protocol 300, a logical time-like failure is detected (e.g., with probability $p_D$), the multi-qubit Pauli measurements corresponding to the original parallelizable Pauli set $\mathcal{P}$ are remeasured (as indicated by dashed box 304) with a measurement distance of $qd_m$, wherein q is a constant that may be optimized to reduce an overall measurement distance.

If, during performance of temporally encoded lattice surgery protocol 300, a logical time-like failure is not detected, Clifford corrections 306 may then be applied based on lattice surgery measurement results of the original Paulis of the parallelizable Pauli set of size k, as shown in FIG. 3, which may be obtained by decoding n measurement bits according to a classical error-correcting code (e.g., the classical [3,2,2] code in the current example). However, in the previously used method of using a temporally encoded lattice surgery protocol solely for error detection of measurement results shown in FIG. 3, if two logical time-like failures occur, for example, the temporally encoded lattice surgery protocol described in FIG. 3 would be unable to detect such a time-like failure, which may also be seen by noting that classical [3,2,2] error-correcting code distance parameter in the example shown in FIG. 3 is 2.

As shown in FIG. 3, Clifford correction 306 may contain conditional S gates, wherein $S=|0\rangle\langle 0|+i|1\rangle\langle 1|$. For example, given an input state $|\psi\rangle$, as shown in FIG. 3, which carries a Clifford frame correction C, C may be conjugated to the end of temporally encoded lattice surgery protocol 300 such that a measurement outcome of commuting multi-qubit Pauli measurements of temporally encoded lattice surgery protocol 300 may be conjugated by Clifford frame correction C', wherein $C'=S_1^{m^1+2q^1}S_1^{m^2+2q^2}C$ and $q_1$ and $q_2$ come from logical single-qubit measurements 308.

In general, in order to perform a temporally encoded lattice surgery protocol involving Clifford or non-Clifford gates that use resource states (e.g., temporally encoded lattice surgery protocol 300 which uses |T⟩-type magic states), quantum hardware may be allocated to hold said resource states in memory for the entire temporally encoded lattice surgery protocol (e.g., said resource states may not be measured out after each set of multi-qubit Pauli measurements in a given sequence of multi-qubit Pauli measurements), according to some embodiments. For example, in FIG. 3, the |T⟩-type magic states used to measure $P_1$ and $P_2$ would need to be held in memory until the end of temporally encoded lattice surgery protocol 300. A common approach for designing an architecture for a given quantum computer is to use a central quantum processing unit (otherwise known as a processing core of a quantum computer) and a set of magic state distillation factories (see FIGS. 10A-22 herein for examples of distillation tiles within magic state distillation factories). If a quantum computer is built according to this model, the use of temporally encoded lattice surgery protocol may result in an additive factor to a total number of logical qubits needed to execute a given quantum algorithm rather than a multiplicative factor.

The following paragraph describes an average total time required to perform a previously used method of using a temporally encoded lattice surgery protocol solely for error detection of measurement results, such as temporally encoded lattice surgery protocol 300 shown in FIG. 3. For ease of description herein, said total time will be referred to herein as $T_{detect\ TELS}$ so as to contrast the total time required for said previously used method and a new method of using a temporally encoded lattice surgery protocol as a hybrid error detection and correction scheme, such as that which is described with regard to FIG. 4 herein. For a given parallelizable Pauli set $\mathcal{P}$ of size k, $T_{detect\ TELS}$ may include two components: $T_1$ and $T_2$. The first term describes a time required to perform lattice surgery measurements per codeword, multiplied by a number of codewords used to describe the given parallelizable Pauli set of size k using a given classical error-correcting code (e.g., a given classical error-correcting code $\mathcal{C}$). The second term is due to a contribution from measuring the Paulis of parallelizable Pauli set $\mathcal{P}$ if one or more logical time-like failures are detected (e.g., which causes remeasurements 304 to be performed in an example shown by FIG. 3):

$$T_{detect\ TELS} = T_1 + T_2 = n(d'_m + 1) + p_D k(\lceil qd_m \rceil + 1).$$

Furthermore, a logical error rate per Pauli (e.g., $p_L$) of the previously used method of using a temporally encoded lattice surgery protocol solely for error detection of measurement results, such as temporally encoded lattice surgery protocol 300 shown in FIG. 3, may be defined as the sum of the logical errors due to each part:

$$p_L = p_{L1} + p_{L2} = \frac{1-p_D}{k} \sum_{i=d}^{n} l_i (p_m(d'_m))^i (1 - p_m(d'_m))^{n-i} + p_D p_m(\lceil qd_m \rceil) \approx$$

$$\frac{1-p_D}{k} l_d (p_m(d'_m))^d (1 - p_m(d'_m))^{n-d} + p_D p_m(\lceil qd_m \rceil),$$

$$p_L = p_{L1} + p_{L2} = \frac{1-p_D}{k} \sum_{i=d}^{n} l_i (p_m(d'_m))^i (1 - p_m(d'_m))^{n-i} + p_D p_m(\lceil qd_m \rceil) \approx$$

$$\frac{1-p_D}{k} l_d (p_m(d'_m))^d (1 - p_m(d'_m))^{n-d} + p_D p_m(\lceil qd_m \rceil),$$

$$p_L = p_{L1} + p_{L2} = \frac{1-p_D}{k} \sum_{i=d}^{n} l_i (p_m(d'_m))^i (1 - p_m(d'_m))^{n-i} + p_D p_m(\lceil qd_m \rceil) \approx$$

$$\frac{1-p_D}{k} l_d (p_m(d'_m))^d (1 - p_m(d'_m))^{n-d} + p_D p_m(\lceil qd_m \rceil),$$

wherein $l_i$ is a number of weight-i logical time-like failures that cause trivial syndromes when multiplying the given lattice surgery measurement outcomes by a parity check matrix of the given classical error-correcting code $\mathcal{C}$. The variable $$p_m(d'_m)$$

may be defined as a probability of a logical time-like failure of a single lattice surgery measurement with measurement distance $$d'_m$$

(see the equation for $p_m(d_m)$ provided above), and $p_m(\lceil qd_m \rceil)$ may be defined as a probability of a logical time-like failure occurring during one (or more if required) of the remeasurement rounds (e.g., remeasurements 304), wherein the measurement distance is $\lceil qd_m \rceil$. Note that a given logical error rate may be due to incorrect Clifford corrections (e.g., Clifford corrections 306) being applied after application of non-Clifford gates during a given temporally encoded lattice surgery protocol (e.g., temporally encoded lattice surgery protocol 300). Therefore, if the given temporally encoded lattice surgery protocol fails without detecting a logical time-like failure, the probability that there is a logical time-like failure may be scaled by $1-p_D$. Finally, a probability that a logical error is detected during the first stage (e.g., $p_D$) may be defined as $$p_D \geq \sum_{i=1}^{d-1} \binom{n}{i} (p_m(d'_m))^i (1 - p_m(d'_m))^{n-i},$$

wherein a greater than or equal to sign may be used as some sets of $\geq d$ logical time-like failures may also be detected.

Returning now to the $l_i$ term defined above as a number of weight-i logical time-like failures that cause trivial syndromes when multiplying the given lattice surgery measurement outcomes by a parity check matrix of the given classical error-correcting code $\mathcal{C}$, there are various ways in which said term may be calculated. In the following paragraphs several methods for calculating $l_i$ are demonstrated, such as (1) using sampling methods, wherein a computational complexity grows with distance parameter d, and (2) using deterministic computation to calculate $l_i$ coefficients, wherein a computational complexity grows exponentially with k as opposed to d. A person having ordinary skill in the art should understand that the following paragraphs are meant to be exemplary methods of calculating $l_i$ and are not meant to be restrictive. Other methods for calculating $l_i$ may also be used to arrive at similar results.

In general, a given binary [n, k, d] classical error-correcting code may encode k logical bits of information into n≥k physical bits, with distance parameter d. During error detection, as described above, all errors of weight less than distance parameter d may be detected. However, some of the weight-d errors may not detected, and such errors may be referred to herein as malignant sets as they may cause erroneous flips of the logical bits. Furthermore, it may be computationally hard to compute how many of the $$\binom{n}{d}$$

weight-d bit strings are malignant. A deterministic method (described in the following paragraphs) may be to evaluate the weights of all $$\binom{n}{d}$$

bit strings. However, such an evaluation takes time that is exponential in the problem size.

Therefore, for larger classical error-correcting codes, Monte Carlo simulation(s) may provide a faster result. For a physical bit error rate p, a logical bit error rate of a classical [n, k, d] error-correcting code may be defined as $$p_L = \sum_{j=d}^{n-d} l_j p^j (1-p)^{n-j},$$

wherein $l_j$ may be defined as a number of malignant sets of weight j. At sufficiently low p, $p_L$ may be approximated to the first term of the polynomial, $l_d p^d (1-p)^{n-d}$, and $l_d$ may be approximated using Monte Carlo simulations in two steps, according to some embodiments:

For different, small values of p, compute $p_L$ by sampling errors and evaluating a fraction of said sampled errors that are malignant. An n-bit error sample e may be obtained by sampling each bit from a Bernoulli random variable with probability p. A given error e may be defined as malignant if He=0, wherein H may be defined as a parity check matrix of a given classical error-correcting code being applied.

Perform a least squares fit of the obtained values of the first step with the polynomial $p^d(1-p)^{n-d}$. A coefficient of the resulting least squares fit is then a Monte Carlo approximation of $1_d$.

It may also be noted that, at sufficiently low p, many of the error samples may be trivial, resulting in a lot of time spent evaluating these samples. For large d, this problem may become worse. A probability of observing a weight-d error scales as $p^d$, meaning that the errors that actually may be malignant are rarely ever observed.

Malignant errors may also be modeled using a Bernoulli distribution. Since the target is to determine whether a weight-d error is malignant or not, it may be faster to sample only from the given set of weight-d errors. For example, let an error be sampled by choosing d out of n locations at random without replacement. Malignancy of a weight-d error may therefore be modelled using a Bernoulli random variable: a weight-d error sample may be considered as malignant with probability p, which may be estimated with high confidence by checking for malignancy on many samples. Then, $1_d$ may be determined via $$l_d = p\binom{n}{d}.$$

If, instead, a deterministic computation is used to calculate $1_i$ coefficients, a MacWilliams identity may be applied. For a given classical error-correcting code C with k codeword generators, it may be considered that there exist n−k vectors spanning the nullspace (kernel), $C^\perp$. If weights of the $|C^\perp|=2^{n-k}$ bit strings can be enumerated, then weights of the given codewords of C may be evaluated using the Mac Williams identity, $$W_j^C = \frac{1}{|C|^\perp} \sum_{i=0}^{n} W_i^{C^\perp} K_j(i, n),$$

for j=0,1, . . . , n, and wherein $$W_j^C$$

may be defined as a number of malignant fault sets of weight-d.

FIG. 4 illustrates a method of using a hybrid error detection and correction temporally encoded lattice surgery (TELS) protocol for measurement results of a given series of multi-qubit Pauli measurements performed on a size-2 parallelizable Pauli set, as shown in the figure, according to some embodiments.

As an example shown in FIG. 4, temporally encoded lattice surgery protocol 400 is performed for a given parallelizable Pauli set $\mathcal{P}=\{P_1, P_2\}$, and with corresponding set $\mathcal{S}=\{P_1, P_2, P_1P_2\}$ (e.g., a size of the given parallelizable Pauli set $\mathcal{P}$ is k=2 and a number of codewords corresponding to operators in set $\mathcal{S}$ is n=3). As described above, multi-qubit Pauli measurements for a given quantum algorithm being executed using temporally encoded lattice surgery protocol 400 may be grouped into subsequence(s) of mutually commuting measurements, as shown by multi-qubit Pauli operators (e.g., measurement representation of a multi-qubit Pauli operator 402) corresponding to $P_1$, $P_2$, and $P_1P_2$ in FIG. 4, wherein $P_1P_2$ may be considered to be a redundant measurement, as described above, according to some embodiments. As the Pauli-based computation described in FIG. 4 may be performed in the Clifford frame, Clifford corrections (e.g., Clifford corrections 406 using logical single-qubit measurements 408) that may be required may be conjugated through to the end of temporally encoded lattice surgery protocol 400.

As opposed to a previously used method of using a temporally encoded lattice surgery protocol solely for error detection of measurement results, such as temporally encoded lattice surgery protocol 300 shown in FIG. 3, FIG. 4 demonstrates a hybrid error detection and correction scheme during performance of a temporally encoded lattice surgery protocol. In such a hybrid error detection and correction scheme, if a logical time-like failure is detected when measuring Paulis in the given set $\mathcal{S}$, multi-qubit Pauli operators in $\mathcal{S}$ (as opposed to multi-qubit Pauli operators of $\mathcal{P}$, as demonstrated in the previously used method described with regard to FIG. 3) are remeasured (see remeasurements 404 in FIG. 4). Furthermore, if a logical time-like failure is detected, multi-qubit Pauli operators in $\mathcal{S}$ may be repeatedly measured until no logical time-like failure(s) are detected. Then, Clifford corrections 406 may be applied. A hybrid error detection and correction scheme, as is further described in the following paragraphs, refers to correcting potential errors that correspond to classical error syndromes with weights at or below a certain weight limit, and detecting (and causing remeasurement of multi-qubit Pauli operators in $\mathcal{S}$) potential errors that correspond to other classical error syndromes (e.g., other than the classical error syndromes that are corrected) with weights above a certain weight limit.

As described above with regard to FIG. 3, a previously used method of using a temporally encoded lattice surgery protocol solely for error detection of measurement results, such as temporally encoded lattice surgery protocol 300 shown in FIG. 3, may require an average total time of $T_{detect\ TELS}$. In contrast, an average total time of a temporally encoded lattice surgery protocol, such as temporally encoded lattice surgery protocol 400 in FIG. 4, which applies a hybrid error detection and correction scheme may be described by $T_{hybrid\ TELS}$, wherein $$T_{hybrid\ TELS} = n(d'_m + 1) + p_D T_{hybrid\ TELS} = \frac{n(d'_m + 1)}{1 - p_D},$$

$$T_{hybrid\ TELS} = n(d'_m + 1) + p_D T_{hybrid\ TELS} = \frac{n(d'_m + 1)}{1 - p_D},$$

as a lattice surgery implementation of each of the multi-qubit Pauli measurements in $\mathcal{S}$ may be performed using $$d'_m$$

syndrome measurement rounds during a merge step of the given lattice surgery measurements (see also merged surface code patch 204). In order to compare $T_{detect\ TELS}$ to $T_{hybrid\ TELS}$, $T_{detect\ TELS}$ may be rewritten as $$T_{detect\ TELS} = n(d'_m + 1) + p_D u n(d'_m + 1) = n(d'_m + 1)(1 + p_D u),$$

wherein $$u = \frac{k(\lceil qd_m \rceil + 1)}{n(d'_m + 1)},$$

and if $$\frac{1}{1-p_D} < (1 + p_D u),$$

the hybrid error detection and correction scheme for a temporally encoded lattice surgery protocol, such as temporally encoded lattice surgery protocol 400 shown in FIG. 4, is more efficient than a previously used method of using a temporally encoded lattice surgery protocol solely for error detection of measurement results, such as temporally encoded lattice surgery protocol 300 shown in FIG. 3. Furthermore, simplifying the above expression, a constraint on u may be defined as $$u > \frac{1}{1-p_D}.$$

It may be seen from the above constraint on u that a time difference between $T_{detect\ TELS}$ and $T_{hybrid\ TELS}$ may only be further exacerbated when pp is high.

The probability of a logical error in temporally encoded lattice surgery protocols that apply a hybrid error detection and correction scheme may be defined as a probability that an undetectable set of measurement errors occurs during the last iteration (e.g., wherein the last iteration may be defined as an iteration when no logical time-like failures are detected) of temporally encoded lattice surgery. Let $$p'_L = \frac{1}{k} \sum_{i=d}^{n} l_i (p_m(d'_m))^i (1 - p_m(d'_m))^{n-i},$$

which corresponds to a probability per Pauli that a series of logical time-like failures during the execution of the measurements in $\mathcal{S}$ results in a trivial syndrome when multiplied by a parity check matrix of a given classical error-correcting code $\mathcal{C}$. A failure probability for said temporally encoded lattice surgery protocol that applies a hybrid error detection and correction scheme may then be given by $$p_L = (1 - p_D)p'_L + p_D(1 - p_D)p'_L + p_D^2(1 - p_D)p'_L + \ldots$$
$$= (1 - p_D)p'_L (1 + p_D + p_D^2 + \ldots) = p'_L$$
$$= \frac{1}{k} \sum_{i=d}^{n} l_i (p_m(d'_m))^i (1 - p_m(d'_m))^{n-i}.$$

$$p_L = (1 - p_D)p'_L + p_D(1 - p_D)p'_L + p_D^2(1 - p_D)p'_L + \ldots$$
$$= (1 - p_D)p'_L (1 + p_D + p_D^2 + \ldots) = p'_L$$
$$= \frac{1}{k} \sum_{i=d}^{n} l_i (p_m(d'_m))^i (1 - p_m(d'_m))^{n-i}.$$

$$p_L = (1 - p_D)p'_L + p_D(1 - p_D)p'_L + p_D^2(1 - p_D)p'_L + \ldots$$
$$= (1 - p_D)p'_L (1 + p_D + p_D^2 + \ldots) = p'_L$$

$$= \frac{1}{k} \sum_{i=d}^{n} l_i (p_m(d'_m))^i (1 - p_m(d'_m))^{n-i}.$$

$$p_L = (1 - p_D)p'_L + p_D(1 - p_D)p'_L + p_D^2(1 - p_D)p'_L + \ldots$$
$$= (1 - p_D)p'_L (1 + p_D + p_D^2 + \ldots) = p'_L$$
$$= \frac{1}{k} \sum_{i=d}^{n} l_i (p_m(d'_m))^i (1 - p_m(d'_m))^{n-i}.$$

In the following paragraphs, discussion centers around performance improvements caused by applying a hybrid error detection and correction scheme, as opposed to a detection only scheme (e.g., such as the temporally encoded lattice surgery protocol discussed with regard to FIG. 3), to a temporally encoded lattice surgery protocol.

An overall effect of using a hybrid error detection and correction scheme is to reduce an average time per Pauli measurement, while staying under a logical error rate threshold set, which may be defined by $\delta$. This overall effect may be more dominant when using classical error-correcting codes with high k and d, and/or at higher tolerable (e.g., maximum tolerated) noise rates $\delta$. At larger $\delta$, it may be possible to correct classical errors of higher weight than for smaller $\delta$ since there is more of an error budget, and because $p_L$ may be increased to match $\delta$. In addition, $p_D$ tends to be higher when $d_m$ is small, and $d_m$ is smallest at large $\delta$, according to some embodiments. One of the benefits of using a hybrid error detection and correction scheme is that $p_D$ may be made smaller, and that in turn allows smaller average runtimes per Pauli. Such hybrid error detection and correction schemes may therefore be of interest when time savings is a priority.

Furthermore, when using a given distance-d classical error-correcting code in an error detection (only) scheme, an error may be detected with probability $$p_D \approx O(p_m(d'_m)),$$

and when distance-d increases, a maximum logical time-like failure rate of a given temporally encoded lattice surgery protocol may be achieved using measurement distances $d_m$ close to 1. However, with such small measurement distances, $$p_m(d'_m)$$

is inevitably large, and so is $p_D$. If, instead, the given distance-d classical error-correcting code is used to correct all errors up to some weight c (less than or equal to c), which may be referred to herein as triggering a correction event, a detection event may then only be triggered by errors of weight at least c+1. Therefore, $$p_D \approx O\big((p_m(d'_m))^{c+1}\big)$$

A lower value of $p_D$ may thus require fewer repeated measurements of the Paulis in the set $\mathcal{S}$ (e.g., remeasurements 404). A person having ordinary skill in the art should understand that a hybrid error detection and correction scheme inherently has both correction events and detection events, and therefore c<d.

Although time is now saved by performing fewer remeasure rounds, a logical error rate may be increased relative to an error detection only scheme. This too may be accounted for as follows: In an error detection only scheme, a logical error rate may scale as $$O\big((p_m(d'_m))^d\big).$$

However, some errors of weight d–c may have the same syndrome as errors of weight-c, since said errors of weight d–c may differ by a logical operator. A probable correction for this syndrome is a weight-c error, but applying this correction yields a logical error with probability $$O\big((p_m(d'_m))^{d-c}\big).$$

Therefore, in order to account for this discrepancy, correcting low-weight errors via a hybrid error detection and correction scheme during a temporally encoded lattice surgery protocol requires a carefully-considered tradeoff between a logical error rate of the given encoded measurements and a time saved due to fewer remeasure rounds. Determining a classical [n, k, d] error-correcting code to be used and determining a weight limit c are therefore considerations in said tradeoff (see also the description pertaining to blocks 702 and 704 herein). Such tradeoffs may also been considered for temporally encoded lattice surgery based (TELS-based) magic state distillation processes, such as those described herein.

By using a hybrid error detection and correction scheme and therefore incorporating an ability to correct errors up to weight c, a probability of observing an uncorrectable but detectable error becomes $$p_D \geq \sum_{i=c+1}^{d-c-1} \binom{n}{i}(p_m(d'_m))^i(1-p_m(d'_m))^{n-i},$$

which is significantly smaller than before.

Furthermore, a probability of logical error per Pauli due to a temporally encoded lattice surgery protocol that applies a hybrid error detection and correction scheme may be defined as $$p_L = \frac{1}{k}\left(\sum_{i=d-c}^{d-1} l_i(p_m(d'_m))^i(1-p_m(d'_m))^{n-i} + \sum_{i=d}^{n} l_i(p_m(d'_m))^i(1-p_m(d'_m))^{n-i}\right)$$

$$\approx \frac{1}{k}l_{d-c}(p_m(d'_m))^{d-c}(1-p_m(d'_m))^{n-d+c}.$$

$$p_L = \frac{1}{k}\left(\sum_{i=d-c}^{d-1} l_i(p_m(d'_m))^i(1-p_m(d'_m))^{n-i} + \sum_{i=d}^{n} l_i(p_m(d'_m))^i(1-p_m(d'_m))^{n-i}\right)$$

$$\approx \frac{1}{k}l_{d-c}(p_m(d'_m))^{d-c}(1-p_m(d'_m))^{n-d+c}.$$

As seen in such a definition of $p_L$, $l_i$ in the second term of the sum includes contributions from both undetectable errors and errors of weight greater than d which have the same syndrome as correctable errors. Also as seen in such a definition of $p_L$, only a leading order term is included as it may be assumed that higher order terms have very small contributions. It may be noted, however, that for classical error-correcting codes with very large values of d, a larger value of $$p_m(d'_m)$$

may be tolerated, and therefore higher order terms may become more relevant.

Referring back to the definition of $T_{hybrid\ TELS}$ given above, said definition shows that an average total time to measure all multi-qubit Pauli operators using a hybrid error detection and correction scheme during a temporally encoded lattice surgery protocol is clearly proportional to n, and that the average total time is also inversely proportional to a distance parameter d of a given classical [n, k, d] error-correcting code used, since a higher value of d results in a lower value of $$d'_m.$$

In the following paragraphs, examples of various classical error-correcting codes are proposed that use odd values of $$d'_m.$$

The following codes may also be considered as cyclic classical error-correcting codes. Binary cyclic classical error-correcting codes may be constructed using cyclic shifts of polynomials defined over finite fields, which may be understood by considering an isomorphic map between a field $$\mathbb{F}_2^n$$

and polynomials of degree <n with coefficients in $$\mathbb{F}_2.$$

For example, in $$\mathbb{F}_2^4,$$

a polynomial $x^3+0x^2+x+1$ corresponds to a bit string 1011, wherein the bit at position $i \in (0, 1, \ldots, n-1)$ (e.g., moving right to left across the bit string) is a coefficient of the term $x^i$. Therefore, a given classical [n, k, d] error-correcting code may be defined as cyclic if k codewords can be generated by cyclic shifts of a generator polynomial, g(x). Cyclic shifts of g(x) may then be obtained by multiplying g(x) with $\{1, x, x^2, \ldots, x^{k-1}\}$.

A person having ordinary skill in the art should understand that the classical error-correcting codes discussed in the following paragraphs are meant to be examples of codes that may be considered for use in a temporally encoded lattice surgery protocol that is specific to a given quantum algorithm's representation using Pauli-based computation, and that other classical error-correcting codes may similarly be applied for use in a hybrid error detection and correction scheme during performance of a temporally encoded lattice surgery protocol and/or during TELS-based magic state distillation processes such as those described herein.

A first type of cyclic classical error-correcting code that may be considered is a single error detect code. A single error detect code with parameters $[n, k, d]=[\alpha+1, \alpha, 2]$ may be generated by taking cyclic shifts of a generating polynomial $g(x)=x+1$ over the field $$\mathbb{F}_2^{\alpha+1},$$

according to some embodiments. For example, codewords of a [4,3,2] single error detect code may be defined as rows of cyclic codeword generator matrix G:

$$G = \begin{bmatrix} 0011 \\ 0110 \\ 1100 \end{bmatrix}.$$

A corresponding parity check matrix H may then be defined as the nullspace of G, or the span of all vectors in $$\mathbb{F}_2^n$$

that are orthogonal to elements of G. Therefore, continuing the example of a [4,3,2] single error detect code, H=[1111]. As another example, FIGS. 11A-11C make use of a [12,11,2] single error detect code during a TELS-based magic state distillation process, and codewords of a [12,11,2] single error detect code may be defined as rows of G, wherein $$G = \begin{bmatrix} 000000000011 \\ 000000000110 \\ 000000001100 \\ 000000011000 \\ 000000110000 \\ 000001100000 \\ 000011000000 \\ 000110000000 \\ 001100000000 \\ 011000000000 \\ 110000000000 \end{bmatrix}$$

A second type of cyclic classical error-correcting code that may be considered is a Golay code. Examples herein which apply a Golay code are shown in FIGS. 13A and 13B, wherein a [23,12,7] Golay code is applied. A [23,12,7] Golay code may be generated by a polynomial $x^{11}+x^9+x^7+x^6+x^5+x+1$ over $$\mathbb{F}_2^{23},$$

according to some embodiments.

A third type of cyclic classical error-correcting code that may be considered is a Bose-Chaudhuri-Hocquenghem (BCH) code, wherein BCH codes may as well be constructed using polynomials over finite fields. Examples herein which apply various BCH codes are shown in FIGS. 12A, 12B, 15, 16, 19, and 22. A characteristic of the BCH family of codes is that codes of different distances may be defined for a same code size, according to some embodiments.

A fourth type of cyclic classical error-correcting code that may be considered is a Zetterberg code. Zetterberg codes may be defined as binary cyclic codes with parameters $[n, k, d]=[2^u+1, 2^u+1-2u, 5\leq d\leq 6]$ for an even integer u, according to some embodiments. Zetterberg codes may also be defined as quasi-perfect as a distance between two codewords is $5\leq d\leq 6$. Examples of Zetterberg codes for $u=\{3,4,5,6,7\}$ are described herein, such as in FIGS. 18 and 21. Codewords for a Zetterberg code may be defined by taking cyclic shifts of palindromic polynomials, and for a given u, other codes with the same parameters may be defined using different palindromic polynomials of the same degree, according to some embodiments.

In some embodiments, it may be determined that classical error-correcting codes other than cyclic codes may provide a better optimization for a given hybrid error detection and correction scheme when performing a temporally encoded lattice surgery protocol. For example, Reed-Muller and/or polar codes may be applied. Binary Reed-Muller codes may be defined as $[n, k, d]=[2^m, k, 2^{m-r}]$ codes for $r\leq m$ and wherein $$k = 2^m - \sum_{i=0}^{m-r-1}\binom{m}{i} = \sum_{i=o}^{r}\binom{m}{i}.$$

Codewords of a given (r, m)-Reed-Muller code may be determined by starting with an m-fold tensor product of a generator matrix $$\begin{bmatrix} 11 \\ 01 \end{bmatrix}$$

and removing $$\sum_{i=0}^{m-r-1}\binom{m}{i}$$

rows with fewer than d ones. Remaining k rows may then denote the resulting codewords of the given (r, m)-Reed-Muller code. Furthermore, polar codes may be defined as a type of Reed-Muller code wherein extra codewords of the Reed-Muller code are removed, lowest weight first, until there are as many encoded bits as exactly required, according to some embodiments. A person having ordinary skill in the art should understand that non-cyclic classical error-correcting codes, such as those described in this paragraph, may still be used to generate a cyclic codeword generator matrix, as various rows and/or columns of a given codeword generator matrix may be arranged so as to reduce a number of magic states that may need to be held in memory during performance of a given magic state distillation process, for example.

FIGS. 5A-5D illustrate performance of various classical error-correcting codes when using a hybrid error detection and correction temporally encoded lattice surgery (TELS) protocol to perform multi-qubit Pauli measurements with a given maximum physical error rate per multi-qubit Pauli measurement and four corresponding maximum logical error rates per multi-qubit Pauli measurement, shown in FIGS. 5A, 5B, 5C, and 5D, respectively, according to some embodiments. FIGS. 6A and 6B illustrate performance of various classical error-correcting codes when using a hybrid error detection and correction temporally encoded lattice surgery (TELS) protocol to perform multi-qubit Pauli measurements with another given maximum physical error rate per multi-qubit Pauli measurement and two corresponding maximum logical error rates per multi-qubit Pauli measurement, shown in FIGS. 6A and 6B, respectively, according to some embodiments.

In FIGS. 5A-6B, lowest achievable average runtimes per Pauli measurement for respective parallelizable Pauli sets of size $k \in \{2,3, \ldots 100\}$ using hybrid error detection and correction schemes during performance of temporally encoded lattice surgery protocols are plotted for different classical error-correcting codes as indicated in respective Keys of each figure. The average runtime per Pauli measurement as shown in FIGS. 5A-6B is defined as $T_{hybrid\ TELS}/k$ where $T_{hybrid\ TELS}$ has been defined by the equation discussed above, along with a method for calculating $p_L$, wherein $p_m$ and $d_m$ are used to minimize an average runtime per Pauli measurement while maintaining $p_L < \delta$.

Plots such as those shown in FIGS. 5A-6B also allow for a comparison in performance of hybrid error detection and correction schemes for temporally encoded lattice surgery protocols relative to a time taken to measure multi-qubit Pauli operators in an original parallelizable Pauli set $\mathcal{P}$ without using any temporally encoded lattice surgery protocol, which may also be referred to as "unencoded" lattice surgery herein. For example, an unencoded lattice surgery protocol is shown to take 14 syndrome measurement rounds per Pauli measurement in FIG. 5A.

Figure 5A:
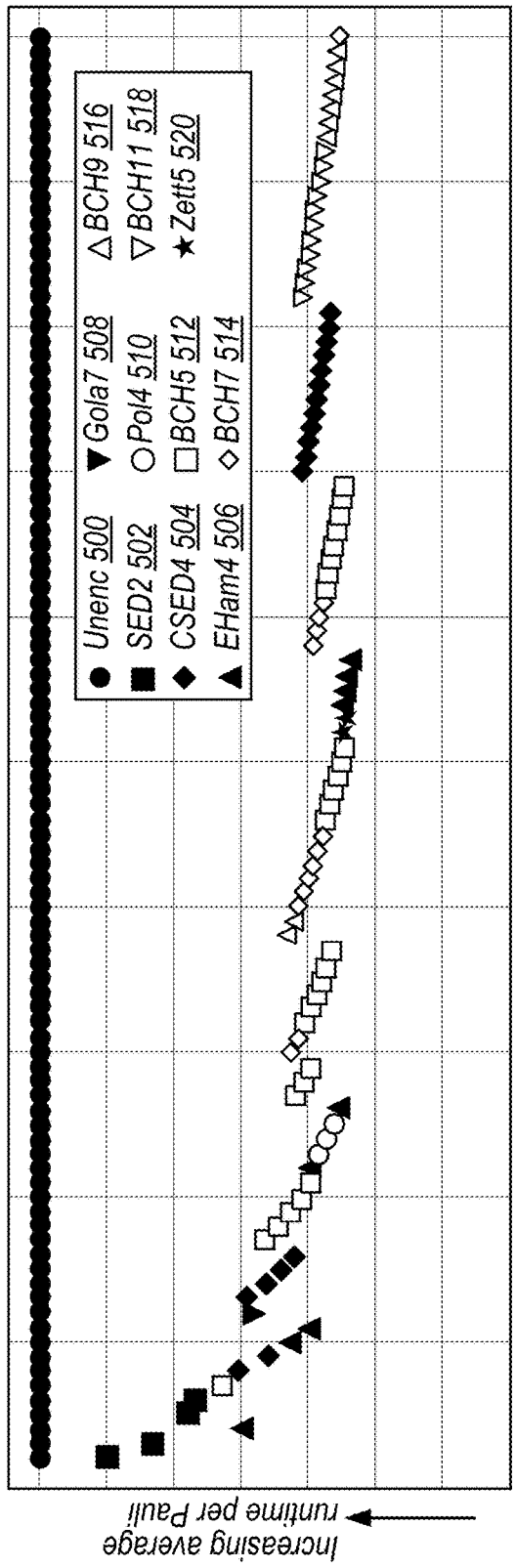
FIGS. 5A-5D illustrate performance of various classical error-correcting codes when using a hybrid error detection and correction temporally encoded lattice surgery (TELS) protocol to perform multi-qubit Pauli measurements with a given maximum physical error rate per multi-qubit Pauli measurement and four corresponding maximum logical error rates per multi-qubit Pauli measurement, shown in FIGS. 5A, 5B, 5C, and 5D, respectively, according to some embodiments.

In FIG. 5A, parallelizable Pauli sets of size $k \in \{2,3, \ldots 100\}$ are considered with conditions of $p=10^{-3}$, $\delta=10^{-10}$, and a maximum routing space of A=100. Different classical error-correcting codes 502-522 are considered in FIGS. 5A-5D which are abbreviated in the respective Keys. In FIG. 5A, a single error detect code with distance 2 (SED2), a concatenated single error detect code with distance 4 (CSED4), an extended Hamming code with distance 4 (EHam4), a Golay code with distance 7 (Gola7), a polar code with distance 4 (Pol4), BCH codes with distance 5, 7, 9, and 11 (BCH5, BCH7, BCH9, BCH11), and a Zetterberg code with distance 5 (Zett5) are considered, and said codes are compared to an unencoded lattice surgery protocol (Unenc). For example, for a parallelizable Pauli set of size k=20, a distance-5 BCH classical error-correcting code achieves the lowest average runtime per Pauli measurement among the classical error-correcting codes considered in the Key of FIG. 5A.

Figure 5B:
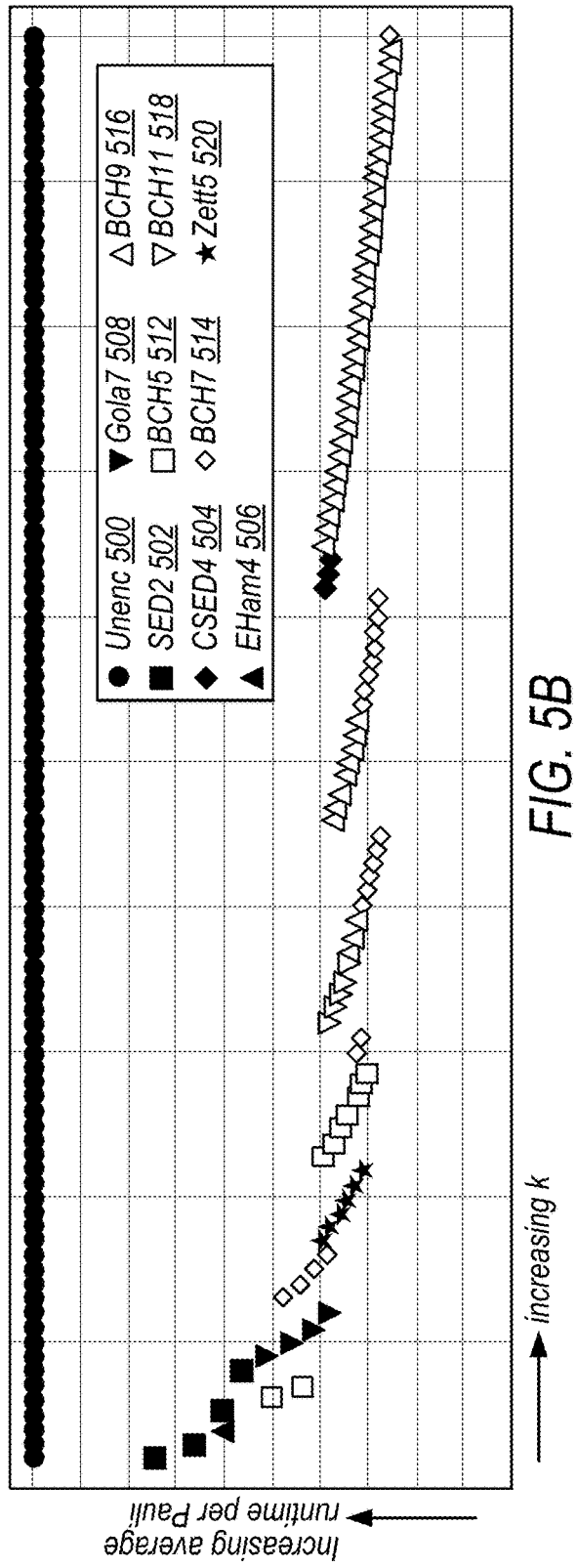
Figure 6A:
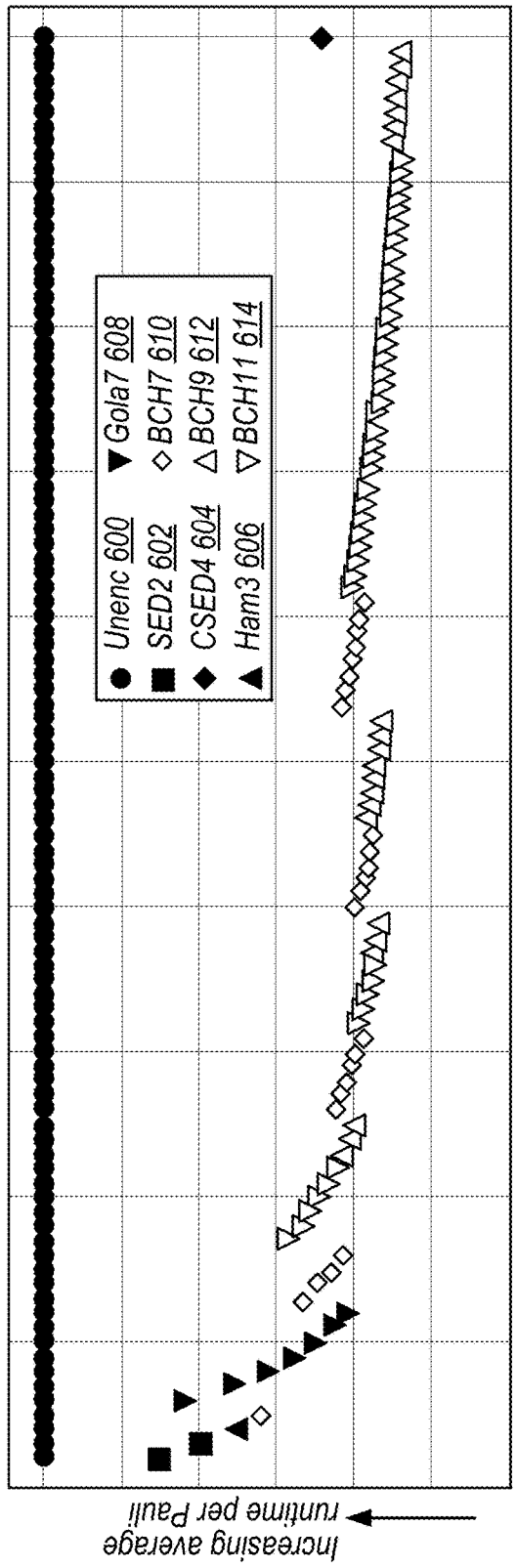
FIGS. 6A and 6B illustrate performance of various classical error-correcting codes when using a hybrid error detection and correction temporally encoded lattice surgery (TELS) protocol to perform multi-qubit Pauli measurements with another given maximum physical error rate per multi-qubit Pauli measurement and two corresponding maximum logical error rates per multi-qubit Pauli measurement, shown in FIGS. 6A and 6B, respectively, according to some embodiments.
Figure 6B:
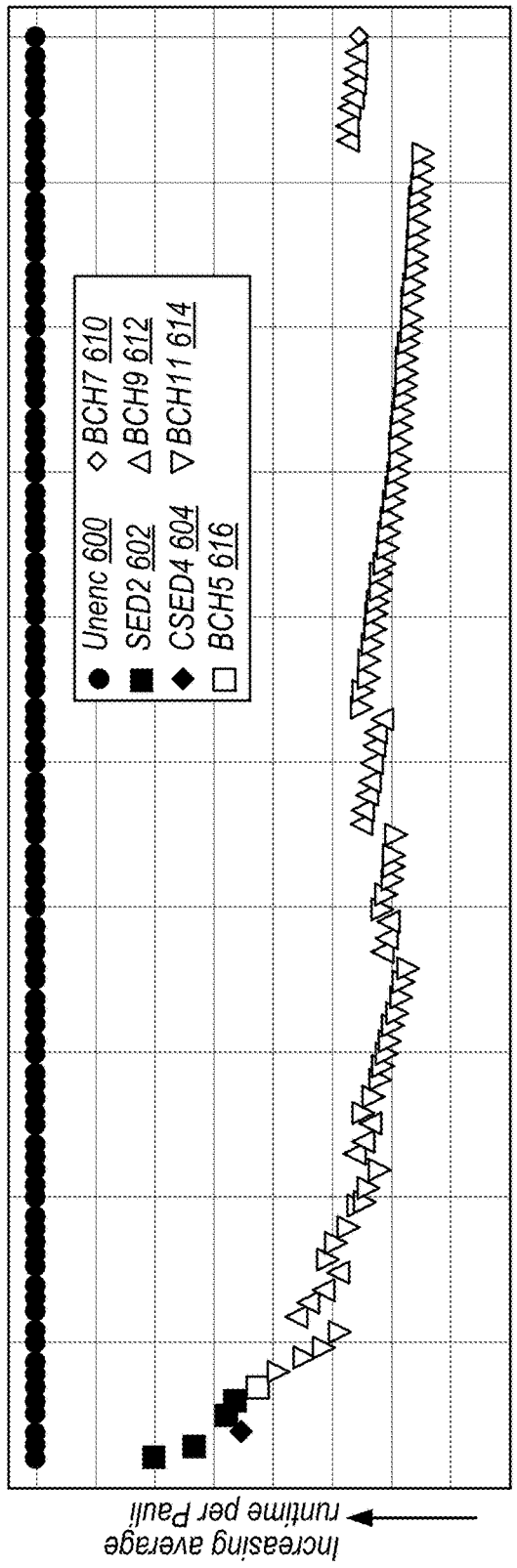

In FIG. 5B, parallelizable Pauli sets of size $k \in \{2,3, \ldots 100\}$ are considered with conditions of $p=10^{-3}$, $\delta=10^{-15}$, and A=100. A single error detect code with distance 2 (SED2), a concatenated single error detect code with distance 4 (CSED4), an extended Hamming code with distance 4 (EHam4), a Golay code with distance 7 (Gola7), BCH codes with distance 5, 7, 9, and 11 (BCH5, BCH7, BCH9, BCH11), and a Zetterberg code with distance 5 (Zett5) are considered, and said codes are compared to an unencoded lattice surgery protocol (Unenc).

Figure 5C:
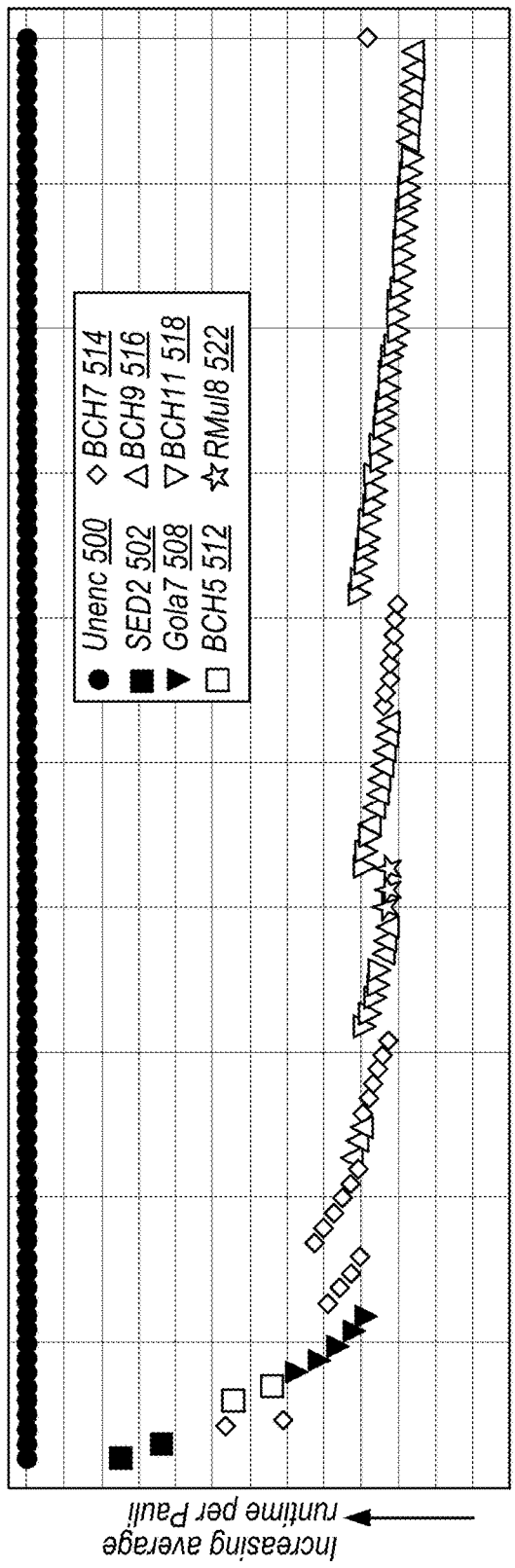

In FIG. 5C, parallelizable Pauli sets of size $k \in \{2,3, \ldots 100\}$ are considered with conditions of $p=10^{-3}$, $\delta=10^{-20}$, and A=100. A single error detect code with distance 2 (SED2), a Golay code with distance 7 (Gola7), BCH codes with distance 5, 7, 9, and 11 (BCH5, BCH7, BCH9, BCH11), and a Reed-Muller code with distance 8 (RMul8) are considered, and said codes are compared to an unencoded lattice surgery protocol (Unenc).

Figure 5D:
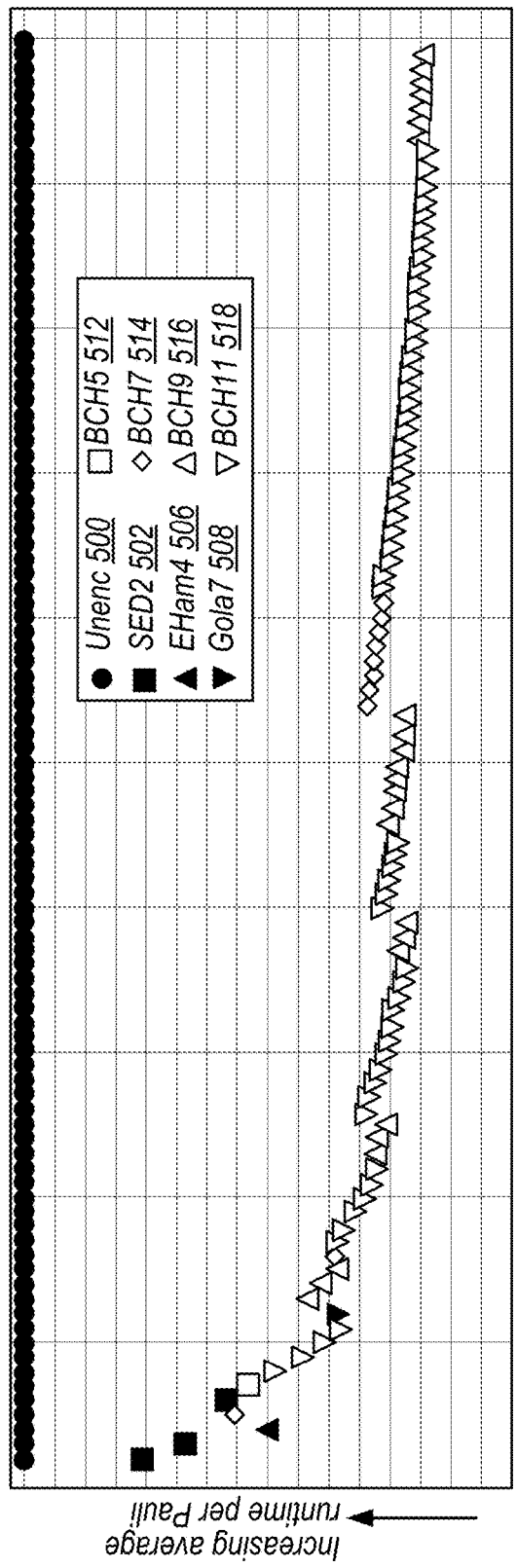

In FIG. 5D, parallelizable Pauli sets of size $k \in \{2,3, \ldots 100\}$ are considered with conditions of $p=10^{-3}$, $\delta=10^{-25}$, and A=100. A single error detect code with distance 2 (SED2), an extended Hamming code with distance 4 (EHam4), a Golay code with distance 7 (Gola7), and BCH codes with distance 5, 7, 9, and 11 (BCH5, BCH7, BCH9, BCH11) are considered, and said codes are compared to an unencoded lattice surgery protocol (Unenc).

In FIG. 6A, parallelizable Pauli sets of size $k \in \{2,3, \ldots 100\}$ are considered with conditions of $p=10^{-4}$, $\delta=10^{-15}$, and A=100. Different classical error-correcting codes 602-616 are considered in FIGS. 6A-6B which are abbreviated in the respective Keys. In FIG. 6A, a single error detect code with distance 2 (SED2), a concatenated single error detect code with distance 4 (CSED4), a Hamming code with distance 3 (Ham3), a Golay code with distance 7 (Gola7), and BCH codes with distance 7, 9, and 11 (BCH7, BCH9, BCH11) are considered, and said codes are compared to an unencoded lattice surgery protocol (Unenc).

In FIG. 6B, parallelizable Pauli sets of size $k \in \{2,3, \ldots 100\}$ are considered with conditions of $p=10^{-4}$, $\delta=10^{-20}$, and A=100. A single error detect code with distance 2 (SED2), a concatenated single error detect code with distance 4 (CSED4), and BCH codes with distance 5, 7, 9, and 11 (BCH5, BCH7, BCH9, BCH11) are considered, and said codes are compared to an unencoded lattice surgery protocol (Unenc).

In general, with a classical error-correcting code that is defined to encode k logical bits, temporally encoded lattice surgery protocols for parallelizable Pauli sets of any size up to k may be implemented. Furthermore, if a given parallelizable Pauli set is of size k-j, the Paulis associated with the remaining j logical bits of a chosen classical error-correcting code may be set to the identity, and when decoding measurement results of the given temporally encoded lattice surgery protocol, information corresponding to said extra logical bits may be disregarded.

The following general trends extracted via results shown in FIGS. 5A-6B are recognized, while noting that each unique combination of a given quantum algorithm and associated parallelizable Pauli set, maximum logical error rate, classical error-correcting code distance, noise rates of given quantum hardware being used, etc. may also contribute to a selection of a given classical error-correcting code, and that additional trends and/or decision-making may be applied in order to determine an optimal classical error-correcting code to be applied. In general, small classical error-correcting codes with low distance parameters perform well at small values of k, whereas at larger values of k, larger and higher distance classical error-correcting codes perform better. Moreover, for values of k >30, classical error-correcting codes from the BCH code family generally give the largest speedups. In general, to determine classical error-correcting codes that work well for a specific value of k, a first criteria may be to ensure that a rate of the code (k/n) is not too low. For example, given information shown in FIGS. 5A-6B, classical error-correcting codes with a rate less than ½ generally does not give the best speedups, according to some embodiments. A second criteria may be a consideration of a distance parameter d of the classical error-correcting code. High-distance classical error-correcting codes admit very low values of $$d'_m$$

at the cost of much higher probabilities of detecting a logical time-like failure, according to some embodiments. Error correction for smaller weight errors may be used to reduce the detection rate as long as the logical failure rate per Pauli is below the target δ.

Figure 7:
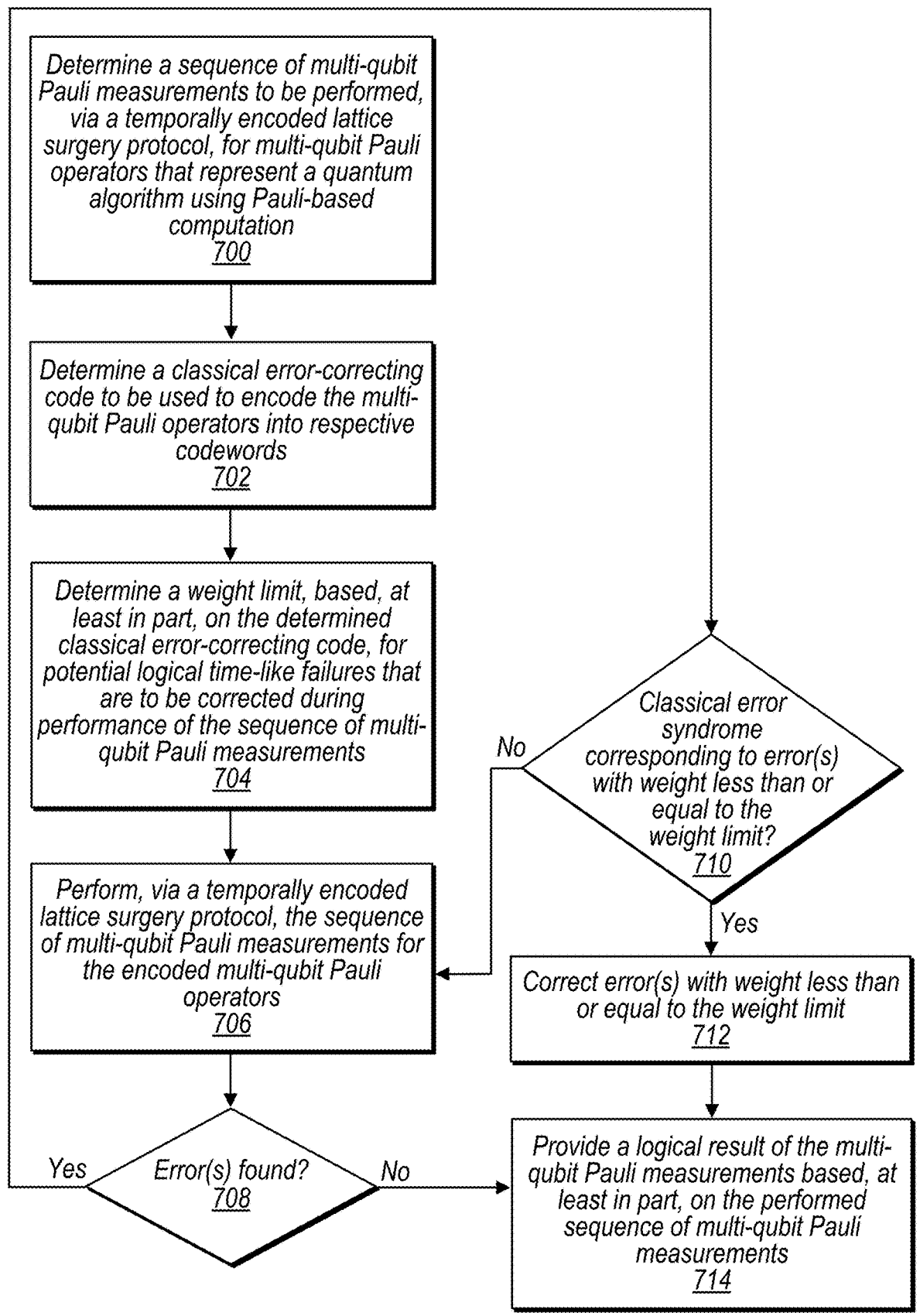
FIG. 7 is a flow diagram illustrating a process of applying a hybrid error detection and correction scheme during performance of a temporally encoded lattice surgery (TELS) protocol, according to some embodiments.

FIG. 7 is a flow diagram illustrating a process of applying a hybrid error detection and correction scheme during performance of a temporally encoded lattice surgery (TELS) protocol, according to some embodiments.

In block 700, a sequence of multi-qubit Pauli measurements are determined, wherein the multi-qubit Pauli measurements may be represented via multi-qubit Pauli operators that represent a given quantum algorithm using Pauli-based computation. As discussed above with regard to FIG. 1, the multi-qubit Pauli operators may be arranged into subsequence(s) such that they commute, and such subsequences may be defined as parallelizable Pauli sets of size k. The multi-qubit Pauli measurements will be performed during a temporally encoded lattice surgery protocol that applies a hybrid error detection and correction scheme in order to execute the quantum algorithm and provide a logical result.

In block 702, a classical error-correcting code is chosen which will be used to encode a series of multi-qubit Pauli operators into respective codewords during performance of multi-qubit Pauli measurements (e.g., multi-qubit Pauli measurements for a given quantum algorithm). Examples of classical error-correcting codes may include Single Error Detect (SED), Hamming (Hamm), Concatenated Single Error Detect (CSED), Extended Hamming (EHamm), Golay (Gola), Extended Golay (EGol), Doubly Concatenated Single Error Detect (DCSED), Reed-Muller (RM), Polar (Pol), Zetterberg (Zett), Bose-Chaudhuri-Hocquenghem (BCH), and/or other examples of classical error-correcting codes that may be used as part of a temporally encoded lattice surgery protocol that applies a hybrid error detection and correction scheme. A person having ordinary skill in the art should understand that the above classical error-correcting codes are meant to be examples of classical error-correcting codes that may be applied in temporally encoded lattice surgery protocols such as those described herein, and are not meant to be restrictive in nature as to types of classical error-correcting codes and/or distances of classical error-correcting codes that may be applied.

Determination of a classical error-correcting code may be specific to conditions and/or parameters of a corresponding quantum algorithm that is being executed, according to some embodiments. For example, some classical error-correcting codes may perform more efficiently than other classical error-correcting codes in a given noise regime, and vice versa. In another example, some classical error-correcting codes may or may not be compatible with a given size k of a given parallelizable Pauli set used in a Pauli-based computation representation of a given quantum algorithm. In some embodiments, a classical error-correcting code may be selected based, at least in part, on a size k of a given parallelizable Pauli set, a distance d of a given classical error-correcting code, an error rate tolerance δ (e.g., an error rate tolerance based, at least in part, on a logical error rate per multi-qubit Pauli operator within a given quantum algorithm), and/or any other parameters that may be relevant to performance of a given quantum algorithm, to performance of a given quantum algorithm on a given type of topological quantum code, etc. (See also the discussion of general trends for selecting a classical error-correcting code above with regard to FIGS. 5A-6B.)

In block 704, a weight limit for errors that are to be corrected (as opposed to errors that are to be detected) during performance of the given multi-qubit Pauli measurements may be determined. In a hybrid error detection and correction scheme, such as those described herein, an amount of re-measurement rounds, and therefore time-like cost of lattice surgery protocols, may be reduced by correcting (e.g., instead of detecting, as in previous detection-only schemes) errors up to a weight of c, wherein c is less than d, and detecting (and causing remeasurement, as discussed with regard to block 710) errors with weight larger than c. In such embodiments, c may be defined as a weight limit for errors that are to be corrected during performance of the given temporally encoded lattice surgery protocol. In order to determine weight limit c for a given set of conditions (e.g., size k of a parallelizable Pauli set, distance d of a given classical error-correcting code, tolerable noise rate δ, etc.), a tradeoff between a logical error rate of the encoded measurements of a given temporally encoded lattice surgery protocol and an amount of time saved due to fewer re-measurement rounds may be evaluated. Furthermore, determining a weight limit may subsequently define a set of classical error syndromes that are to be corrected during performance of the given multi-qubit Pauli measurements. For example, if a logical time-like failure occurs wherein it is determined that the failure corresponds to one of the classical error syndromes of the set that are to be corrected and its weight is less than or equal to the determined weight limit, the error is corrected. In another example, if a logical time-like failure with an error of weight greater than the determined weight limit occurs but wherein the error corresponds to one of the classical error syndromes of the set that are to be corrected, the error is corrected. In yet another example, if a logical time-like failure with an error of weight greater than the determined weight limit occurs and wherein the error does not correspond to one of the classical error syndromes of the set that are to be corrected, the error is detected and causes a remeasurement (e.g., see block 710).

In block 706, a temporally encoded lattice surgery protocol is performed such that multi-qubit Pauli measurements (e.g., according to a given quantum algorithm) are executed for an encoded series of multi-qubit Pauli operators, wherein the multi-qubit Pauli operators have been encoded into codewords according to the selected classical error-correcting code of block 702. As discussed above, this may include an overcomplete set of Pauli operators. Multi-qubit Pauli measurements may be performed via lattice surgery measurements which in turn are performed using two or more topological code patches of a quantum computer, implemented via quantum hardware device(s). Lattice surgery measurements are further discussed with regard to at least FIGS. 2A-2C herein.

In block 708, an error-correction phase of the temporally encoded lattice surgery protocol described in FIG. 7 begins wherein, if time-like lattice surgery measurement failures are found, computing device(s) (e.g., computing device 2400) executing the hybrid error detection and correction scheme trigger detection/correction events based on classical error syndromes of the time-like lattice surgery measurement failures. As described above with regard to block

704, classical error syndromes that correspond to errors that have weight less than or equal to c trigger an error-correction component of the hybrid error detection and correction scheme, and are corrected in block 712. However, other classical error syndromes (e.g., classical error syndromes that are not within a set determined by the weight limit c) trigger an error detection component of the hybrid error detection and correction scheme, and cause the multi-qubit Pauli measurements of block 706 to be repeated onto the encoded multi-qubit Pauli operators (e.g., remeasurements 404). If no errors are found at block 708, and/or once errors are corrected (e.g., through error-correction and/or through re-measurement rounds), the computing device(s) (e.g., computing device 2400) may cause a logical result of the multi-qubit Pauli measurements to be provided according to block 714.

TELS-Based Magic State Distillation

In some embodiments, temporally encoded lattice surgery (TELS) protocols may also be applied in a context of magic state distillation processes. Such processes are referred to herein as TELS-based magic state distillation processes. In some embodiments, TELS-based magic state distillation processes may be implemented using a biased circuit-level noise model and may involve encoding logical qubits into rectangular (e.g., asymmetrical) patches of topological quantum code(s). It may be advantageous to use rectangular code patches as rectangular code patches may require fewer qubits to achieve a target logical failure given certain physical error rates (e.g., $p=10^{-3}$, $p=10^{-4}$, etc.) as compared to other topological quantum codes (e.g., XZZX codes, XY codes, codes that use symmetrical code patches, etc.). Furthermore, rectangular patches (see description for distillation tile designs with regard to FIGS. 10A-22 herein), may help minimize potentially wasted space when tiled on a two-dimensional grid of qubits implemented in a magic state factory via quantum hardware device(s).

As introduced above, achieving universal quantum computation remains one of the grand challenges for the scientific community, and topological quantum codes (e.g., surface codes, color codes, other codes in which lattice surgery may be applied, etc.), in combination with magic state distillation and lattice surgery, are leading candidates for performing such universal quantum computation. In some embodiments, universal quantum computing designs may be achieved by implementing both Clifford and non-Clifford gates into topological codes. Examples of Clifford gates may include Hadamard, Phase gates, CNOT gates, and Pauli gates. Examples of non-Clifford gates may include rotations about one of the Bloch sphere axes by angles of $j\pi/8$ where $j \in \{1, \frac{1}{2}, \frac{1}{4}, \ldots\}$, multiple controlled-Z gates $C^jZ$, where $j \geq 2$, etc. Implementation of logical non-Clifford gates into topological codes, however, may be challenging. Such challenges may be mitigated by use of magic states as resource states along with stabilizer operations in order to perform gate teleportation.

In some embodiments, magic states may be generated by preparing a physical magic state and subsequently performing a gauge fixing step which may encode the physical magic state into a logical qubit patch (e.g., surface code patch 200, surface code patch 202, etc.). However, this may result in a noisy (e.g., low fidelity) encoded magic state. In order to achieve less noisy (e.g., high fidelity) magic states, such encoded magic states may then be injected into a magic state distillation process, wherein a quantum error-correcting code, along with stabilizer operations, are used to detect logical failures that may be present on the injected magic states, according to some embodiments. Such magic state distillation processes may also be concatenated to achieve any desired target (e.g., maximum) logical failure rate. As discussed in methods and techniques described herein, temporally encoded lattice surgery (TELS) protocols may also be applied to magic state distillation processes in order to reduce space-time costs of such processes.

In some embodiments, encoded magic states that may be injected into a magic state distillation process may be generated using rectangular surface codes in the presence of biased noise. In some example embodiments discussed in the following paragraphs, rectangular surface codes (e.g., Calderbank-Shor-Steane (CSS) codes) are chosen, along with a circuit-level noise model with a bias of $\eta=10^2$, and it may be considered that for values of physical noise rate parameter $p \leq 10^{-3}$, injected magic states may have logical error rates of less than p. A logical error rate of injected magic states may therefore be defined as $$\epsilon_{L,X} = \epsilon_{L,Y} = \frac{p}{3\eta}$$

and $$\epsilon_{L,Z} = \frac{p}{3},$$

wherein $\epsilon_{L,P}$ is the probability of a logical Pauli P error when injecting a given prepared magic state, and $$\epsilon_L = \epsilon_{L,X} + \epsilon_{L,Y} + \epsilon_{L,Z} = \frac{p}{3} + \frac{2p}{3\eta}.$$

A person having ordinary skill in the art should understand that the following description given the above chosen parameters is not meant to be restrictive, and that other variations of codes (e.g., XZZX code, etc.), noise model biases (e.g., $\eta=10^3$, $\eta=10^4$, etc.) may similarly be chosen and are meant to be included in the discussion herein. Also in the following paragraphs, it is understood that the probability that an injected magic state preparation succeeds may be greater than 99% for $p \leq 10^{-3}$, and therefore a time taken to prepare a magic state may be approximated as $T_{inj}=2/0.99$ syndrome measurement rounds for $p=10^{-3}$, and $T_{inj}=2/0.995$ syndrome measurement rounds for $p=10^{-4}$. Such boundaries for $T_{inj}$ may be important considerations for temporally encoded lattice surgery protocols discussed herein, as, in some embodiments, a time for each individual Pauli measurement may be as low as two syndrome measurement rounds.

In addition, a person having ordinary skill in the art should understand that circuit-level noise, as described herein, may be defined as an ability to treat error-types such as at least errors pertaining to single and/or multi-qubit gates between qubits of a quantum topological code, measurement errors pertaining to rounds of syndrome measurements, errors pertaining to ancilla qubit reset timesteps in respective rounds of syndrome measurements, errors pertaining to idling of qubits of a quantum surface code, etc. In addition, circuit-level noise may encompass treatment of crosstalk errors (e.g., spatial and/or temporal crosstalk errors), and/or errors caused by leakage outside of a code space for a given qubit.

As introduced above, a magic state distillation process may take a number of noisy (e.g., low fidelity) magic states as input, and, by performing stabilizer operations and error detection, yield fewer "distilled" magic states than the number of noisy magic states that served as input but of much higher fidelity. In some embodiments, output yield of the distilled magic states and error probability of the input magic states may be based, at least in part, on the type of quantum code used for the distillation. For example, a class of distance-2 quantum codes may be used to distill k magic states from 3k+8 input magic states, according to some embodiments.

A 15-to-1 magic state distillation process, for example, may be transformed into a series of 11 commuting multi-qubit Pauli measurements, which forms a parallelizable Pauli set of size k=11, and thus a temporally encoded lattice surgery protocol may be used to reduce the runtime required to measure each multi-qubit Pauli operator of the 11 commuting measurements. In addition to a 15-to1 magic state distillation process, which may also be referred to herein as a ⟦15,1,3⟧ process, several triorthogonal codes admitting transversal T-type gates that are constructed by puncturing a [128,29,32] classical Reed-Muller error-correcting code are also considered, namely those that are derived from ⟦125, 3,5⟧, ⟦116,12,4⟧, and ⟦114,14,3⟧ quantum codes. In some embodiments it may be beneficial to consider quantum codes of different distances as this allows for distilling magic states across a range of target logical error probabilities.

In some embodiments, such as those shown in FIGS. 8A-22, 15-to-1 magic state distillation, 125-to-3 magic state distillation, 116-to-12 magic state distillation, and 114-to-14 magic state distillation processes are considered. A person having ordinary skill in the art should understand that examples of 15-to-1, 125-to-3, 116-to-12, and 114-to-14 magic state distillation processes, such as those shown herein, are meant to be exemplary embodiments used to discuss how TELS-based magic state distillation, such as those types of procedures discussed herein, may result in reducing space-time costs during such magic state distillation procedures, and are not meant to be restrictive. A choice of magic state distillation design is a balance between having a good output-to-input magic state ratio, and many other design choices are considered when optimizing said ratio, including, but not limited to: a choice of concatenating such magic state distillation procedures, a choice on whether or not to focus on measuring stabilizers of an outer code using operations that are transversal for an inner code, a choice of generalization to triorthogonal codes, a use of puncturing Reed-Muller codes, etc.

In some embodiments, it may be advantageous to reduce space-time costs of a magic state distillation process by optimizing a tradeoff between a number of rounds of measurements performed during lattice surgery (e.g., a "time" cost) and sizes of surface code and/or surface code patches used to perform magic state distillation (e.g., a "space" cost). A promising method for reducing space-time costs of magic state distillation processes is to apply a temporally encoded lattice surgery (TELS) protocol, such as those described herein. In examples shown throughout FIGS. 8A-22, variations of TELS-based magic state distillation processes are contrasted to unencoded magic state distillation processes (e.g., processes with no temporal encoding) in order to demonstrate such space-time savings.

Figure 8A:
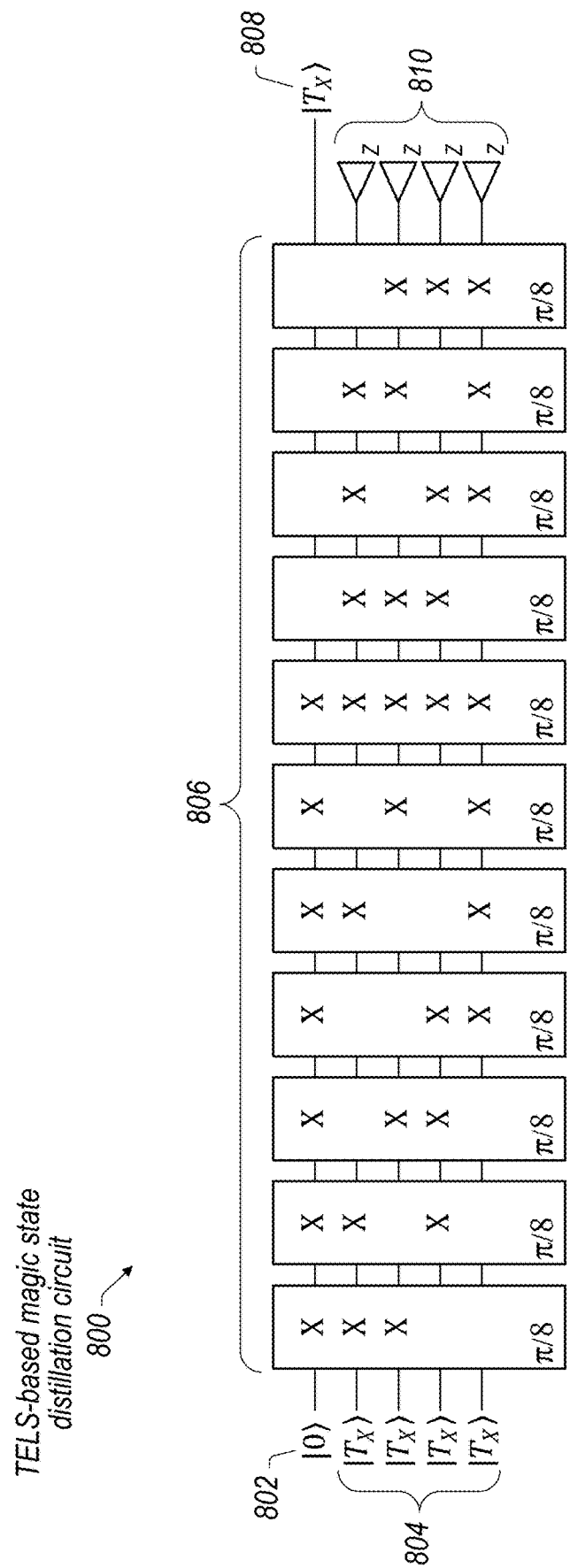
FIG. 8A illustrates a magic state distillation circuit for generating high-fidelity |T⟩-type magic states based, at least in part, on a use of a temporally encoded lattice surgery (TELS) protocol, according to some embodiments.

In some embodiments, it may be advantageous to apply Hadamard transformations to magic state distillation circuits to produce circuits consisting of pure multi-qubit Pauli X measurements, such as that which is shown in FIG. 8A, as opposed to traditional magic state distillation circuits which consist of multi-qubit Pauli Z measurements. Such a transformation may reduce space-time costs of magic state distillation factories, as only the shorter logical X boundary of a given rectangular surface code patch (see "shorter boundary" and "longer boundary" labels on rectangular cell 1100 in FIG. 11A) is accessed via a routing space.

FIG. 8A illustrates a magic state distillation circuit for generating high-fidelity |T⟩-type magic states based, at least in part, on a use of a temporally encoded lattice surgery (TELS) protocol, according to some embodiments.

In order to obtain space-time costs of various TELS-based magic state distillation processes, a distillation circuit, such as TELS-based magic state distillation circuit 800, may be designed such that a high-fidelity distilled magic state (e.g., distilled $|T_X⟩$-type magic state 808) up to a Clifford correction is outputted from the distillation circuit via a magic state distillation process, according to some embodiments. In such a magic state distillation process, input magic states, such as input $|T_X⟩$-type magic states 804, may be injected via a magic state injection process, such as that which is described above. A person having ordinary skill in the art should understand that while FIG. 8A depicts an example distillation circuit for 15-to-1 magic state distillation, the methods and techniques described herein may be expanded to include additional types of magic state distillation (125-to-3, 116-to-12, 114-to-14, etc.) and that FIG. 8A is not meant to be misconstrued as restrictive to methods in which temporally encoded lattice surgery protocols may be applied to magic state distillation in order to improve space-time costs of such processes. Furthermore, while a 15-to-1 magic stage distillation process is configured to produce one distilled magic state, other types of magic stage distillation may be configured to produce multiple distilled magic states, according to some embodiments.

In some embodiments, a distillation circuit, may include be broken down in to two stages. Note that horizontal lines in TELS-based magic state distillation circuit 800 represent lattice surgery measurements made using topological surface code patches (see description for FIGS. 2A-2C herein). In a first stage, non-Clifford gates, such as non-Clifford gates 806, are applied to input $|T_X⟩$-type magic states 804 and one or more ancilla qubits initialized to a |0⟩ state using temporally encoded lattice surgery. If a non-trivial lattice surgery measurement failure is detected at any point during performance of non-Clifford gates 806, physical qubits in a corresponding distillation tile wherein the distillation process is being performed are reset and the TELS-based magic state distillation process restarts. In some embodiments, a given temporally encoded lattice surgery protocol used during this first stage may apply a hybrid error detection and correction scheme, such as those which are described herein (see FIG. 4), wherein classical error syndromes that correspond to errors with weights equal to or less than a given weight limit of c may be corrected before signaling that a lattice surgery measurement failure has occurred, while other classical error syndromes (e.g., classical error syndromes that are not within a set of errors defined via c that are to be corrected) are detected and cause the TELS-based magic state distillation process to restart. Alternatively, a given temporally encoded lattice surgery protocol used during this first stage may apply a detect-only temporally encoded lattice surgery protocol, such as that which is shown in FIG. 3, according to some embodiments. Applying a detect-only temporally encoded lattice surgery protocol, however, may require that more magic states would need to be simultaneously held in memory within a magic state factory than if a hybrid error detection and correction scheme had been applied, and hence quantum hardware requirements would be larger. If a temporally encoded lattice surgery protocol applied during the first stage is successful (e.g., no logical time-like failure has been detected and caused a restart in a most recent round of the first stage of TELS-based magic state distillation), a result is a high-fidelity distilled magic state up to a Clifford frame, such as distilled $|T_X\rangle$-type magic state 808, prior to performing logical single-qubit measurements 810.

In a second stage of TELS-based magic state distillation circuit 800, the Clifford frame is conjugated through logical single-qubit measurements, such as logical single-qubit measurements 810, which may also be described as multi-qubit $\pi/2$ Pauli measurements implemented via lattice surgery (see also the description pertaining to block 908 herein). It may be noted that these multi-qubit $\pi/2$ Pauli measurements may now be described as tensor products of arbitrary Paulis, and not just 1 and X. Such multi-qubit $\pi/2$ Pauli measurements may also benefit from time savings caused by applying a temporally encoded lattice surgery protocol (e.g., a hybrid detection and correction scheme, a detection only scheme, etc.), according to some embodiments. It may be noted that a distillation circuit such as TELS-based magic state distillation circuit 800 may produce a Hadamard-transformed distilled $|T_X\rangle$-type magic state, which is referred to herein as H$|T\rangle$.

Figure 8B:
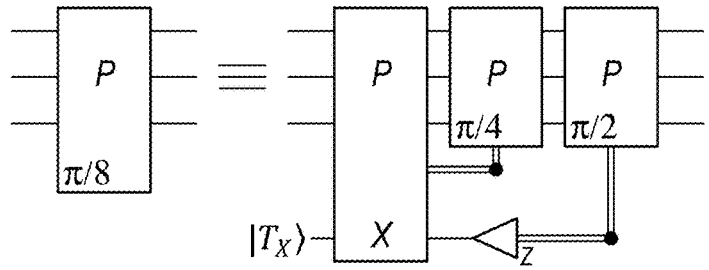
FIG. 8B illustrates an example of a non-Clifford gadget that may be used to perform a non-Clifford gate within a magic state distillation circuit, such as that which is shown in FIG. 8A, according to some embodiments.
Figure 8C:
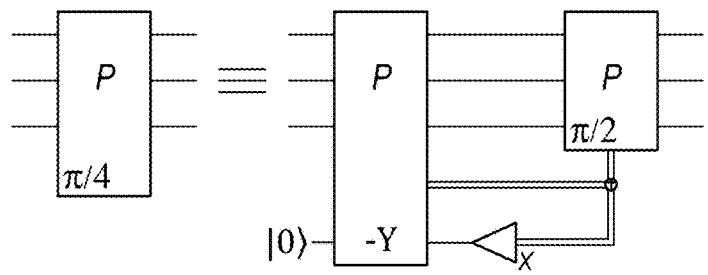
FIG. 8C illustrates an example of a Clifford measurement gadget that may be used to perform a Clifford gate within a magic state distillation circuit, such as that which is shown in FIG. 8A, according to some embodiments.
Figure 8D:
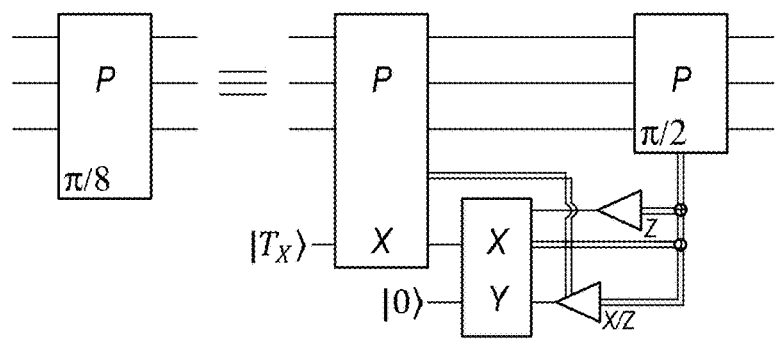
FIG. 8D illustrates an example of an autocorrected non-Clifford gadget that may be used to perform a non-Clifford gate within a magic state distillation circuit, such as that which is shown in FIG. 8A, according to some embodiments.

FIG. 8B illustrates an example of a non-Clifford gadget that may be used to perform a non-Clifford gate within a magic state distillation circuit, such as that which is shown in FIG. 8A, according to some embodiments. FIG. 8C illustrates an example of a Clifford measurement gadget that may be used to perform a Clifford gate within a magic state distillation circuit, such as that which is shown in FIG. 8A, according to some embodiments. FIG. 8D illustrates an example of an autocorrected non-Clifford gadget that may be used to perform a non-Clifford gate within a magic state distillation circuit, such as that which is shown in FIG. 8A, according to some embodiments.

In order to perform non-Clifford and Clifford gates of a given distillation circuit such as TELS-based magic state distillation circuit 800, gate gadgets such as those shown in FIGS. 8B and 8C may be applied, according to some embodiments. A non-Clifford gate of non-Clifford gates 806 may be rewritten as non-Clifford measurement gadget 820 for performing $\pi/8$ multi-qubit Pauli measurement, as shown in FIG. 8B, and, in turn, a $\pi/4$ multi-qubit Pauli measurement used to perform non-Clifford measurement gadget 820 may be rewritten as Clifford measurement gadget 840, according to some embodiments. Furthermore, as a Clifford frame is conjugated through to the second stage wherein logical single-qubit measurements are performed, $\pi/4$ Clifford gates need not be performed, as such gates may be converted to $\pi/2$ multi-qubit Pauli measurements, as shown in Clifford measurement gadget 840 of FIG. 8C. In some embodiments, a circuit gadget for an auto-corrected non-Clifford gate, such as non-Clifford measurement gadget 860, may alternatively be used (e.g., as opposed to non-Clifford measurement gadget 820), as said circuit gadget may not require an application of conditional Clifford gates to logical data qubits. There may be a tradeoff, however, with non-Clifford measurement gadget 860 requiring an additional ancilla qubit initialized in a $|0\rangle$ state.

After a Clifford frame is conjugated through logical single-qubit measurements of a given distillation circuit (e.g., logical single-qubit measurements 810 of TELS-based magic state distillation circuit 800), output distilled magic states are correct up to a Clifford correction. Furthermore, output distilled magic states such as distilled $|T_X\rangle$- type magic state 808 may be written as $|T_X\rangle$, $X_{\pi/4}|T_X\rangle$, $X_{\pi/2}|T_X\rangle$, or $X_{3\pi/4}|T_X\rangle$, as explained in the following paragraphs.

In some embodiments, wherein non-Clifford gates may be implemented using Pauli measurements, such as in TELS-based magic state distillation circuit 800, a Clifford frame of the resulting distilled magic state(s) may be of powers of $X_{\pi/4}$. Following a first stage of TELS-based magic state distillation circuit 800, a Clifford frame may consist of a sequence of Clifford rotations which are tensor products of X and 1. In the example that follows, a $(X \otimes X)_{\pi/4}$ gate is considered, wherein a $(X \otimes X)_{\pi/4}$ gate is applied to an input $|T_X\rangle \otimes |\psi\rangle$ state and $|\psi\rangle = \alpha|0\rangle + \beta|1\rangle$ is some arbitrary state, in order to determine an effect of a $(X \otimes X)_{\pi/4}$ rotation on said subsystem of a distilled magic state and determine a final Clifford frame of said distilled magic state:

$$(X \otimes X)_{\pi/4}|T_X\rangle \otimes |\psi\rangle = \begin{bmatrix} \frac{1}{\sqrt{2}} & 0 & 0 & \frac{-i}{\sqrt{2}} \\ 0 & \frac{1}{\sqrt{2}} & \frac{-i}{\sqrt{2}} & 0 \\ 0 & \frac{-i}{\sqrt{2}} & \frac{1}{\sqrt{2}} & 0 \\ \frac{-i}{\sqrt{2}} & 0 & 0 & \frac{1}{\sqrt{2}} \end{bmatrix} \cdot \frac{1}{\sqrt{2}} \begin{bmatrix} \left(1 + e^{\frac{i\pi}{4}}\right)\alpha \\ \left(1 + e^{\frac{i\pi}{4}}\right)\beta \\ \left(1 - e^{\frac{i\pi}{4}}\right)\alpha \\ \left(1 - e^{\frac{i\pi}{4}}\right)\beta \end{bmatrix}.$$

Tracing out said subsystem of the distilled magic state that started with $|\psi\rangle$, a following state on the subsystem of the magic state (up to a global phase) may be obtained:

$$tr_{|\psi\rangle}((X \otimes X)_{\pi/4}|T_X\rangle \otimes |\psi\rangle) = \begin{bmatrix} \left(1 + e^{\frac{i\pi}{4}}\right) - i\left(1 - e^{\frac{i\pi}{4}}\right) \\ \left(1 - e^{\frac{i\pi}{4}}\right) - i\left(1 + e^{\frac{i\pi}{4}}\right) \end{bmatrix}$$

which may be equivalent to $X_{\pi/4}|T_X\rangle$, which may then be written as:

$$X_{\pi/4}|T_X\rangle = \begin{bmatrix} \left(1 + e^{\frac{i\pi}{4}}\right) - i\left(1 - e^{\frac{i\pi}{4}}\right) \\ \left(1 - e^{\frac{i\pi}{4}}\right) - i\left(1 + e^{\frac{i\pi}{4}}\right) \end{bmatrix}$$

The above mathematical proof demonstrates that if there is a Clifford operator in a Clifford frame with X support on a given magic state qubit, it may essentially result in a $X_{\pi/4}$ Clifford frame update on said magic state, according to some embodiments. It then follows that, with more than one Clifford correction in a Clifford frame, a total rotation accumulated on the magic state qubit is then the product of $X_{\pi/4}$ rotations for all Cliffords in the Clifford frame that contain an X operator on the support of the magic state qubit.

Continuing with the above description, when using a distilled magic state of a distillation circuit, such as TELS-based magic state distillation circuit 800, in a given quantum algorithm, the final magic state measurement axis may be modified depending on the Clifford frame. If magic states are prepared in a Pauli frame (see FIG. 8D) rather a Clifford frame, such magic states would be measured in the Z basis using transversal single-qubit measurements (see FIG. 8B), according to some embodiments. However, for the Clifford frame, the measurement basis may now be −Y, −Z, Y given that $$X_{\pi/4}ZX_{\pi/4}^{\dagger} = -Y, X_{\pi/2}ZX_{\pi/2}^{\dagger} = -Z, X_{3\pi/4}ZX_{3\pi/4}^{\dagger} = Y.$$

$$X_{\pi/4}ZX_{\pi/4}^{\dagger} = -Y, X_{\pi/2}ZX_{\pi/2}^{\dagger} = -Z, X_{3\pi/4}ZX_{3\pi/4}^{\dagger} = Y.$$

$$X_{\pi/4}ZX_{\pi/4}^{\dagger} = -Y, X_{\pi/2}ZX_{\pi/2}^{\dagger} = -Z, X_{3\pi/4}ZX_{3\pi/4}^{\dagger} = Y.$$

For magic state distillation processes that distill multiple magic states, the Clifford frame of the distilled states may contain multi-qubit operators. After the distilled states are used by non-Clifford gates in a processing core of a quantum computer, the Clifford frame may be further conjugated through the remaining single-qubit Z measurements. This may result in further multi-qubit Pauli measurements and use of additional routing space area in order to access Y and Z logical boundaries of the distilled magic states.

It may be advantageous to minimize space cost when preparing a TELS-based magic state distillation process, according to some embodiments. Distillation tiles may be described as essential building blocks of fault-tolerant universal quantum computers, and therefore consideration for optimizing distillation tile layouts may be considered as part of this preparation. For example, TELS-based magic state distillation circuit 800 may require 11 non-Clifford gates that each requires an input $|T_X\rangle$-type magic state, as shown in non-Clifford measurement gadget 820. In some embodiments, a temporally encoded lattice surgery protocol may be used to perform the 11 non-Clifford gates, and therefore 11 magic states may be needed to be held in memory (see also FIG. 4). However, time savings may be promoted by optimizing a number of magic states that may need to be held in memory: a magic state may only need to be stored for as long as a corresponding Pauli it was associated with from an original parallelizable Pauli set $\mathcal{P}$ appears in a sequence of new measurements $\mathcal{S}$, according to some embodiments. Consequently, magic states may not need to be stored for an entire length of a temporally encoded lattice surgery protocol if such optimizations are used, according to some embodiments. For example, a temporally encoded lattice surgery protocol for a parallelizable Pauli set of size k=3 may be considered in which each Pauli measurement requires use of a magic state: A [4,3,2] single error detect classical error-correcting code may be chosen to be applied during said temporally encoded lattice surgery protocol wherein a corresponding cyclic codeword generator matrix may be defined as $$G = \begin{bmatrix} 1100 \\ 0110 \\ 0011 \end{bmatrix}.$$

As such, new multi-qubit Pauli measurements from $\mathcal{S}$ may be written as $\{P_1, P_1P_2, P_2P_3, P_3\}$, wherein, after a measurement of $P_1P_2$, a magic state associated with $P_1$ does not need to be accessed again. At such a moment in time, quantum hardware holding the magic state used for the $P_1$ multi-qubit Pauli measurement may be reset to prepare a magic state required for $P_3$ measurements, according to some embodiments. As $P_1$ does not appear in any of the measurements after the first occurrence of $P_3$ in this example, the magic states associated with $P_1$ and $P_3$ are not simultaneously accessed.

As demonstrated above, a choice of classical error-correcting code and a subsequent ordering of associated codewords may result in a smaller quantity of $|T_X\rangle$-type magic states that need to be stored, according to some embodiments. Furthermore, for classical error-correcting codes that are cyclic, a cyclic description of a codeword generator matrix may further reduce a number of magic states needed to be held in memory. In general, in order to determine how many magic states may need to be held in memory at any given time during a given temporally encoded lattice surgery protocol, a number of rows between a first "1" and a last "1" in a given column of a cyclic description of a codeword generator matrix may denote said number of magic states. Moreover, a maximum number of $|T_X\rangle$-type magic states that may be required for any of columns of a cyclic description of a codeword generator matrix is also a maximum number for an entire parallelizable Pauli set, according to some embodiments.

Using a TELS-based magic state distillation circuit such as that which is shown in FIG. 8A, a time taken to successfully complete one round of magic state distillation (e.g., wherein no logical time-like failure is detected) may be calculated as follows: Let $T_1$ be a time taken to implement a given temporally encoded lattice surgery protocol on non-Clifford gates of the distillation circuit and $T_2$ be a variable time associated with final multi-qubit π/2 Pauli measurements of the distillation circuit, wherein $T_2=0$ if there are no updates to the Clifford frame. If a logical time-like failure during a temporally encoded lattice surgery protocol is detected with probability $p_D$, then $$T_1 = T_{inj} + n(d'_m + 1) + p_D(T_{inj} + n(d'_m + 1)) + p_D^2(T_{inj} + n(d'_m + 1)) + p_D^3 \ldots =$$
$$(T_{inj} + n(d'_m + 1))(1 + p_D + p_D^2 + \ldots) = \frac{T_{inj} + n(d'_m + 1)}{1 - p_D}.$$

$$T_1 = T_{inj} + n(d'_m + 1) + p_D(T_{inj} + n(d'_m + 1)) + p_D^2(T_{inj} + n(d'_m + 1)) + p_D^3 \ldots =$$
$$(T_{inj} + n(d'_m + 1))(1 + p_D + p_D^2 + \ldots) = \frac{T_{inj} + n(d'_m + 1)}{1 - p_D}.$$

$$T_1 = T_{inj} + n(d'_m + 1) + p_D(T_{inj} + n(d'_m + 1)) + p_D^2(T_{inj} + n(d'_m + 1)) + p_D^3 \ldots =$$
$$(T_{inj} + n(d'_m + 1))(1 + p_D + p_D^2 + \ldots) = \frac{T_{inj} + n(d'_m + 1)}{1 - p_D}.$$

wherein $T_{inj}$ is a time taken to inject an input magic state into a cell of a distillation tile, as described herein.

In some embodiments, final multi-qubit π/2 Pauli measurements of a given distillation circuit may be non-deterministic, which implies that k' Pauli measurements may be performed, wherein 0≤k'≤κ and κ is a number of logical single-qubit measurements on input $|T_X\rangle$-type magic states of the given distillation circuit (e.g., not input $|T_X\rangle$-type magic states used for multi-qubit π/8 Pauli measurements) before the Clifford frame is conjugated through For example, for TELS-based magic state distillation circuit 800 that applies a hybrid error detection and correction scheme, κ=4, according to some embodiments. For a given temporally encoded lattice surgery protocol with measurement distance $$d''_m$$

and a [n', k', d'] classical error-correcting code with detection probability $$p'_D,$$

$$T_2 = n'(d''_m + 1) + p'_D(n'(d''_m + 1)) + (p'_D)^2 \ldots = \frac{n'(d''_m + 1)}{1 - p'_D}.$$

$$T_2 = n'(d''_m + 1) + p'_D(n'(d''_m + 1)) + (p'_D)^2 \ldots = \frac{n'(d''_m + 1)}{1 - p'_D}.$$

In some embodiments, when performing final multi-qubit Pauli measurements, if a logical time-like failure is detected, the entire process described by a given distillation circuit may not be restarted. Rather, it may be sufficient to just redo the multi-qubit Pauli measurements associated with the given temporally encoded lattice surgery protocol described by the distillation circuit, as is done in a hybrid error detection and correction scheme.

The time to successfully distill the magic state also relies on whether the distillation protocol itself detected an error in any of the input magic states. This is modeled by the probability that the magic state protocol detects an error on an input magic state, which we denote $$p_D^{(M)}.$$

Thus the total time required to successfully distill a magic state is $$T = T_1 + T_2 + p_D^{(M)}T = \frac{T_1 + T_2}{1 - p_D^{(M)}}.$$

$$T = T_1 + T_2 + p_D^{(M)}T = \frac{T_1 + T_2}{1 - p_D^{(M)}}.$$

Figure 9:
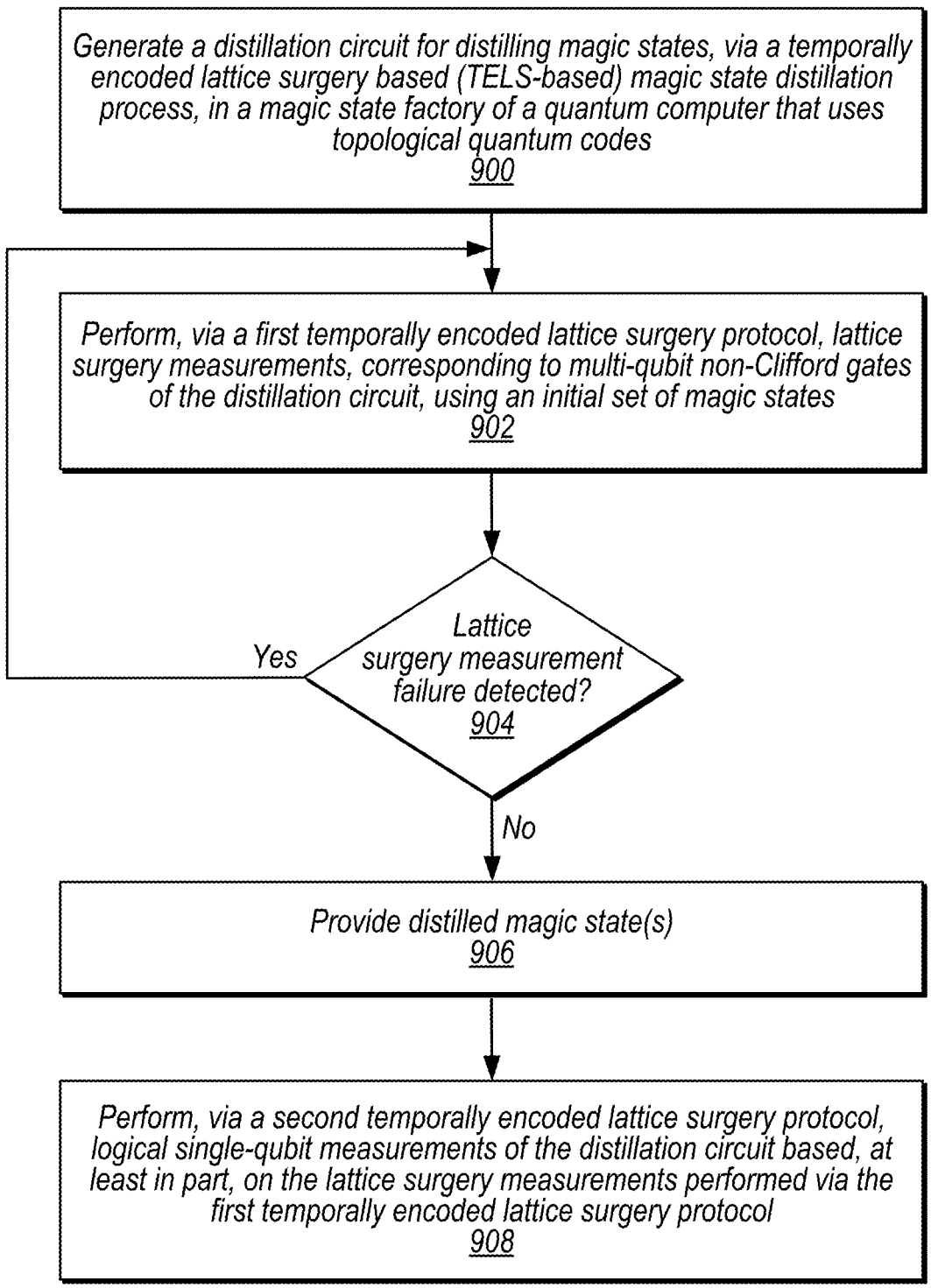
FIG. 9 is a flow diagram illustrating a process of distilling high-fidelity |T⟩-type magic states based, at least in part, on a use of one or more temporally encoded lattice surgery (TELS) protocols, according to some embodiments.

FIG. 9 is a flow diagram illustrating a process of distilling high-fidelity |T⟩- type magic states based, at least in part, on a use of one or more temporally encoded lattice surgery (TELS) protocols, according to some embodiments.

In block 900, a distillation circuit is generated, wherein the distillation circuit comprises at least multi-qubit non-Clifford gates and logical single-qubit measurements. An example of a Clifford frame distillation circuit that may result from a process described by block 900 is shown in FIG. 8A for a 15-to-1 magic state distillation process. A main objective of such a Clifford frame distillation circuit is to describe how input magic states (which may be generated via a magic state injection process) may be distilled into output magic states that have a higher fidelity than the injected input magic states. In some embodiments, such a process of generating high fidelity magic states from lower fidelity input magic states may be referred to as a magic state distillation process, and such output magic states with high fidelity may be referred to as "distilled" magic states. A person having ordinary skill in the art should understand that FIG. 8A is an example Clifford frame distillation circuit for a given magic state distillation process (e.g., 15-to-1 magic state distillation), and that equivalent circuits for other magic state distillation processes (e.g., 125-to-3, 116-to-12, 114-to-14, etc.) may be similarly generated by processes described in block 900. Furthermore, choosing a particular magic state distillation process (e.g., 15-to-1, 125-to-3, 116-to-12, 114-to-14, etc.) may determine, at least in part, parameters of a temporally encoded lattice surgery protocol used in block 902 (e.g., layout and design of magic state distillation tiles within a magic state factory, multi-qubit Pauli measurements that are made, etc.).

Once a distillation circuit has been formed, lattice surgery measurements are performed in block 902 according to the multi-qubit non-Clifford gates of the given distillation circuit. In some embodiments, the lattice surgery measurements are performed according to an error detection scheme or a hybrid error detection and correction scheme applied to a temporally encoded lattice surgery protocol. After a given number of rounds of lattice surgery measurements have been performed, the temporally encoded lattice surgery protocol is used to determine whether or not a non-trivial lattice surgery measurement failure is detected at block 904.

In some embodiments, if a non-trivial lattice surgery measurement failure is detected at block 904, affiliated qubits of the input magic states may be reset (e.g., reinitialized) and lattice surgery measurements described with regard to block 902 begin again. This may be referred to as an "abort" process, as the TELS-based magic state distillation process does not continue if a non-trivial lattice surgery measurement failure is detected and rather restarts the process instead. If, however, no non-trivial lattice surgery measurement failure is detected at block 904, then, at block 906, the distilled magic state(s) up to a Clifford frame are provided, according to some embodiments.

In block 908, logical single-qubit measurements of the given distillation circuit may be performed onto the distilled magic state(s) such that the Clifford frame is conjugated. In some embodiments, the logical single-qubit measurements of the distillation circuit may be converted into multi-qubit π/2 Pauli measurements, implemented via lattice surgery measurements. As the logical single-qubit measurements of the distillation circuit have been converted into multi-qubit π/2 Pauli measurements, such multi-qubit Pauli measurements may also benefit from a temporally encoded lattice surgery protocol, and may therefore be performed in said context. In some embodiments, logical single-qubit measurements such as those described in block 908 are non-deterministic, as the exact additional lattice surgery measurements that are performed depend on results of the lattice surgery measurements performed via the first temporally encoded lattice surgery protocol of block 902. For example, if, following performance of the first temporally encoded lattice surgery protocol described in block 902, there are no Clifford corrections to be made, then logical single-qubit measurements of block 908 may resemble an implementation in which data qubits of topological surface code patches being used are measured in the appropriate basis (e.g., the Z basis in example embodiments shown for logical single-qubit measurements 810 in FIG. 8A). In another example, if, following performance of the first temporally encoded lattice surgery protocol described in block 902, there are Clifford corrections to be made, then logical single-qubit measurements such as those described in block 908 may be converted into multi-qubit Pauli measurements, which may then cause additional lattice surgery measurements to be performed according to the particular single-qubit measurement(s) under consideration.

Following a conjugation of the Clifford frame as described with regard to block 908, the one or more distilled magic states are provided for use by a processing core of a quantum computer (e.g., via routing spaces between a given magic state factory and said processing core) in order to execute a given quantum algorithm.

Distillation Tile Designs for TELS-Based Magic State Distillation

In some embodiments, a TELS-based magic state distillation process, such as those which are described herein, may be implemented within a magic state factory of a quantum computer, wherein the given quantum computer may be implemented via quantum hardware device(s) that use topological quantum code(s). A magic state factory may comprise magic state distillation tiles, implemented via rectangular (e.g., asymmetrical) patches of the topological quantum codes, that may be used to generate high-fidelity magic states via a TELS-based magic state distillation process. By optimizing layouts for magic state distillation tiles of the magic state factory which are adapted for a TELS-based magic state distillation process, space-time costs of magic state distillation may be reduced in comparison to a magic state distillation process that does not use a temporally encoded lattice surgery protocol, which may be referred to as an "unencoded" lattice surgery based magic state distillation process herein.

In the following examples of distillation tile designs for 15-to-1, 125-to-3, 116-to-12, and 114-to-14 TELS-based magic state distillation processes, respective space-time costs are analyzed in different noise regimes. For example, at a physical error rate of $p=10^{-4}$, one round within a 15-to-1 TELS-based magic state distillation process with robust lattice surgery operations may be sufficient to distill magic states with a final error probability of $\delta^{(M)} \leq 10^{-10}$, according to some embodiments. For $\delta^{(M)} \leq 10^{-15}$, which may be more relevant for larger quantum algorithms, and for TELS-based magic state distillation processes with $p=10^{-3}$, 100+ qubit quantum codes are considered in the following space-time cost analyses. Such analyses are also compared to unencoded lattice surgery protocols, which may execute non-Clifford gates using auto-corrected non-Clifford gates such as that which is discussed with regard to FIG. 8D. The following time-cost analyses for distillation tiles that use TELS-based magic state distillation processes draw from methods and distillation circuit designs discussed with regard to FIGS. 8A-9 herein.

A person having ordinary skill in the art should also understand that space-time savings due to use of TELS-assisted distillation tile designs may be compounded in embodiments in which multiple distillation tiles are implemented within a magic state distillation factory. Moreover, such space-time savings may reduce a number of distillation tiles required to perform a TELS-based magic state distillation process, and/or further time savings may be included when optimization of scheduling of the distillation process between multiple distillation tiles is made, such as through a round robin scheduling discussed with regard to FIGS. 23 and 24 herein. Furthermore, additional space costs may be included via the use of non-Clifford gate gadgets, such as those discussed with regard to FIG. 8B herein.

In some embodiments, a time-like distance of lattice surgery $d_m$ and space-like distances $d_x$ and $d_z$ of logical qubits and routing spaces within distillation tiles may be computed wherein a set of distances $\{d_x, d_z, d_m\}$ may be determined that minimize an overall space-time cost, while also ensuring that distilled magic states have logical errors with probability at most $\delta^{(M)}$. Parameters that may be considered in such a computation include constants related to a given quantum hardware layout such as an area of a given distillation tile used in each protocol (which may be denoted as a space cost), a number of logical qubits used in a given distillation tile N, a worst-case routing space area A, and a maximum area used during any given lattice surgery measurement during the magic state distillation process.

Distillation Tile Designs for TELS-Based Magic State Distillation: 15-to-1 Magic State Distillation A 15-to-1 magic state distillation process may be used for distilling |T⟩ states, and, as further described in the following paragraphs, may be optimized by temporally encoded lattice surgery protocols. As a 15-to-1 magic state distillation process originates from a ⟦15,1,3⟧ triorthogonal CSS quantum code and therefore may apply a property of a ⟦15,1,3⟧ triorthogonal CSS quantum code that the application of T gates on all of the physical qubits of said code implements a logical $T^\dagger$ gate. In the following examples provided herein, magic state distillation may be performed with $|T_X\rangle$ states, meaning that the code may be defined to contain 1 logical qubit, 10 X-type stabilizers, and 4 Z-type stabilizers. A distilled magic state may be produced using 15-to-1 TELS-based magic state distillation by encoding a logical |0⟩ state, applying the transversal T gates, decoding, and then performing measurements, according to some embodiments. By propagating Clifford gates of a 15-to-1 distillation circuit past transversal T gates and removing redundant components of said circuit, the circuit may resemble a 15-to-1 distillation circuit such as that which is shown in FIG. 8A. Such a circuit contains 11 commuting multi-qubit Pauli measurements using 5 logical qubits, 4 of which may be described as logical $|T_X\rangle$ states. As described above, since the 11 Pauli measurements commute, they form a parallelizable Pauli set of size k=11. Examples of distillation tile designs for a TELS-based magic state distillation process that has a parallelizable Pauli set of size k=11 are shown in FIGS. 11A-13B herein.

For a given 15-to-1 magic state distillation process, the following examples may assume a regime in which a physical error rate is $p=10^{-4}$ and there is an objective target to distill magic states with a logical error probability of at most $\delta^{(M)} \leq 10^{-10}$. Using the noise model described above for an injection of magic states, a logical failure probability per distilled (e.g., output) magic state for one round of a 15-to-1 magic state distillation process may be given by $$p_L^{(M)} = 35\left((\epsilon_{L,Z})^3 + \frac{1}{2}6(\epsilon_{L,Z})^2\epsilon_{L,X} + \frac{1}{4}12\epsilon_{L,Z}(\epsilon_{L,X})^2 + \frac{1}{8}8(\epsilon_{L,X})^3\right) = \frac{35(1+\eta)^3}{27\eta^3}p^3.$$

$$p_L^{(M)} = 35\left((\epsilon_{L,Z})^3 + \frac{1}{2}6(\epsilon_{L,Z})^2\epsilon_{L,X} + \frac{1}{4}12\epsilon_{L,Z}(\epsilon_{L,X})^2 + \frac{1}{8}8(\epsilon_{L,X})^3\right) = \frac{35(1+\eta)^3}{27\eta^3}p^3.$$

For $p=10^{-4}$ and $n=100$, a probability that said distillation succeeds may be defined as $1-p_D^{(M)}=(1-\epsilon_L)^{15}=0.999$ and $p_L^{(M)}=1.33\times10^{-12}$. As this definition is sufficiently below $\delta^{(M)} \leq 10^{-10}$, lattice surgery measurements used to execute the given 15-to-1 magic state distillation process may then be modeled with a measurement distance large enough to allow for distilled magic states of a logical error rate of at most $\delta^{(M)}$. In some embodiments, this equates to a minimum spacelike distance requirement of $d_x=7$ and $d_z=9$.

A person having ordinary skill in the art should understand that the following examples of distillation tile designs for TELS-based magic state distillation processes refer to organization of quantum hardware layouts for said processes. Terminology such as logical qubit arrangement, etc., may be used but a person having ordinary skill in the art should understand that logical qubits refer to multiple physical qubits arranged in a given manner to implement a logical qubit, and therefore the discussion herein should not be considered as either purely software or hardware based tile designs. Furthermore, arranging said logical qubits according to the following distillation tile layouts may help minimize space requirements of distillation blocks within a magic state factory of a quantum computer, while the use of temporally encoded lattice surgery protocols helps to minimize time costs in such processes, according to some embodiments.

FIGS. 10A and 10B illustrate examples of a distillation tile located within a magic state factory that may be used for unencoded (e.g., without the use of a TELS protocol) and parallelized, unencoded lattice-surgery-based magic state distillation (e.g., a 15-to-1 distillation), respectively, according to some embodiments.

In order to contrast space-time savings of the following distillation tile layouts for TELS-based magic state distillation processes, FIGS. 10A and 10B first provide examples of distillation tile layouts for unencoded 15-to-1 magic state distillation processes. (A person having ordinary skill in the art should understand that "unencoded" 15-to-1 magic state distillation should be understood to mean a magic state distillation process made without speed-ups due to use of one or more temporally encoded lattice surgery protocols. Logical operations are still, however, "encoded" into topological surface code patches regardless of if a temporally encoded lattice surgery protocol is used or not in the following examples as shown in FIGS. 10A-22, and therefore "unencoded" should not be misconstrued as to mean a magic state distillation process performed without use of encoding physical qubits of a given quantum hardware device into logical qubits using topological surface code patches and/or use of one or more topological quantum codes.) To calculate a space-time cost of an unencoded 15-to-1 magic state distillation process, a distillation tile layout such as that which is shown in FIG. 10A is considered. As shown in the Key of FIG. 10A, there are 5 cells below a given routing space region that may be used during a given magic state distillation process, and magic state cells may be used to store magic states for performing $\pi/8$ multi-qubit Pauli measurements, such as those described above. "Magic states in prep." cell(s), as denoted in the Key, refers to cells that may be used to inject new magic states for subsequent multi-qubit Pauli measurements, thus preventing possible time delays due to magic state injection. As FIG. 10A represents a distillation tile layout for an unencoded magic state distillation process and therefore uses an autocorrected non-Clifford gate gadget (see FIG. 8D herein) in said distillation circuit, $|0\rangle$ ancillas with an adjacent space for a twist defect (e.g., for twist-based lattice surgery techniques) are also implemented in the distillation tile layout. A cell for storing a distilled magic state from a previous round of unencoded magic state distillation is also shown in the distillation tile layout such that the distilled magic state may be accessed, via a routing space, by a processing core of a quantum computer in which the layout in FIG. 10A is implemented. The routing space region that borders the data qubit cells may be used to help perform X boundary measurements between different logical qubits, which the other routing space region may be used to help perform $X \otimes Y$ measurements (e.g., with use of the twist defect shown in the distillation tile layout). For ease of description herein, a convention of considering X boundaries as the shorter boundaries of the respective rectangular code patches is taken, wherein, Z boundaries, therefore, are the longer boundaries of the respective rectangular code patches. Such labels are provided in FIG. 11A, and said convention should be understood to carry though the entire description herein.

As shown in FIG. 10A, there are two cells configured for magic states (e.g., magic states and magic states in prep. according to the Key) in the given distillation tile layout. As FIG. 10A represents a distillation tile layout used for unencoded magic state distillation, one magic state cell may be used per non-Clifford gate, according to some embodiments. Furthermore, it may be noted that one X boundary of the magic state cell has access (via a routing space region) to the data qubit cells in FIG. 10A, and the other boundary of the magic state cell has access (via a routing space region) to the Y boundary of the $|0\rangle$ ancilla cell, allowing these lattice surgery measurements to be performed in parallel. However, at any given time during an unencoded magic state distillation process that uses the distillation tile layout shown in FIG. 10A, one magic state cell will take part in a non-Clifford gate, and the other will be used to prepare a noisy magic state (e.g., magic states in prep. according to the Key) for a subsequent non-Clifford gate according to a given distillation circuit being used in the unencoded magic state distillation process.

In some embodiments, it may be assumed that classical processing is instantaneous, and therefore one qubit cell is configured to a $|0\rangle$ ancilla cell used in the autocorrected non-Clifford gate gadget, such as that which is shown in FIG. 8D. If, however, it is not assumed that classical processing is instantaneous and finite decoding times exist, additional $|0\rangle$ ancilla qubit cells may be used to offset an extra time cost associated with decoding all syndrome measurement rounds associated with a previous lattice surgery operations.

As shown in FIG. 10A, a newly distilled magic state may not need to be shuttled from a data qubit cell to a distilled magic state storage cell, as the distillation tile layout shown in FIG. 10A may be designed such that the newly distilled magic state is in the right most data qubit cell (e.g., in preparation for use by a processing core of a quantum computer), according to some embodiments. It may then follow that, in a next round of the unencoded magic state distillation process being performed, the distillation tile layout shown in FIG. 10A is mirrored about the equator of the figure such that the right most data qubit cell becomes a distilled magic state storage cell (e.g., with access to said processing core via a routing space region) and any potential shuttling delays are mitigated.

Moving to FIG. 10B, it is noted that there are two X boundaries of the data qubit cells (e.g., borders of a given cell (see "shorter boundary" as demonstrated for cell 1100 in FIG. 11A) which constitute the same logical boundary), both of which are accessible to one or more routing spaces. In some embodiments, an unencoded magic state distillation process that uses distillation tile layouts such as that which is shown in FIG. 10A may be sped up by a factor of two by assigning new routing space regions and ancilla cells that access the second X boundary of the data qubits, as shown in FIG. 10B. The distillation tile layout in FIG. 10B allows for two multi-qubit Pauli measurements, and therefore lattice surgery measurements, to be performed in parallel. This may be referred to as a parallelized magic state distillation process, and, more specifically for FIG. 10B, a parallelized unencoded magic state distillation process. It may be noted that, using a distillation tile layout such as that which is shown in FIG. 10B, a newly distilled magic state in a data qubit cell may need to be shuttled to a distilled magic state storage cell, according to some embodiments.

FIGS. 11A and 11B illustrate examples of a distillation tile located within a magic state factory that may be used for TELS-based magic state distillation (e.g., a 15-to-1 distillation) and parallelized TELS-based magic state distillation, respectively, which are implemented with a first type of classical error-correcting code, according to some embodiments.

FIGS. 11A and 11B demonstrate example distillation tile layouts for a TELS-based magic state distillation process that uses 15-to-1 magic state distillation (e.g., with TELS-based magic state distillation circuit 800) and applies a [12,11,2] single error detect classical error-correcting code. As shown in FIG. 11A, multi-qubit Pauli measurements may be performed sequentially (as opposed to in parallel), and therefore there is one routing space region depicted in FIG. 11A that has access to an X boundary (e.g., shorter boundary as labeled in FIG. 11A) of all qubit cells in the distillation tile layout shown in FIG. 11A. As introduced above with regard to FIG. 10B, however, FIG. 11B demonstrates a distillation tile layout for parallelized TELS-based magic state distillation. In FIG. 11B, multi-qubit Pauli measurements may be performed two-at-a-time, using additional routing space regions as shown in the figure. As FIGS. 11A and 11B represent distillation tile layouts that may be used for TELS-based magic state distillation processes (and for distillation in the Clifford frame), said layout designs may make use of non-Clifford measurement gadget 820 in order to perform π/8 rotations, according to some embodiments. It may also be noted that no twist defects may be needed for distillation tile layouts shown in FIGS. 11A and 11B, as there is no need to allocate qubit(s) for a |0⟩ ancilla cell with Y boundary routing space region access, according to some embodiments. This may reduce an amount of routing space and a number of logical qubit cells needed (see description for FIGS. 10A and 10B herein).

Figure 11D:
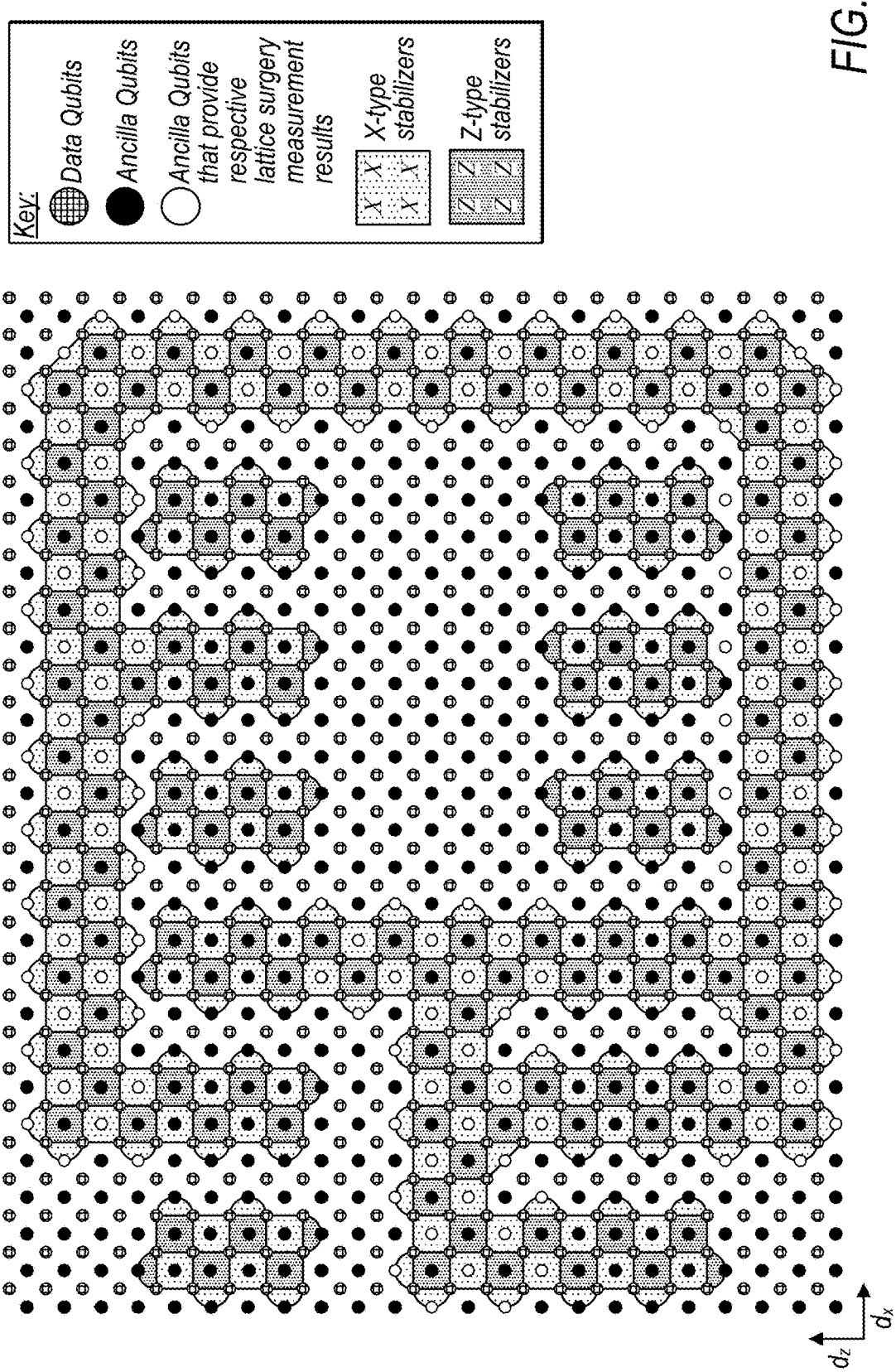
FIG. 11D illustrates an application of a distillation tile layout, such as that which is shown in FIG. 11B, for use in a magic state factory of a quantum computer to perform a first temporally encoded lattice surgery protocol during a parallelized TELS-based magic state distillation process, wherein the distillation tile layout may be implemented using quantum hardware device(s), according to some embodiments.

Furthermore, as shown in FIG. 11B, two distinct routing space regions (see the Key for the figure) may be implemented in order to demonstrate non-intersecting routing areas for two parallel multi-qubit Pauli measurements of a parallelized TELS-based magic state distillation process said distillation tile layout is used for. In some embodiments, each of these distinct routing space regions may have access to the X boundaries of all data qubit cells and magic state cells involved in the parallelized TELS-based magic state distillation process. Such design implementations for a distillation tile layout such as that which is shown in FIG. 11B are also further discussed with regard to FIG. 11D, wherein routing spaces may be used to perform lattice surgery measurements of the parallelized TELS-based magic state distillation process corresponding to the first two parallelizable Paulis when a [12,11,2] single error detect classical error-correcting code is used.

FIG. 11C illustrates an example of how a layout of a distillation tile shown in FIG. 11B may be arranged for a second stage of the parallelized, TELS-based magic state distillation process discussed with regard to FIG. 11B, according to some embodiments.

In some embodiments, access, via routing space region(s) to X boundaries (e.g., and not additionally to the Z boundaries) of the data qubit cells may be sufficient for a first stage (see block 902) of a given parallelized TELS-based magic state distillation process, which may include temporally encoded multi-qubit Pauli measurements for non-Clifford gates of a 15-to-1 distillation circuit such as that which is shown in FIG. 8A. In a second stage (see block 908), however, multi-qubit Pauli measurements which are tensor products of X, Y and Z may be performed. As shown in FIG. 11C, such tensor product multi-qubit Pauli measurements may be performed using a modified distillation tile layout of that which is shown in FIG. 11B without having to shuffle surface code patches of the tile around, according to some embodiments: assuming that a newly distilled magic state is in a left most data qubit cell in FIG. 11C, multi-qubit Pauli measurements may be performed using X boundary access of said cell, while remaining data qubit cells may need at least one accessible Z and Y boundary. As shown in FIG. 8A, for a 15-to-1 magic state distillation process, there may be at most 4 multi-qubit π\2 Pauli measurements. As these measurements may require access to different types of boundaries on each data qubit cell, said multi-qubit π\2 Pauli measurements may not, in general, be performed in parallel. Hence, as shown in FIG. 11C, an entire routing space region may be used to help perform said multi-qubit π\2 Pauli measurements. As introduced above, these multi-qubit π\2 Pauli measurements correspond to a second parallelizable Pauli set in a Pauli-based computation representation of a given quantum algorithm being executed using a distillation circuit for 15-to-1 magic state distillation, according to some embodiments. As there are four logical single-qubit measurements at the end of TELS-based magic state distillation circuit 800, there are, at most, 4 measurements in this second parallelizable Pauli set, which may be performed using TELS-based magic state distillation and a [5,4,2] single error detect classical error-correcting code and with measurement distance $d_m=5$, according to some embodiments.

In some embodiments, when applying a [12,11,2] single error detect classical error-correcting code for TELS-based magic state distillation using distillation tile layouts such as those shown in FIGS. 11A and 11B, lattice surgery measurements of non-Clifford gates (see FIG. 8A) may be made by defining a generator matrix G for said cyclic code wherein at most two magic states are accessed simultaneously for each multi-qubit Pauli measurement of the non-Clifford gates. After each multi-qubit Pauli measurement, a magic state cell within a distillation tile may be reset and reused for a future non-Clifford gate.

If multi-qubit Pauli measurements are performed two at a time, such as by implementing a distillation tile layout such as that which is shown in FIG. 11B, three magic states may need to be concurrently held in memory in order to perform said measurements (see "magic states used to perform π/8 rotations" cells in FIG. 11B), and for each subsequent pair of multi-qubit Pauli measurements, at least two injected magic states may be required (see "magic states in prep." cells in FIG. 11B), according to some embodiments. Specifically, three "magic states in prep." cells are implemented in the distillation tile layout shown in FIG. 11B, as, if one of the three is removed, then the distillation tiles may no longer be rectangular and/or may contain wasted physical qubits. It may be noted, however, that since keeping track of Clifford frames requires occasionally performing Y measurements when using distilled magic states in a processing core of a quantum computer, one of three "magic states in prep." cells could also be used to store an ancilla qubit which may be needed to perform said Y measurement. A person having ordinary skill in the art should understand that performing a Y measurement on a given surface code patch may be done in various ways. For example, logical phase gate may be performed, followed by measuring all data qubits in the X basis. However, performing a logical phase gate on a two-dimensional planar architecture with a surface code may require additional routing space regions and measurements involving twist defects. Alternatively, an ancilla qubit could be prepared in the logical |0⟩ state, and a Y⊗Z measurement may be performed to get the parity of the given Y measurement outcome, etc.

FIG. 11D illustrates an application of a distillation tile layout, such as that which is shown in FIG. 11B, for use in a magic state factory of a quantum computer to perform a first temporally encoded lattice surgery protocol during a parallelized TELS-based magic state distillation process, wherein the distillation tile layout may be implemented using quantum hardware device(s), according to some embodiments.

As introduced above with regard to discussion pertaining to FIG. 11B, a parallelized TELS-based magic state distillation process which implements a distillation tile layout such as that which is shown in FIG. 11B may be implemented using one or more quantum hardware devices. Such design implementations may resemble that which is shown in FIG. 11D, wherein routing space regions may be used to perform lattice surgery measurements of a parallelized TELS-based magic state distillation process corresponding to the first two parallelizable Paulis when a single error detect [12,11,2] classical error-correcting code is used. For example, in a first syndrome measurement round of the lattice surgery measurement depicted in FIG. 11D, stabilizers with white vertices may yield random measurement outcomes due to a gauge fixing step (see "ancilla qubits that provide respective lattice surgery measurement results" in the Key of the figure). Said lattice surgery measurement outcomes may then be described as error-corrected measurement values corresponding to X stabilizers in respective routing space regions, as shown in FIG. 11D.

Furthermore, FIG. 11D provides an example of two distinct routing space regions that may be used to perform parallel lattice surgery measurements for a first temporally encoded lattice surgery protocol in a parallelized TELS-based magic state distillation process (see block 902). In some embodiments, logical measurements may include $X_1 \otimes X_2 \otimes X_3 \otimes X_{T_{X,1}}$ (e.g., in the equatorial routing space shown in the figure) and $X_3 \otimes X_4 \otimes X_{T_{X,1}} \otimes X_{T_{X,2}}$ (e.g., in the circumferential routing space shown in the figure), which may correspond to first and second measurements, respectively, when performing parallelized TELS-based magic state distillation using a [12,11,2] single error detect classical error-correcting code. Alternatively, such logical measurements may correspond to a first measurement and a product of the first and second measurements using the distillation circuit described with regard to FIG. 8A, according to some embodiments.

Figure 11E:
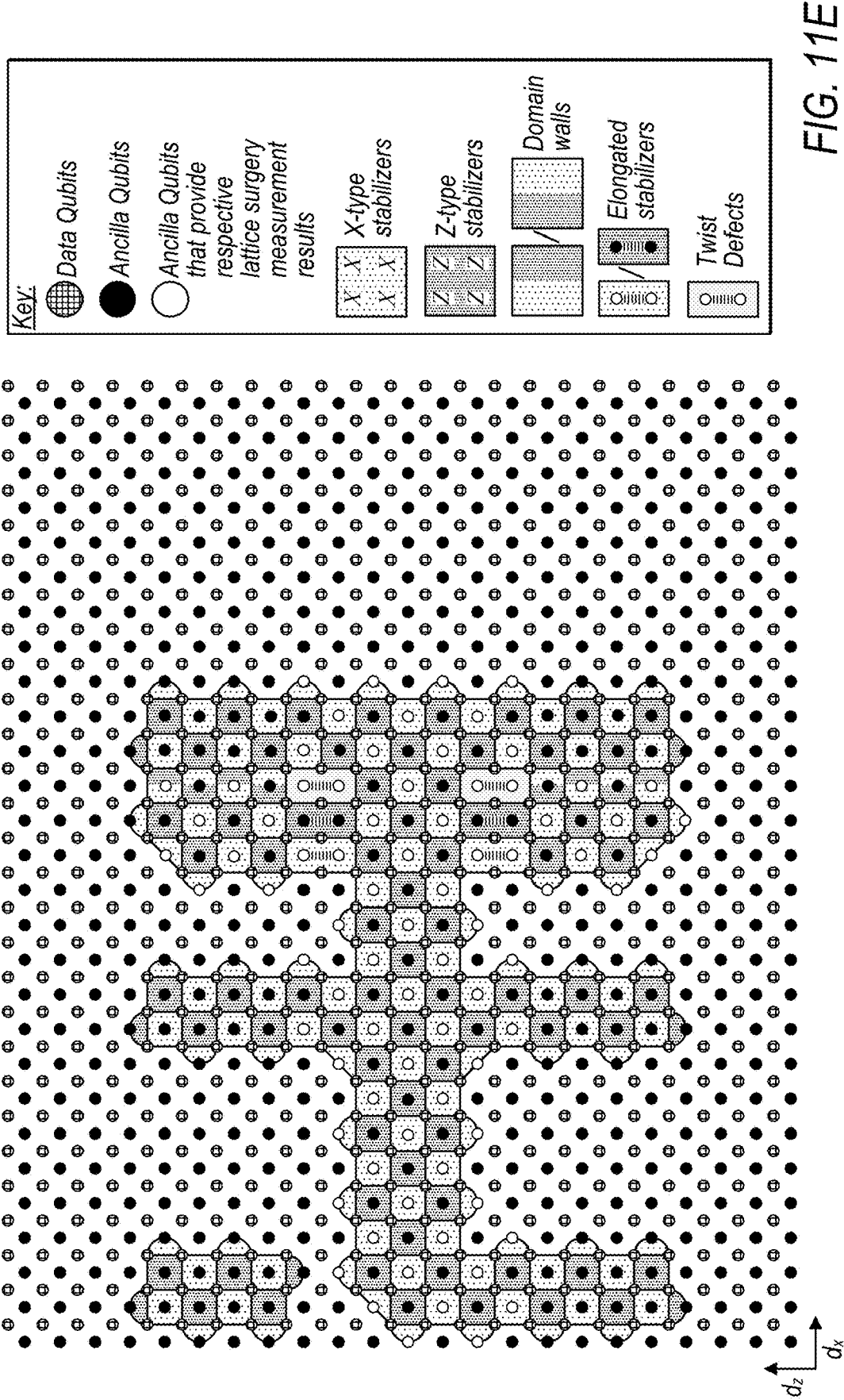
FIG. 11E illustrates a continuation of the application discussed in FIG. 11D of the distillation tile layout shown in FIG. 11B, for use in the magic state factory of the quantum computer to perform a second temporally encoded lattice surgery protocol during a parallelized TELS-based magic state distillation process, wherein the distillation tile layout may be implemented using quantum hardware device(s), according to some embodiments.

FIG. 11E illustrates a continuation of the application discussed in FIG. 11D of the distillation tile layout shown in FIG. 11B, for use in the magic state factory of the quantum computer to perform a second temporally encoded lattice surgery protocol during a parallelized TELS-based magic state distillation process, wherein the distillation tile layout may be implemented using quantum hardware device(s), according to some embodiments.

Using a similar 2D grid of qubits as that which is shown with regard to FIG. 11D, FIG. 11E demonstrates how routing space regions may be used to perform additional lattice surgery measurements (see block 908 for discussion of multi-qubit Pauli measurements performed after non-Clifford gates in a given distillation circuit) of a parallelized TELS-based magic state distillation process when a single error detect [12,11,2] classical error-correcting code is used. As shown in FIG. 11E, multi-qubit Pauli measurements which are tensor products of X, Y, and/or Z may be performed onto data qubits of the grid of qubits shown in the figure. For example, FIG. 11E demonstrates a measurement of X⊗Y⊗X⊗Y using five logical data qubits. Also shown in FIG. 11E are twist defects and elongated stabilizers (see the Key adjacent to the figure) that may be used to access Y boundaries of logical data qubits and/or perform various functions of twist-based lattice surgery measurements, according to some embodiments. Routing space regions in FIG. 11E that separates top and bottom rows of logical data qubits are also configured such that they are large enough for Y measurements requiring twist defects to be performed. Note that domain walls (e.g., between X-type and Z-type stabilizers) are also depicted via the Key adjacent to the figure.

FIGS. 12A and 12B illustrate examples of a distillation tile located within a magic state factory that may be used for TELS-based magic state distillation (e.g., a 15-to-1 distillation) and parallelized TELS-based magic state distillation, respectively, which are implemented with a second type of classical error-correcting code, according to some embodiments. FIG. 13A illustrates an example of a distillation tile located within a magic state factory that may be used for TELS-based magic state distillation (e.g., a 15-to-1 distillation) implemented with a third type of classical error-correcting code, according to some embodiments.

FIGS. 12A-13B illustrate additional examples of distillation tile layouts for 15-to-1 TELS-based magic state distillation processes that use various classical error-correcting codes, wherein FIG. 12A provides an example of a distillation tile layout for 15-to-1 TELS-based magic state distillation processes that use a [15,11,3] BCH classical error-correcting code, FIG. 12B provides an example of a distillation tile layout for parallelized 15-to-1 TELS-based magic state distillation processes that use a [15,11,3] BCH classical error-correcting code, FIG. 13A provides an example of a distillation tile layout for 15-to-1 TELS-based magic state distillation processes that use a [23,12,7] Golay classical error-correcting code, and FIG. 13B provides an example of a distillation tile layout for parallelized 15-to-1 TELS-based magic state distillation processes that use a [23,12,7] Golay classical error-correcting code, according to some embodiments.

Distillation Tile Designs for TELS-Based Magic State Distillation: 125-to-3 Magic State Distillation In the following paragraphs, methods and examples for constructing distillation tile layouts for 125-to-3 magic state distillation processes and TELS-based 125-to-3 magic state distillation processes using various classical error-correcting codes are provided. A 125-to-3 magic state distillation process may be derived from a triorthogonal CSS quantum ⟦125,3,5⟧ code, which may be constructed by puncturing a [128,29,32] Reed-Muller classical error-correcting code at any three locations, according to some embodiments. A resulting quantum code may contain 3 logical qubits, 96 X-type stabilizers, and 26 Z-type stabilizers, and, after applying a circuit transformation from a gate-based model to a Pauli-based computation model, a 125-to-3 distillation circuit may include a sequence of 99 commuting Pauli measurements (which forms a parallelizable Pauli set of size k=99) performed onto 29 logical qubits, three of which will become high-fidelity distilled magic states via said distillation processes. A person having ordinary skill in the art should understand that, given the parameters and implementation detail provided above, a distillation circuit for 125-to-3 magic state distillation such as the distillation circuit for 15-to-1 magic state distillation shown in FIG. 8A may similarly be constructed. Furthermore, methods and techniques for performing temporally encoded lattice surgery protocols to speed up magic state distillation processes (e.g., see FIG. 9) may be similarly extended to 125-to-3 magic state distillation processes, and to 116-to-12 and 114-to-14 magic state distillation processes in the additional discussion sections below.

In the following example distillation tile layouts for 125-to-3 magic state distillation (e.g., FIGS. 14A-16), it may be assumed that a setting a given physical error rate p and a target logical error probability to be at most $\delta^{(M)}$ allows for a logical failure probability per distilled magic state using a given 125-to-3 magic state distillation process to be measured and may define a measurement distance when conducting lattice surgery measurements during said distillation. Using a noise model such as that which is described above for an injection of magic states, a logical failure probability per distilled magic state for one round of a 125-to-3 magic state distillation scheme may then be written as:

$$p_L^{(M)} =$$

$$\frac{1}{3}31\left((\epsilon_{L,Z})^5 + \frac{1}{2}10(\epsilon_{L,Z})^4\epsilon_{L,X} + \frac{1}{4}40(\epsilon_{L,Z})^3(\epsilon_{L,X})^2 + \frac{1}{8}80(\epsilon_{L,Z})^3(\epsilon_{L,X})^2 + \frac{1}{16}80\epsilon_{L,Z}(\epsilon_{L,X})^4 + \frac{1}{32}32(\epsilon_{L,X})^5\right) = \frac{31(1+\eta)^5}{729\eta^5}p^5.$$

$$p_L^{(M)} =$$

$$\frac{1}{3}31\left((\epsilon_{L,Z})^5 + \frac{1}{2}10(\epsilon_{L,Z})^4\epsilon_{L,X} + \frac{1}{4}40(\epsilon_{L,Z})^3(\epsilon_{L,X})^2 + \frac{1}{8}80(\epsilon_{L,Z})^3(\epsilon_{L,X})^2 + \frac{1}{16}80\epsilon_{L,Z}(\epsilon_{L,X})^4 + \frac{1}{32}32(\epsilon_{L,X})^5\right) = \frac{31(1+\eta)^5}{729\eta^5}p^5.$$

FIGS. 14A and 14B illustrate examples of a distillation tile located within a magic state factory that may be used for unencoded (e.g., without the use of a TELS protocol) and parallelized unencoded lattice-surgery-based magic state distillation (e.g., a 125-to-3 distillation), respectively, according to some embodiments.

In order to contrast space-time savings of the following distillation tile layouts for 125-to-3 TELS-based magic state distillation processes, FIGS. 14A and 14B first provide examples of distillation tile layouts for unencoded 125-to-3 magic state distillation processes. Distillation tile layouts such as those shown in FIGS. 14A and 14B may be used to perform magic state distillation in a Pauli frame, and with the use of auto-corrected non-Clifford gadgets such as that which is shown in FIG. 8D. Furthermore, if a distillation tile layout such as that which is shown in FIG. 14A is applied for an unencoded 125-to-3 magic state distillation process, 99 sequential lattice surgery measurements may be performed, while if a distillation tile layout such as that which is shown in FIG. 14B is applied for a parallelized unencoded 125-to-3 magic state distillation process, multi-qubit Pauli measurements may be performed two at a time and therefore 50 sequential lattice surgery measurements may be performed.

FIG. 15 illustrates a first example of a distillation tile located within a magic state factory that may be used for parallelized, TELS-based magic state distillation (e.g., a 125-to-3 distillation) implemented with a first type of classical error-correcting code, according to some embodiments. FIG. 16 illustrates a second example of a distillation tile located within a magic state factory that may be used for parallelized, TELS-based magic state distillation (e.g., a 125-to-3 distillation) implemented with a second type of classical error-correcting code, according to some embodiments.

FIGS. 15 and 16 demonstrate example distillation tile layouts for parallelized TELS-based magic state distillation processes that use 125-to-3 magic state distillation, wherein FIG. 15 applies a [127,106,7] BCH classical error-correcting code and FIG. 16 applies a [127,99,9] BCH classical error-correcting code. As shown via a design of routing space regions in FIG. 15, for example, a set of n=127 multi-qubit Pauli measurements may be performed within a time required for 64 sequential measurements, cutting a time cost nearly in half when using such parallelized TELS-based magic state distillation processes. It may also be noted that for 125-to-3 magic state distillation, there may be at most 26 additional multi-qubit Pauli measurements to perform due to the conditional Clifford corrections, the results of which may be used to detect if there are errors in the final distilled magic states, according to some embodiments.

Distillation Tile Designs for TELS-Based Magic State Distillation: 116-to-12 Magic State Distillation In the following paragraphs, methods and examples for constructing distillation tile layouts for 116-to-12 magic state distillation processes and TELS-based 116-to-12 magic state distillation processes using various classical error-correcting codes are provided. A 116-to-12 magic state distillation process may be derived from a triorthogonal CSS quantum ⟦116,12,4⟧ code, which may be constructed by puncturing a [128,29,32] Reed-Muller classical error-correcting code at a specific set of 12 locations, according to some embodiments. A resulting quantum code may contain 12 logical qubits, 87 X-type stabilizers, and 17 Z-type stabilizers, and, after applying a circuit transformation from a gate-based model to Pauli-based computation model, a 116-to-12 distillation circuit may include a sequence of 99 commuting Pauli measurements (which forms a parallelizable Pauli set of size k=99) performed onto 29 logical qubits, twelve of which will become high-fidelity distilled magic states via said distillation processes.

In the following example distillation tile layouts for 116-to-12 magic state distillation (e.g., FIGS. 17A-19), it may be assumed that a setting a given physical error rate p and a target logical error probability to be at most $\delta^{(M)}$ allows for a logical failure probability per distilled magic state using a given 116-to-12 magic state distillation process to be measured and may define a measurement distance when conducting lattice surgery measurements during said distillation. Using a noise model such as that which is described above for an injection of magic states, a logical failure probability per distilled magic state for one round of a 116-to-12 magic state distillation scheme may then be written as:

$$p_L^{(M)} =$$

$$\frac{1}{12}495\left((\epsilon_{L,Z})^4 + \frac{1}{2}8(\epsilon_{L,Z})^3\epsilon_{L,X} + \frac{1}{4}24(\epsilon_{L,Z})^3(\epsilon_{L,X})^2 + \frac{1}{8}32\epsilon_{L,Z}(\epsilon_{L,X})^3 + \frac{1}{16}16(\epsilon_{L,X})^4\right) = \frac{495(1+\eta)^4}{972\eta^4}p^4.$$

$$p_L^{(M)} =$$

$$\frac{1}{12}495\left((\epsilon_{L,Z})^4 + \frac{1}{2}8(\epsilon_{L,Z})^3\epsilon_{L,X} + \frac{1}{4}24(\epsilon_{L,Z})^3(\epsilon_{L,X})^2 + \frac{1}{8}32\epsilon_{L,Z}(\epsilon_{L,X})^3 +$$

-continued $$\frac{1}{16}16(\epsilon_{L,X})^4\bigg) = \frac{495(1+\eta)^4}{972\eta^4}p^4.$$

FIGS. 17A and 17B illustrate examples of a distillation tile located within a magic state factory that may be used for unencoded (e.g., without the use of a TELS protocol) and parallelized unencoded lattice-surgery-based magic state distillation (e.g., a 116-to-12 distillation), respectively, according to some embodiments.

In order to contrast space-time savings of the following distillation tile layouts for 116-to-12 TELS-based magic state distillation processes, FIGS. 17A and 17B first provide examples of distillation tile layouts for unencoded 116-to-12 magic state distillation processes. Distillation tile layouts such as those shown in FIGS. 17A and 17B may be used to perform magic state distillation in a Pauli frame, and with the use of auto-corrected non-Clifford gadgets such as that which is shown in FIG. 8D. Furthermore, if a distillation tile layout such as that which is shown in FIG. 17A is applied for an unencoded 116-to-12 magic state distillation process, 99 sequential lattice surgery measurements may be performed, while if a distillation tile layout such as that which is shown in FIG. 17B is applied for a parallelized unencoded 116-to-12 magic state distillation process, multi-qubit Pauli measurements may be performed two at a time and therefore 50 sequential lattice surgery measurements may be performed.

FIG. 18 illustrates a first example of a distillation tile located within a magic state factory that may be used for parallelized, TELS-based magic state distillation (e.g., a 116-to-12 distillation) implemented with a first type of classical error-correcting code, according to some embodiments. FIG. 19 illustrates a second example of a distillation tile located within a magic state factory that may be used for parallelized, TELS-based magic state distillation (e.g., a 116-to-12 distillation) implemented with a second type of classical error-correcting code, according to some embodiments.

FIGS. 18 and 19 demonstrate example distillation tile layouts for parallelized TELS-based magic state distillation processes that use 116-to-12 magic state distillation, wherein FIG. 18 applies a [129,114,6] Zetterberg classical error-correcting code and FIG. 19 applies a [127,99,9] BCH classical error-correcting code. As shown via a design of routing space regions in FIG. 18, for example, a set of n=129 multi-qubit Pauli measurements may be performed within a time required for 64 sequential measurements, cutting a time cost nearly in half when using such parallelized TELS-based magic state distillation processes. It may also be noted that for 116-to-12 magic state distillation, there may be at most 17 additional multi-qubit Pauli measurements to perform due to the conditional Clifford corrections, the results of which may be used to detect if there are errors in the final distilled magic states, according to some embodiments.

Distillation Tile Designs for TELS-Based Magic State Distillation: 114-to-14 Magic State Distillation In the following paragraphs, methods and examples for constructing distillation tile layouts for 114-to-14 magic state distillation processes and TELS-based 114-to-14 magic state distillation processes using various classical error-correcting codes are provided. A 114-to-14 magic state distillation process may be derived from a triorthogonal CSS quantum ⟦114,14,3⟧ code, which may be constructed by puncturing a [128,29,32] Reed-Muller classical error-correcting code at a specific set of 14 locations, according to some embodiments. A resulting quantum code may contain 14 logical qubits, 85 X-type stabilizers, and 15 Z-type stabilizers, and, after applying a circuit transformation from a gate-based model to Pauli-based computation model, a 114-to-14 distillation circuit may include a sequence of 99 commuting Pauli measurements (which forms a parallelizable Pauli set of size k=99) performed onto 29 logical qubits, fourteen of which will become high-fidelity distilled magic states via said distillation processes.

In the following example distillation tile layouts for 114-to-14 magic state distillation (e.g., FIGS. 20A-22), it may be assumed that a setting a given physical error rate p and a target logical error probability to be at most $\delta^{(M)}$ allows for a logical failure probability per distilled magic state using a given 114-to-14 magic state distillation process to be measured and may define a measurement distance when conducting lattice surgery measurements during said distillation. Using a noise model such as that which is described above for an injection of magic states, a logical failure probability per distilled magic state for one round of a 114-to-14 magic state distillation scheme may then be written as:

$$p_L^{(M)} = \frac{1}{14}30\bigg((\epsilon_{L,Z})^3 + \frac{1}{2}6(\epsilon_{L,Z})^2\epsilon_{L,X} + \frac{1}{4}12\epsilon_{L,Z}(\epsilon_{L,X})^2 + \frac{1}{8}8(\epsilon_{L,X})^3\bigg) =$$

$$\frac{30(1+\eta)^3}{378\eta^3}p^3.$$

$$p_L^{(M)} = \frac{1}{14}30\bigg((\epsilon_{L,Z})^3 + \frac{1}{2}6(\epsilon_{L,Z})^2\epsilon_{L,X} + \frac{1}{4}12\epsilon_{L,Z}(\epsilon_{L,X})^2 + \frac{1}{8}8(\epsilon_{L,X})^3\bigg) =$$

$$\frac{30(1+\eta)^3}{378\eta^3}p^3.$$

FIGS. 20A and 20B illustrate examples of a distillation tile located within a magic state factory that may be used for unencoded (e.g., without the use of a TELS protocol) and parallelized unencoded lattice-surgery-based magic state distillation (e.g., a 114-to-14 distillation), respectively, according to some embodiments.

In order to contrast space-time savings of the following distillation tile layouts for 114-to-14 TELS-based magic state distillation processes, FIGS. 20A and 20B first provide examples of distillation tile layouts for unencoded 114-to-14 magic state distillation processes. Distillation tile layouts such as those shown in FIGS. 20A and 20B may be used to perform magic state distillation in a Pauli frame, and with the use of auto-corrected non-Clifford gadgets such as that which is shown in FIG. 8D. Furthermore, if a distillation tile layout such as that which is shown in FIG. 20A is applied for an unencoded 114-to-14 magic state distillation process, 99 sequential lattice surgery measurements may be performed, while if a distillation tile layout such as that which is shown in FIG. 20B is applied for a parallelized unencoded 114-to-14 magic state distillation process, multi-qubit Pauli measurements may be performed two at a time and therefore 50 sequential lattice surgery measurements may be performed. Additional Z distance space savings may also be configured using a distillation tile layout, such as that which is shown in FIG. 20B, when performing a parallelized unencoded 114-to-14 magic state distillation process, according to some embodiments.

Figure 21:
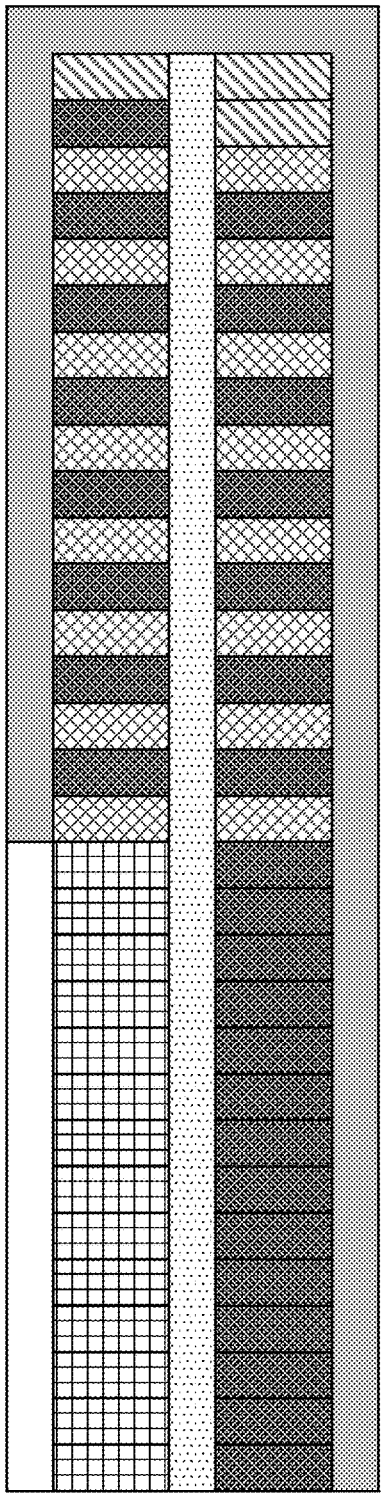
FIG. 21 illustrates a first example of a distillation tile located within a magic state factory that may be used for parallelized, TELS-based magic state distillation (e.g., a 114-to-14 distillation) implemented with a first type of classical error-correcting code, according to some embodiments.
Figure 22:
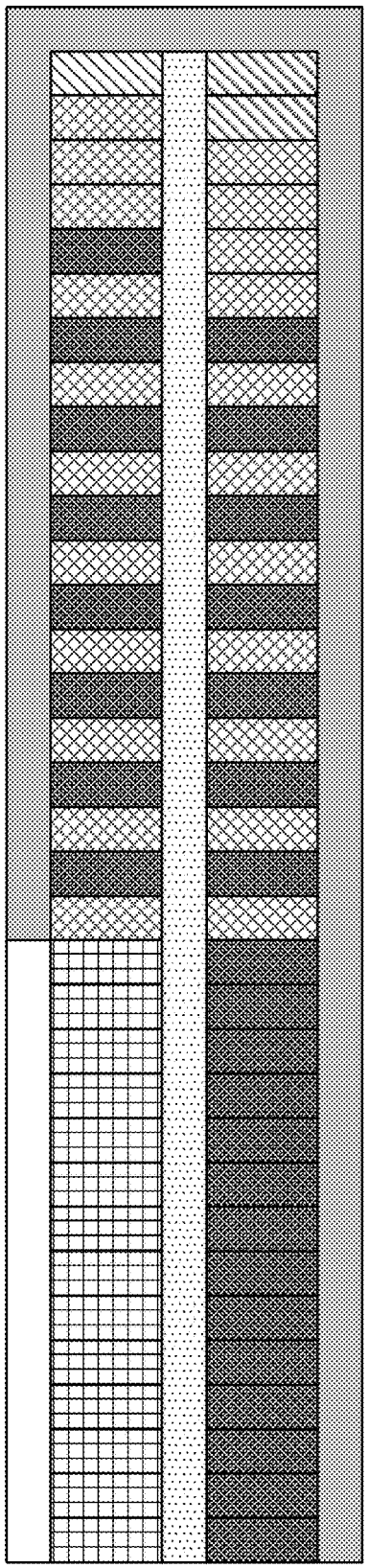
FIG. 22 illustrates a second example of a distillation tile located within a magic state factory that may be used for parallelized, TELS-based magic state distillation (e.g., a 114-to-14 distillation) implemented with a second type of classical error-correcting code, according to some embodiments.

FIG. 21 illustrates a first example of a distillation tile located within a magic state factory that may be used for parallelized, TELS-based magic state distillation (e.g., a 114-to-14 distillation) implemented with a first type of classical error-correcting code, according to some embodiments. FIG. 22 illustrates a second example of a distillation tile located within a magic state factory that may be used for parallelized, TELS-based magic state distillation (e.g., a 114-to-14 distillation) implemented with a second type of classical error-correcting code, according to some embodiments.

FIGS. 21 and 22 demonstrate example distillation tile layouts for parallelized TELS-based magic state distillation processes that use 114-to-14 magic state distillation, wherein FIG. 21 applies a [129,114,6] Zetterberg classical error-correcting code and FIG. 22 applies a [127,106,7] BCH classical error-correcting code. As shown via a design of routing space regions in FIG. 21, for example, a set of n=129 multi-qubit Pauli measurements may be performed within a time required for 65 sequential measurements, cutting a time cost nearly in half when using such parallelized TELS-based magic state distillation processes. It may also be noted that for 114-to-14 magic state distillation, there may be at most 15 additional multi-qubit Pauli measurements to perform due to the conditional Clifford corrections, the results of which may be used to detect if there are errors in the final distilled magic states, according to some embodiments.

Distillation Tile Designs for TELS-Based Magic State Distillation: Scheduling Distillation Tiles As introduced above, quantum computer architectures that perform Pauli-based computation generally contain at least one of each of the following: a processing core and a magic state distillation factory. A processing core may contain data qubits that take part in logical computation in order to execute a given quantum algorithm. As also introduced above, temporally encoded lattice surgery protocols may speed up a runtime of parallelizable Pauli sets executed in a processing core, and may also result in reduced space-time costs when applied to various magic state distillation processes. Yet another challenge within this domain space, however, is an optimization of the scheduling of distillation tiles within a given magic state factory such that there is sufficient routing space regions between distillation tiles of the magic state factory and a corresponding processing core in order to efficiently perform said logical computation (e.g., during merge steps between a magic state factory and a processing core) without time being wasted while a processing core waits on a next distilled magic state from the magic state factory. A person having ordinary skill in the art should understand that although discussion in the following paragraphs mainly centers around optimization of distillation tile scheduling, additional parameters (e.g., quantum hardware limits/conditions/noise, optimization of space vs time savings, a type of magic state distillation (15-to-1, 125-to-3, etc.) to use, a type of classical error-correcting code to use, distillation tile layouts to apply, etc.) may also play roles in a decision-making process of how to execute a given quantum algorithm.

When executing a given quantum algorithm, represented by a parallelizable Pauli set(s) of size k, in a processing core wherein the execution of the quantum algorithm is sped up using temporally encoded lattice surgery protocol(s), a time to execute a given algorithmic parallelizable Pauli set of one or more parallelizable Pauli sets that represent the quantum algorithm may be defined herein as $T_{PBC}$. Meanwhile, a corresponding magic state distillation factory will simultaneously be working to distill at least k new magic states for a next algorithmic parallelizable Pauli set of the sets, which may be defined herein as taking time $T_{magic}$. In general, quantum algorithms may operate on timescales that are longer than $T_{magic}$, and therefore it is advantageous to ensure that a processing core is never idle and waiting for newly distilled magic states. Such an idling of a processing core may be referred to as a magic-state bottleneck, and, in order to avoid this bottleneck, a condition of $T_{magic} \leq T_{PBC}$ may be set, according to some embodiments.

In order to satisfy a condition such as $T_{magic} \leq T_{PBC}$, a number of distillation tiles in a magic state factory that may be required to execute a given quantum algorithm may be optimized. Many factors may contribute to such an optimization, such as a size of a given parallelizable Pauli set and a type of temporally encoded lattice surgery protocol that is applied (e.g., a detection only protocol, a hybrid error detection and correction protocol, etc.), as a scheduling of magic state distillation tiles may be impacted by instances such as when an error is detected and causes a distillation tile to be reinitialized without having produced distilled magic states, etc. In the following paragraphs, a round robin scheduling design is proposed, and, in order to contrast time savings due to said round robin scheduling, an example of a previously used scheduling design will be introduced, wherein the previously used scheduling design is more susceptible to large time costs when a distillation tile fails (e.g., detects an error and is caused to reinitialize and restart the distillation process). It may also be noted that such a round robin scheduling design, such as that which is proposed in the following paragraphs, may also be used when distilling lower level magic states in a concatenated distillation protocol, according to some embodiments.

Firstly, a situation is considered wherein the condition $T_{magic} \leq T_{PBC}$ is satisfied and k is greater than or equal to a number of magic state storage cells (see "distilled magic state storage" cells in FIGS. 10A-11C and in FIGS. 12A-22) in a given magic state factory. Such a situation may imply that each distillation tile in the given magic state factory takes less time to produce magic states than $T_{PBC}$. Therefore, a previously used scheduling design may include starting magic state distillation on all distillation tiles when a new parallelizable Pauli set is beginning to be executed in a processing core. However, if said processing core is only marginally slower than the given magic state factory, and a given distillation tile rejects (e.g., detects an error and a reinitialization is caused such that distillation restarts in the given distillation tile), the processing core must wait for additional distilled magic states to be produced within the magic state factory, wherein a worst-case scenario would be that the processing core must wait for time $T_m$, wherein $T_m$ may be defined herein as a time needed to produce distilled magic states in the distillation tile that rejected and restarted.

In some embodiments, a round robin scheduling may instead be used to optimize the condition and reduce any potential time that a processing core might be waiting for newly distilled magic states. Given the above conditions, it may be assumed that, in a scenario wherein no errors are detected during a magic state distillation process for a given distillation tile, the distillation tile produces 1 magic state in time $T_m$ using a deterministic algorithm, according to some embodiments. Therefore, a probability that a distillation tile detects an error on an input magic state, and/or that a given temporally encoded lattice surgery protocol being applied detects a logical time-like failure during lattice surgery is $p_D$. If D distillation tiles are being used with a proposed round robin scheduling design, then an average time to distill k magic states is:

$$T_{magic} =$$

$$\frac{T_m k}{lD} + \binom{k/l}{1} p_D (1-p_D)^{k/l-1} \frac{T_m}{D} + \binom{k/l+1}{2} p_D^2 (1-p_D)^{k/l-1} \frac{2T_m}{D} + \ldots =$$

$$\frac{T_m k}{lD} + \left(\frac{p_D(1-p_D)^{k/l-1} T_m}{D}\right) \times \sum_{j=1}^{\infty} j \binom{k/l+j-1}{j} p_D^{j-1} =$$

$$\frac{T_m k}{lD} + \left(\frac{p_D(1-p_D)^{k/l-1} T_m}{D}\right) \frac{k}{l} (1-p_D)^{-k/l-1} = \frac{T_m k(1-p_D+p_D^2)}{lD(1-p_D)^2}.$$

$$T_{magic} =$$

$$\frac{T_m k}{lD} + \binom{k/l}{1} p_D (1-p_D)^{k/l-1} \frac{T_m}{D} + \binom{k/l+1}{2} p_D^2 (1-p_D)^{k/l-1} \frac{2T_m}{D} + \ldots =$$

$$\frac{T_m k}{lD} + \left(\frac{p_D(1-p_D)^{k/l-1} T_m}{D}\right) \times \sum_{j=1}^{\infty} j \binom{k/l+j-1}{j} p_D^{j-1} =$$

$$\frac{T_m k}{lD} + \left(\frac{p_D(1-p_D)^{k/l-1} T_m}{D}\right) \frac{k}{l} (1-p_D)^{-k/l-1} = \frac{T_m k(1-p_D+p_D^2)}{lD(1-p_D)^2}.$$

$$T_{magic} =$$

$$\frac{T_m k}{lD} + \binom{k/l}{1} p_D (1-p_D)^{k/l-1} \frac{T_m}{D} + \binom{k/l+1}{2} p_D^2 (1-p_D)^{k/l-1} \frac{2T_m}{D} + \ldots =$$

$$\frac{T_m k}{lD} + \left(\frac{p_D(1-p_D)^{k/l-1} T_m}{D}\right) \times \sum_{j=1}^{\infty} j \binom{k/l+j-1}{j} p_D^{j-1} =$$

$$\frac{T_m k}{lD} + \left(\frac{p_D(1-p_D)^{k/l-1} T_m}{D}\right) \frac{k}{l} (1-p_D)^{-k/l-1} = \frac{T_m k(1-p_D+p_D^2)}{lD(1-p_D)^2}.$$

$$T_{magic} =$$

$$\frac{T_m k}{lD} + \binom{k/l}{1} p_D (1-p_D)^{k/l-1} \frac{T_m}{D} + \binom{k/l+1}{2} p_D^2 (1-p_D)^{k/l-1} \frac{2T_m}{D} + \ldots =$$

$$\frac{T_m k}{lD} + \left(\frac{p_D(1-p_D)^{k/l-1} T_m}{D}\right) \times \sum_{j=1}^{\infty} j \binom{k/l+j-1}{j} p_D^{j-1} =$$

$$\frac{T_m k}{lD} + \left(\frac{p_D(1-p_D)^{k/l-1} T_m}{D}\right) \frac{k}{l} (1-p_D)^{-k/l-1} = \frac{T_m k(1-p_D+p_D^2)}{lD(1-p_D)^2}.$$

Figure 23:
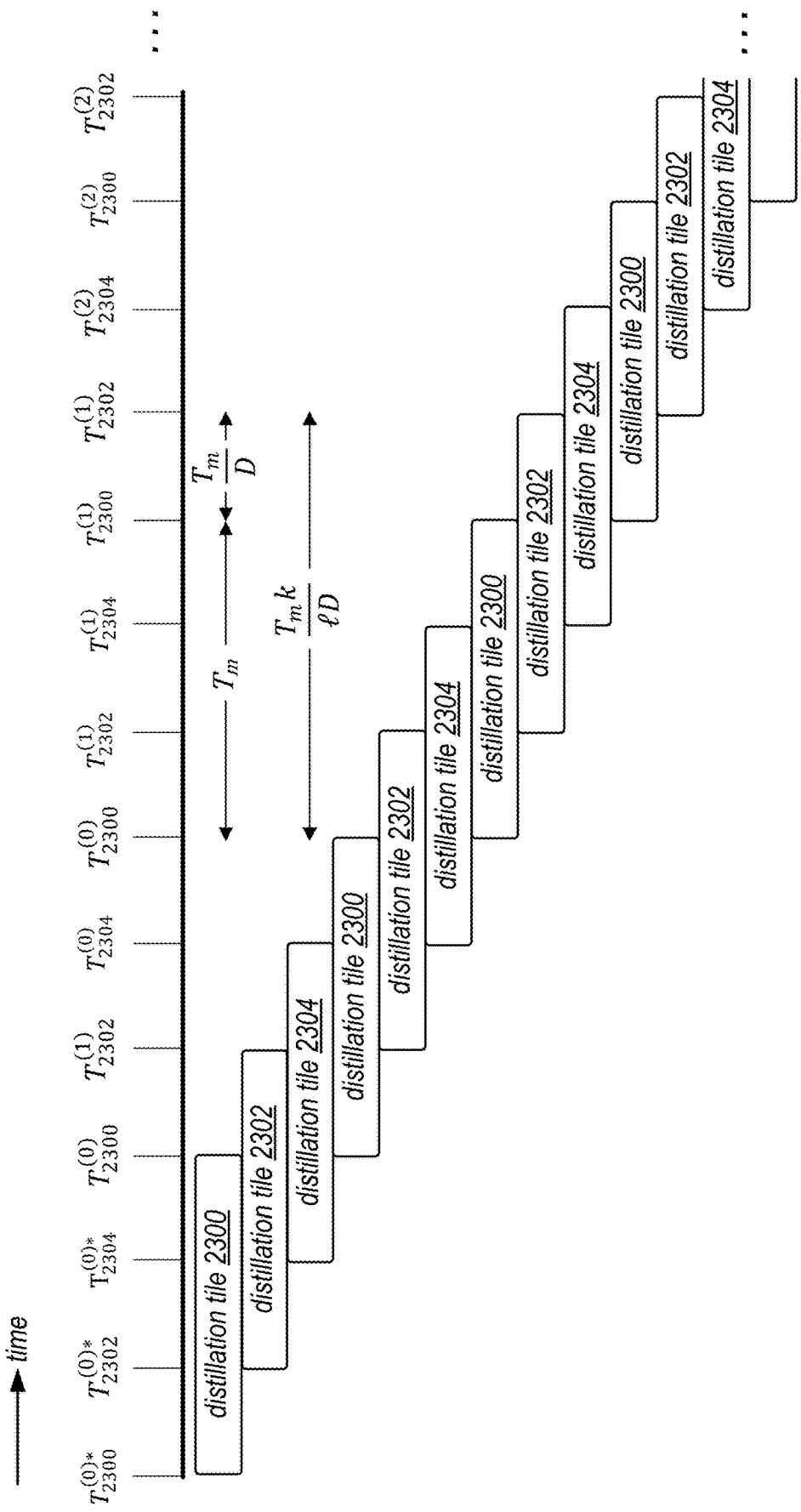
FIG. 23 illustrates an example of a round-robin scheduling of distillation tiles within a magic state factory that may be used to reduce a waiting time of a quantum processing core on distilled magic states produced in said magic state factory, according to some embodiments.

FIG. 23 illustrates an example of a round-robin scheduling of distillation tiles within a magic state factory that may be used to reduce a waiting time of a quantum processing core on distilled magic states produced in said magic state factory, according to some embodiments.

A round robin scheduling design is demonstrated in FIG. 23 wherein there are D=3 distillation tiles (e.g., distillation tiles 2300, 2302, and 2304) that each produce l=2 distilled magic states (within a given round of magic state distillation) within at most time $T_m$, according to some embodiments. It may be further understood in FIG. 23 that, for parallelizable Pauli sets of size k=8, a processing code may require up to 8 distilled magic states that may be distilled and prepared within time $$\frac{T_m k}{lD}$$

if no errors are detected, as shown in the figure. As shown in FIG. 23, a horizontal axis of the plot shows increasing time (from left to right, as indicated by the arrow), wherein certain moments in time are marked above the tick marks. Moment in time $T_j^{(i)}$ indicates an end of a given round of a magic state distillation process (e.g., wherein "end" signifies that one or more distilled magic states have been successfully produced) in a jth distillation tile of a magic state factory while accumulating magic states for an ith parallelizable Pauli set of a given quantum algorithm that is being executed in a given processing core of a quantum computer. A moment in time $T_j^{(i)*}$ further indicates that a jth distillation tile is beginning a magic state distillation process for a first time during execution of a given quantum algorithm. Generalizing and solving for a number of distillation tiles that may be required when $T_{magic} < T_{PBC}$ with D distillation tiles scheduled via a round robin scheduling design, D may be defined by $$D = \frac{T_m k(1-p_D+p_D^2)}{lT_{magic}(1-p_D)^2}.$$

A round robin scheduling design may be implemented for any of the distillation tile layouts described herein, and/or additional distillation tile layout designs for a magic state factory (e.g., square distillation tiles instead of asymmetrical/rectangular tiles, etc.), in addition to various TELS-based magic state distillation processes. Adapting a round robin scheduling design to a specific type of distillation tile used within a magic state factory may allow for a more precise calculation of a time cost to execute said magic state factory configuration, which may further reduce a required number of distillation tiles, according to some embodiments.

Figure 24:
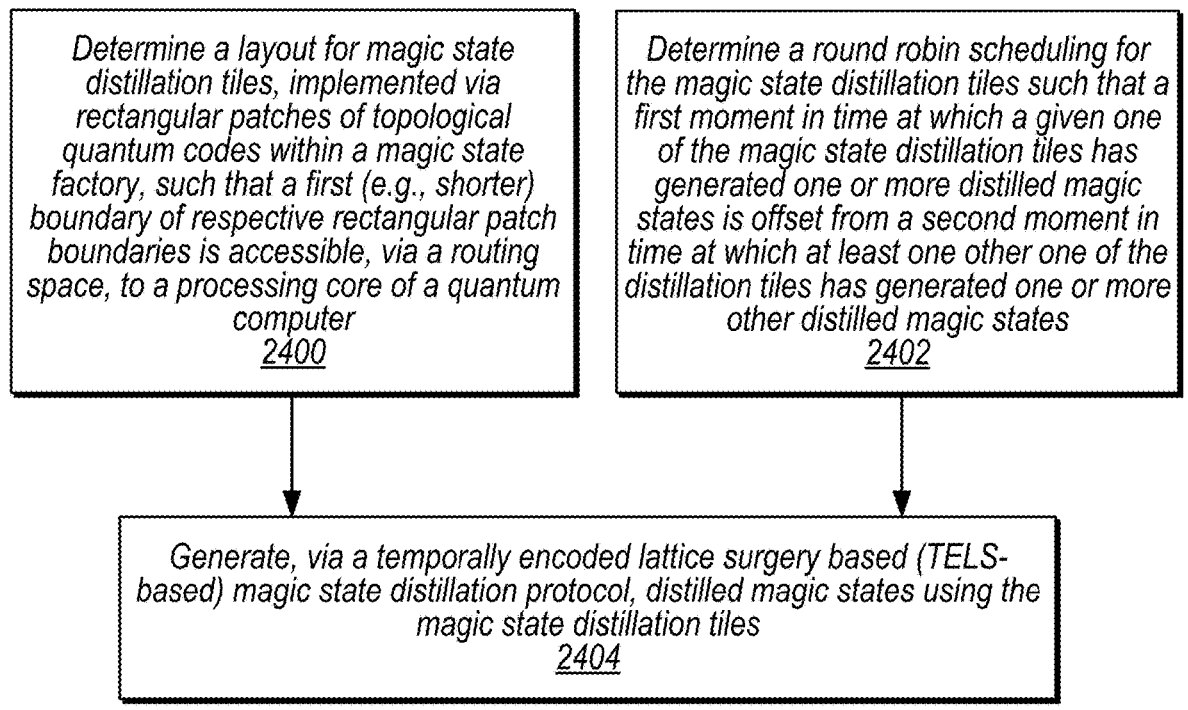
FIG. 24 is a flow diagram illustrating a process of optimizing production of distilled magic states using TELS-based magic state distillation, according to some embodiments.

FIG. 24 is a flow diagram illustrating a process of optimizing production of distilled magic states using TELS-based magic state distillation, according to some embodiments.

In block 2400, a layout for magic state distillation tiles is determined. In some embodiments, magic state distillation tiles may be configured such that shorter boundaries (e.g., X boundaries) of the given rectangular code patches may be made accessible, via one or more routing space regions, to a processing core of a corresponding quantum computer which the magic state distillation tiles within a magic state factory are servicing. Many additional considerations may be included in a process of optimizing a layout for magic state distillation tiles. For example, a type of distillation circuit (e.g., a 15-to-1 distillation circuit, a 125-to-3 distillation circuit, a 116-to-12 distillation circuit, a 114-to-14 distillation circuit, etc.) may describe a number of input magic states and output distilled magic states that are to be generated within a given magic state distillation tile, which may, in turn, define parameters of the layout in addition to a use (or not) of one or more temporally encoded lattice surgery protocols. In another example, a layout may be optimized for a given classical error-correcting code that is applied to a given TELS-based magic state distillation process (e.g., Single Error Detect (SED), Bose-Chaudhuri-Hocquenghem (BCH), Golay, etc.). In yet another example, a layout may be optimized such that twist-based lattice surgery measurements may be performed. In addition, layouts for magic state distillation tiles may be further optimized for performing parallelized lattice surgery measurements (e.g., wherein both X-type boundaries (which constitute the same logical boundary) of the data qubits within a magic state distillation tile may be accessible to the processing core via one or more routing spaces). In some embodiments, parallelized lattice surgery measurements may be performed via accessing both boundaries which have the same logical boundary of a given rectangular cell (e.g., the two "shorter boundaries" of cell 1100 as shown in FIG.

11A which both represent X-type logical boundaries, as opposed to one shorter boundary and one longer boundary of cell 1100, for example).

In block 2402, a scheduling for the magic state distillation tiles is determined. In some embodiments, such a scheduling may resemble a "round robin" scheduling design in which, at any given moment in time, at least some of the respective magic state distillation tiles are at different stages in an overall TELS-based magic state distillation process. A round robin scheduling (e.g., that which is demonstrated in FIG. 23) may be implemented in order to minimize any potential waiting time of the processing core wherein the processing core is waiting for newly distilled magic states in order to perform multi-qubit Pauli measurements according to a given quantum algorithm currently being executed. In some embodiments, blocks 2400 and 2402 may be performed sequentially, in parallel, and/or at separate moments in time in a process of magic state distillation, and in combination (or not) with additional steps that may be required to prepare and perform the magic state distillation process. Then, in block 2404, distilled magic states are generated via a TELS-based magic state distillation process, such as those described herein, using the magic state distillation tile layouts and scheduling design as described above.

Embodiments of the present disclosure may be described in view of the following clauses:

Clause 1. A system, comprising:
one or more quantum hardware devices configured to implement two or more surface code patches;
one or more computing devices configured to execute a quantum algorithm using the two or more surface code patches, wherein to execute the quantum algorithm, the one or more computing devices are further configured to:
  determine a sequence of multi-qubit Pauli measurements to be performed for multi-qubit Pauli operators that represent the quantum algorithm using Pauli-based computation;
  determine a classical error-correcting code to be used to encode the multi-qubit Pauli operators into respective codewords;
  encode the multi-qubit Pauli operators into the respective codewords based, at least in part, on the determined classical error-correcting code;
  determine a weight limit, based, at least in part, on the determined classical error-correcting code, for weights of potential logical time-like failures that are to be corrected during performance of the sequence of multi-qubit Pauli measurements;
  perform, via a temporally encoded lattice surgery protocol, the sequence of multi-qubit Pauli measurements for the encoded multi-qubit Pauli operators, wherein the temporally encoded lattice surgery protocol is configured to cause the one or more computing devices to:
    correct one or more given logical time-like failures, when the one or more given logical time-like failures correspond to classical error syndromes with weights less than or equal to the determined weight limit; and
    detect one or more other given logical time-like failures and repeat the sequence of multi-qubit Pauli measurements for the encoded multi-qubit Pauli operators, when the one or more other given logical time-like failures correspond to other classical error syndromes with weights greater than the determined weight limit; and
  provide a logical result of the quantum algorithm based, at least in part, on the performed sequence of multi-qubit Pauli measurements.

Clause 2. The system of clause 1, wherein the sequence of multi-qubit Pauli measurements are performed using logical data qubits and magic states.

Clause 3. The system of clause 1, wherein to determine the classical error-correcting code, the one or more computing devices are configured to determine the classical error-correcting code based, at least in part, on:
  a size of a parallelizable Pauli set, wherein the multi-qubit Pauli operators represent the Pauli-based computation of respective Paulis of the parallelizable Pauli set;
  a distance parameter of the classical error-correcting code; and
  an error rate tolerance for the sequence of multi-qubit Pauli measurements, wherein the error rate tolerance is based, at least in part, on a logical error rate per multi-qubit Pauli operator in the multi-qubit Pauli operators.

Clause 4. The system of clause 1, wherein:
the multi-qubit Pauli operators represent the Pauli-based computation of respective Paulis of a parallelizable Pauli set; and
the sequence of multi-qubit Pauli measurements comprises one or more redundant measurements, wherein the one or more redundant measurements comprise at least one of the following:
  remeasurement of one or more Paulis of the parallelizable Pauli set; or
  measurement of a product of two or more Paulis of the parallelizable Pauli set.

Clause 5. The system of clause 4, wherein:
to perform the sequence of multi-qubit Pauli measurements for the encoded multi-qubit Pauli operators, the temporally encoded lattice surgery protocol is further configured to further cause the one or more computing devices to perform a number of rounds of syndrome measurements, using the two or more surface code patches; and
the number of rounds of syndrome measurements is based, at least in part, on the use of the one or more redundant measurements of the one or more Paulis of the parallelizable Pauli set.

Clause 6. The system of clause 1, wherein to perform the sequence of multi-qubit Pauli measurements for the encoded multi-qubit Pauli operators, the temporally encoded lattice surgery protocol is further configured to further cause the one or more computing devices to perform a number of rounds of syndrome measurements, using the two or more surface code patches, for respective steps in the sequence of multi-qubit Pauli measurements.

Clause 7. The system of clause 6, wherein:
the temporally encoded lattice surgery protocol is further configured to further cause the one or more computing devices to determine the number of rounds of syndrome measurements to perform based, at least in part, on an error rate tolerance for the sequence of multi-qubit Pauli measurements; and
the error rate tolerance is based, at least in part, on a logical error rate per multi-qubit Pauli operator in the multi-qubit Pauli operators.

Clause 8. The system of clause 1, wherein to determine the weight limit, the one or more computing devices are further configured to determine the weight limit based additionally, at least in part, on the weight limit being less than a distance parameter of the determined classical error-correcting code.

Clause 9. A method, comprising:
  determining a sequence of multi-qubit Pauli measurements to be performed, via a temporally encoded lattice surgery protocol, for multi-qubit Pauli operators that represent a quantum algorithm using Pauli-based computation;
  determining a classical error-correcting code to be used to encode the multi-qubit Pauli operators into respective codewords;
  encoding the multi-qubit Pauli operators into the respective codewords based, at least in part, on the determined classical error-correcting code;
  determining a weight limit, based, at least in part, on the determined classical error-correcting code, for potential logical time-like failures that are to be corrected during performance of the sequence of multi-qubit Pauli measurements, wherein:
    given potential logical time-like failures, corresponding to classical error syndromes with weights less than or equal to the weight limit, are corrected; and
    other potential logical time-like failures, corresponding to other classical error syndromes with weights greater than the weight limit, cause the performance of the sequence of multi-qubit Pauli measurements to be repeated, wherein;
  performing, via the temporally encoded lattice surgery protocol, the sequence of multi-qubit Pauli measurements for the encoded multi-qubit Pauli operators, wherein the performing the sequence of multi-qubit Pauli measurements comprises:
    determining that there are no logical time-like failures with weights greater than the determined weight limit; and
    correcting, responsive to determining that one or more logical time-like failures have weights less than or equal to the determined weight limit, the one or more logical time-like failures; and
  providing a logical result of the quantum algorithm based, at least in part, on the performed sequence of multi-qubit Pauli measurements.

Clause 10. The method of clause 9, wherein:
the performing, via the temporally encoded lattice surgery protocol, the sequence of multi-qubit Pauli measurements further comprises:
  proceeding to said determining that there are no logical time-like failures and said correcting the one or more logical time-like failures,
    determining that there are one or more other logical time-like failures that correspond to other classical error syndromes with weights greater than the determined weight limit; and
    repeating the sequence of multi-qubit Pauli measurements for the encoded multi-qubit Pauli operators; and
  said determining that there are no logical time-like failures and said correcting the one or more logical time-like failures occur using the repeated sequence of multi-qubit Pauli measurements.

Clause 11. The method of clause 9, wherein the performing the sequence of multi-qubit Pauli measurements further comprises:
  performing, for respective steps in the sequence of multi-qubit Pauli measurements, a number of rounds of syndrome measurements.

Clause 12. The method of clause 9, further comprising determining a size of a parallelizable Pauli set, wherein:
  the multi-qubit Pauli operators represent the Pauli-based computation of respective Paulis of the parallelizable Pauli set; and
  the determining the classical error-correcting code to be used to encode the multi-qubit Pauli operators into the respective codewords is based, at least in part, on the size of the parallelizable Pauli set.

Clause 13. The method of clause 9, wherein:
the determining the weight limit is further determined based, at least in part, on an error rate tolerance for the sequence of multi-qubit Pauli measurements; and
the error rate tolerance is based, at least in part, on a logical error rate per multi-qubit Pauli operator in the multi-qubit Pauli operators.

Clause 14. The method of clause 9, wherein the multi-qubit Pauli operators represent the Pauli-based computation of respective Paulis of an overcomplete parallelizable Pauli set.

Clause 15. The method of clause 9, wherein:
the performing, via the temporally encoded lattice surgery protocol, the sequence of the multi-qubit Pauli measurements is executed using surface code patches of one or more quantum hardware devices;
the determining the classical error-correcting code to be used to encode the multi-qubit Pauli operators into the respective codewords is based, at least in part, on a circuit-level noise model for the quantum algorithm; and
the circuit-level noise model is based, at least in part, on one or more of the following:
  one or more errors pertaining to single qubit gates acting on given qubits of the surface code patches;
  one or more errors pertaining to multi-qubit gates between given qubits of the surface code patches;
  one or more measurement errors pertaining to rounds of syndrome measurements performed during the performance of the sequence of the multi-qubit Pauli measurements;
  one or more errors pertaining to ancilla qubit reset timesteps of the rounds of syndrome measurements; or
  one or more errors pertaining to idling of given qubits of the surface code patches.

Clause 16. A non-transitory, computer-readable, medium storing program instructions that, when executed on or across one or more processors, cause the one or more processors to:
  determine a sequence of multi-qubit Pauli measurements to be performed, via a temporally encoded lattice surgery protocol, for multi-qubit Pauli operators that represent a quantum algorithm using Pauli-based computation;
  determine a classical error-correcting code to be used to encode the multi-qubit Pauli operators into respective codewords;
  encode the multi-qubit Pauli operators into the respective codewords based, at least in part, on the determined classical error-correcting code;
  determine a weight limit, based, at least in part, on the determined classical error-correcting code, for potential logical time-like failures that are to be corrected during performance of the sequence of multi-qubit Pauli measurements, wherein:

given potential logical time-like failures that correspond to classical error syndromes with weights less than or equal to the weight limit are corrected; and other potential logical time-like failures that correspond to other classical error syndromes with weights greater than the weight limit cause the performance of the sequence of multi-qubit Pauli measurements to be repeated;

perform, via the temporally encoded lattice surgery protocol, the sequence of multi-qubit Pauli measurements for the encoded multi-qubit Pauli operators, based, at least in part, on the determined weight limit; and provide a logical result of the quantum algorithm based, at least in part, on the performed sequence of multi-qubit Pauli measurements.

Clause 17. The non-transitory, computer-readable medium of clause 16, wherein to perform the sequence of multi-qubit Pauli measurements, the program instructions further cause the one or more processors to:

determine that there are no logical time-like failures that correspond to classical error syndromes with weights greater than the determined weight limit;

determine that there are one or more logical time-like failures that correspond to other classical error syndromes with weights less than or equal to the determined weight limit; and correct, the one or more logical time-like failures with weights less than or equal to the determined weight limit.

Clause 18. The non-transitory, computer-readable medium of clause 16, wherein to perform the sequence of multi-qubit Pauli measurements, the program instructions further cause the one or more processors to:

determine that there are one or more logical time-like failures that correspond to classical error syndromes with weights greater than the determined weight limit; and repeat the sequence of multi-qubit Pauli measurements for the encoded multi-qubit Pauli operators.

Clause 19. The non-transitory, computer-readable medium of clause 16, wherein to perform the sequence of multi-qubit Pauli measurements, the program instructions further cause the one or more processors to:

cause rounds of syndrome measurements to be performed; and detect that one or more logical time-like failures have occurred, wherein said detection is based, at least in part, on a relationship between results of the rounds of syndrome measurements and a parity check matrix of the determined classical error-correcting code.

Clause 20. The non-transitory, computer-readable medium of clause 16, wherein to determine the weight limit, the program instructions further cause the one or more processors to determine the weight limit based additionally, at least in part, on the weight limit being less than a distance parameter of the determined classical error-correcting code.

Clause 21. A system, comprising:

one or more quantum hardware devices configured to implement a magic state factory for a quantum computer that uses topological quantum codes; and one or more computing devices configured to cause the magic state factory to generate, via a temporally encoded lattice surgery based (TELS-based) magic state distillation process, distilled magic states, wherein, to generate the distilled magic states, the one or more computing devices are further configured to:

generate a distillation circuit comprising:
multi-qubit non-Clifford gates, implemented using multi-qubit Pauli operators; and
logical single-qubit measurements; and cause the one or more quantum hardware devices to:
perform, via a first temporally encoded lattice surgery protocol, lattice surgery measurements, corresponding to the multi-qubit non-Clifford gates of the distillation circuit, using an initial set of magic states, wherein the one or more computing devices, when carrying out the first temporally encoded lattice surgery protocol, are further configured to further cause the one or more quantum hardware devices to:

abort a series of lattice surgery measurements if a non-trivial lattice surgery measurement failure is detected; and remeasure the series of lattice surgery measurements, based, at least in part, on the non-trivial lattice surgery measurement failure;

provide one or more distilled magic states, of the initial set of magic states; and perform, via a second temporally encoded lattice surgery protocol, the logical single-qubit measurements based, at least in part, on the performed lattice surgery measurements of the first temporally encoded lattice surgery protocol.

Clause 22. The system of clause 21, wherein the one or more computing devices, when carrying out the first temporally encoded lattice surgery protocol, are further configured to cause the one or more quantum hardware devices to reinitialize, prior to the remeasure the series of lattice surgery measurements, qubits of the magic state factory.

Clause 23. The system of clause 21, wherein the multi-qubit Pauli operators of the distillation circuit represent Pauli-based computation of respective Paulis of a parallelizable Pauli set.

Clause 24. The system of clause 21, wherein the one or more computing devices, when carrying out the first temporally encoded lattice surgery protocol, are further configured to:

determine that the non-trivial lattice surgery measurement failure corresponds to a classical error syndrome that has a weight less than or equal to a weight limit, wherein the weight limit represents a maximum weight of a potential non-trivial lattice surgery measurement failure that is to be corrected via the first temporally encoded lattice surgery protocol; and correct, prior to the provide the one or more distilled magic states, the non-trivial lattice surgery measurement failure.

Clause 25. The system of clause 21, wherein to generate the distillation circuit, the one or more computing devices are further configured to determine a classical error-correcting code to be implemented in the first temporally encoded lattice surgery protocol.

Clause 26. The system of clause 25, wherein to generate the distillation circuit, the one or more computing devices are further configured to generate a cyclic codeword generator matrix based, at least in part, on the determined classical error-correcting code.

Clause 27. The system of clause 21, wherein the one or more computing devices are further configured to determine a classical error-correcting code to be implemented in the second temporally encoded lattice surgery protocol based, at least in part, on the performed lattice surgery measurements of the first temporally encoded lattice surgery protocol.

Clause 28. A method for performing a temporally encoded lattice surgery based (TELS-based) magic state distillation process, the method comprising:
> generating a distillation circuit for distilling magic states, via the TELS-based magic state distillation process, in a magic state factory of a quantum computer that uses topological quantum codes;
> performing, via a first temporally encoded lattice surgery protocol, lattice surgery measurements, corresponding to multi-qubit non-Clifford gates, implemented using multi-qubit Pauli operators, of the distillation circuit, using an initial set of magic states;
> providing, responsive to determining that there is no non-trivial lattice surgery measurement failure, one or more distilled magic states; and
> performing, via a second temporally encoded lattice surgery protocol, logical single-qubit measurements of the distillation circuit based, at least in part, on the performing, via the first temporally encoded lattice surgery protocol, the lattice surgery measurements.

Clause 29. The method of clause 28, wherein said performing, via the first temporally encoded lattice surgery protocol, the lattice surgery measurements comprises:
> determining that a non-trivial lattice surgery measurement failure has occurred; and
> remeasuring the lattice surgery measurements.

Clause 30. The method of clause 28, wherein said performing, via the first temporally encoded lattice surgery protocol, the lattice surgery measurements comprises:
> determining a weight limit, based, at least in part, on a determined classical error-correcting code of the distillation circuit, for potential logical time-like failures that are to be corrected during performance of the first temporally encoded lattice surgery protocol, wherein:
>> given potential logical time-like failures that correspond to classical error syndromes with weights less than or equal to the weight limit are corrected; and
>> other potential logical time-like failures that correspond to other classical error syndromes with weights greater than the weight limit cause the performance of the lattice surgery measurements to be repeated.

Clause 31. The method of clause 28, wherein said generating the distillation circuit for distilling the magic states comprises:
> determining a classical error-correcting code to be used to encode the multi-qubit Pauli operators of the distillation circuit into respective codewords, wherein the multi-qubit Pauli operators represent Pauli-based computation of respective Paulis of a parallelizable Pauli set; and
> generating a cyclic codeword generator matrix based, at least in part, on the determined classical error-correcting code.

Clause 32. The method of clause 31, wherein said generating the distillation circuit for distilling the magic states further comprises determining a number, based, at least in part, on the determined cyclic codeword generator matrix, of distilled magic states to be held in magic state storage cells of respective distillation tiles implemented in the magic state factory.

Clause 33. The method of clause 28, further comprising determining a classical error-correcting code to be implemented in the second temporally encoded lattice surgery protocol based, at least in part, on the performed lattice surgery measurements of the first temporally encoded lattice surgery protocol.

Clause 34. The method of clause 28, further comprising determining a layout for distillation tiles implemented in the magic state factory of the quantum computer, wherein:
> the distillation tiles are implemented via patches of the topological quantum codes; and
> a first boundary of respective patch boundaries within the distillation tiles is accessible, via a routing space, by a processing core of the quantum computer.

Clause 35. The method of clause 34, further comprising:
> determining a round robin scheduling to be used in the distilling the magic states, using the distillation tiles, wherein a first moment in time at which a given one of the distillation tiles has generated one or more distilled magic states of the provided distilled magic states is offset from a second moment in time at which at least one other one of the distillation tiles has generated one or more other distilled magic states of the provided distilled magic states.

Clause 36. The method of clause 28, wherein said generating the distillation circuit for the distilling the magic state comprises:
> determining a classical error-correcting code to be used to encode the multi-qubit Pauli operators of the distillation circuit into respective codewords, wherein said determining the classical error-correcting code is based, at least in part, on:
>> a size of a parallelizable Pauli set, wherein multi-qubit Pauli measurements of the distillation circuit represent Pauli-based computation of respective Paulis of the parallelizable Pauli set;
>> a distance parameter of the classical error-correcting code; and
>> an error rate tolerance for the multi-qubit Pauli measurements to be performed via the first temporally encoded lattice surgery protocol.

Clause 37. A non-transitory, computer-readable, medium storing program instructions that, when executed on or across one or more processors, cause the one or more processors to:
> generate a distillation circuit for distilling magic states, via a temporally encoded lattice surgery based (TELS-based) magic state distillation process, in a magic state factory of a quantum computer that uses topological quantum codes;
> perform, via a first temporally encoded lattice surgery protocol, lattice surgery measurements corresponding to multi-qubit non-Clifford gates, implemented using multi-qubit Pauli operators, of the distillation circuit using an initial set of magic states;
> provide, responsive to determining that there is no non-trivial lattice surgery measurement failure, one or more distilled magic states, of the initial set of magic states; and
> perform, via a second temporally encoded lattice surgery protocol, logical single-qubit measurements of the distillation circuit based, at least in part, on the performed the lattice surgery measurements of the first temporally encoded lattice surgery protocol.

Clause 38. The non-transitory, computer-readable medium of clause 37, wherein to perform, via the first temporally encoded lattice surgery protocol, the lattice surgery measurements, the program instructions further cause the one or more processors to:
> determine that a non-trivial lattice surgery measurement failure has occurred; and
> remeasure the lattice surgery measurements.

Clause 39. The non-transitory, computer-readable medium of clause 37, wherein to perform, via the first temporally encoded lattice surgery protocol, the lattice surgery measurements, the program instructions further cause the one or more processors to:

determine that a non-trivial lattice surgery measurement failure has occurred;

determine that the non-trivial lattice surgery measurement failure corresponds to a classical error syndrome that has a weight less than or equal to a weight limit, wherein the weight limit represents a maximum weight of a potential non-trivial lattice surgery measurement failure that is to be corrected via the first temporally encoded lattice surgery protocol; and correct, prior to the provide the one or more distilled magic states, the non-trivial lattice surgery measurement failure.

Clause 40. The non-transitory, computer-readable medium of clause 37, wherein the multi-qubit Pauli operators of the distillation circuit represent Pauli-based computation of respective Paulis of a parallelizable Pauli set.

Illustrative Computer System

Figure 25:
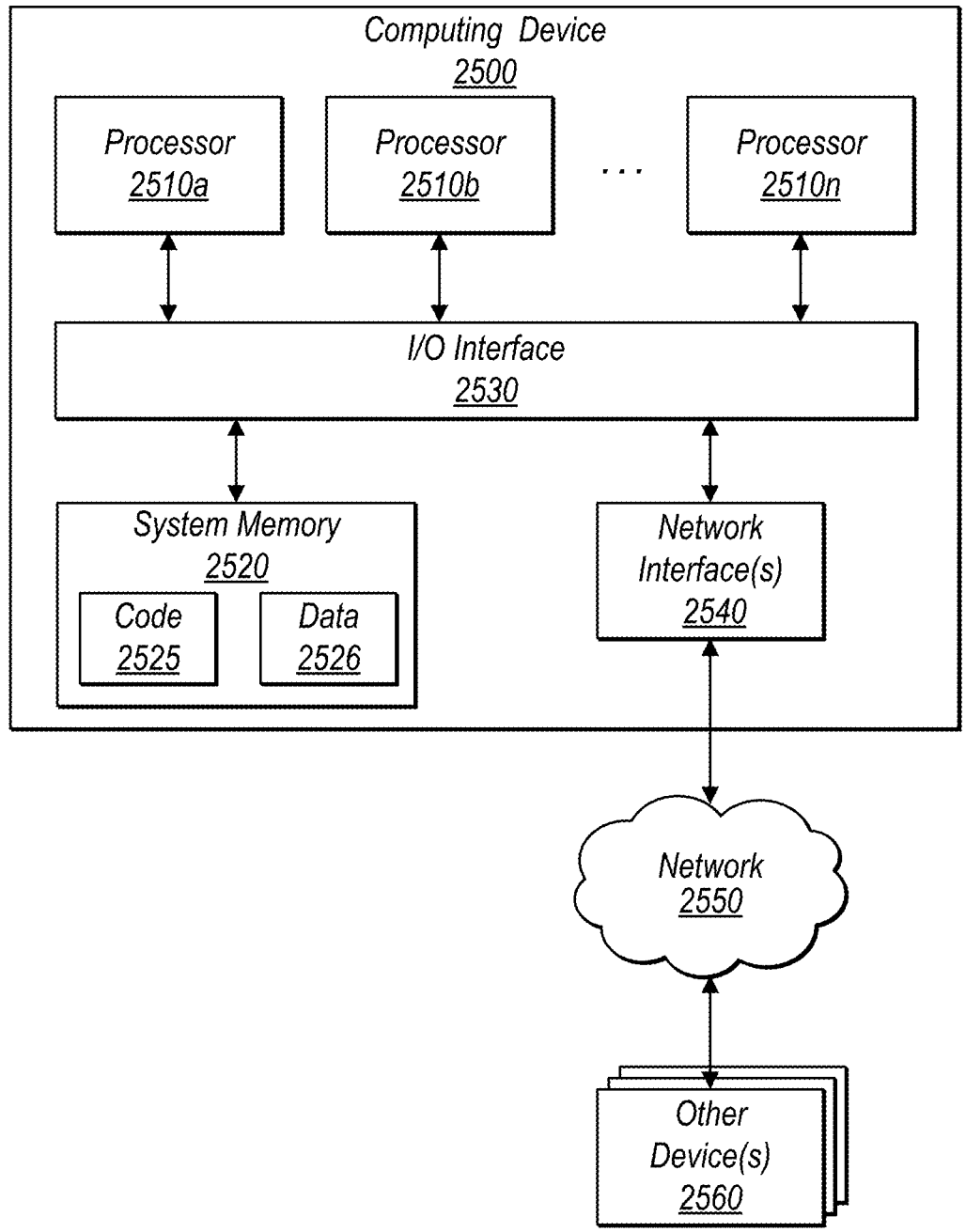
FIG. 25 is a block diagram illustrating an example computing device that may be used in at least some embodiments.

FIG. 25 is a block diagram illustrating an example computing device that may be used in at least some embodiments. In some embodiments, the computing device 2500 shown in FIG. 25 may be used to implement any of the techniques described above in FIGS. 1-24 and, in some embodiments, may be used to implement protocols, techniques, etc. described herein. For example, program instructions that implement protocols, techniques, etc. described herein may be stored in a non-transitory computer readable medium and/or may be executed by one or more processors, such as the processors of computer system 2500.

FIG. 25 illustrates such a general-purpose computing device 2500 as may be used in any of the embodiments described herein. In the illustrated embodiment, computing device 2500 includes one or more processors 2510 coupled to a system memory 2520 (which may comprise both non-volatile and volatile memory modules) via an input/output (I/O) interface 2530. Computing device 2500 further includes a network interface 2540 coupled to I/O interface 2530. Classical computing functions such as encoding and decoding Pauli measurements, controlling a quantum hardware device, and other non-quantum operations as described herein may be performed on a classical computer system, such as computing device 2500.

In various embodiments, computing device 2500 may be a uniprocessor system including one processor 2510, or a multiprocessor system including several processors 2510 (e.g., two, four, eight, or another suitable number). Processors 2510 may be any suitable processors capable of executing instructions. For example, in various embodiments, processors 2510 may be general-purpose or embedded processors implementing any of a variety of instruction set architectures (ISAs), such as the x86, PowerPC, SPARC, or MIPS ISAs, or any other suitable ISA. In multiprocessor systems, each of processors 2510 may commonly, but not necessarily, implement the same ISA. In some implementations, graphics processing units (GPUs) may be used instead of, or in addition to, conventional processors.

System memory 2520 may be configured to store instructions and data accessible by processor(s) 2510. In at least some embodiments, the system memory 2520 may comprise both volatile and non-volatile portions; in other embodiments, only volatile memory may be used. In various embodiments, the volatile portion of system memory 2520 may be implemented using any suitable memory technology, such as static random-access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random-access memory (ReRAM), three-dimensional NAND technologies, Ferroelectric RAM, magneto resistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 2520 as code 2525 and data 2526.

In some embodiments, I/O interface 2530 may be configured to coordinate I/O traffic between processor 2510, system memory 2520, and any peripheral devices in the device, including network interface 2540 or other peripheral interfaces such as various types of persistent and/or volatile storage devices. In some embodiments, I/O interface 2530 may perform any necessary protocol, timing or other data transformations to convert data signals from one component (e.g., system memory 2520) into a format suitable for use by another component (e.g., processor 2510). In some embodiments, I/O interface 2530 may include support for devices attached through various types of peripheral buses, such as a variant of the Peripheral Component Interconnect (PCI) bus standard or the Universal Serial Bus (USB) standard, for example. In some embodiments, the function of I/O interface 2530 may be split into two or more separate components, such as a north bridge and a south bridge, for example. Also, in some embodiments some or all of the functionality of I/O interface 2530, such as an interface to system memory 2520, may be incorporated directly into processor 2510.

Network interface 2540 may be configured to allow data to be exchanged between computing device 2500 and other devices 2560 attached to a network or networks 2550, such as other computer systems or devices. In various embodiments, network interface 2540 may support communication via any suitable wired or wireless general data networks, such as types of Ethernet network, for example. Additionally, network interface 2540 may support communication via telecommunications/telephony networks such as analog voice networks or digital fiber communications networks, via storage area networks such as Fibre Channel SANs, or via any other suitable type of network and/or protocol.

In some embodiments, system memory 2520 may represent one embodiment of a computer-accessible medium configured to store at least a subset of program instructions and data used for implementing the methods and apparatus discussed in the context of FIG. 1 through FIG. 24. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 2500 via I/O interface 2530. A non-transitory computer-accessible storage medium may also include any volatile or non-volatile media such as RAM (e.g., SDRAM, DDR SDRAM, RDRAM, SRAM, etc.), ROM, etc., that may be included in some embodiments of computing device 2500 as system memory 2520 or another type of memory. In some embodiments, a plurality of non-transitory computer-readable storage media may collectively store program instructions that when executed on or across one or more processors implement at least a subset of the methods and techniques described above. A computer-accessible medium may further include transmission media or signals such as electrical, electromagnetic, or digital signals, conveyed via a communication medium such as a network and/or a wireless link, such as may be implemented via network interface 2540. Portions or all of multiple computing devices such as that illustrated in FIG. 25 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures above and described herein represent exemplary embodiments of methods. The methods may be implemented in software, hardware, or a combination thereof. The order of method may be changed, and various elements may be added, reordered, combined, omitted, modified, etc.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
one or more quantum hardware devices configured to implement a quantum computer that uses topological quantum codes, wherein the quantum computer comprises:
a processing core configured to execute a quantum algorithm; and
a magic state factory comprising distillation tiles, implemented via rectangular patches of the topological quantum codes, wherein the magic state factory is configured to generate distilled magic states in respective distillation tiles to be used during execution of the quantum algorithm; and
one or more computing devices configured to cause the one or more quantum hardware devices to generate the distilled magic states for execution of the quantum algorithm, wherein, to generate the distilled magic states, the one or more computing devices are further configured to:
determine a layout for the distillation tiles such that a first boundary of respective rectangular patch boundaries is accessible, via a routing space, by the processing core, wherein the first boundary is a shorter boundary of the respective rectangular patch boundaries; and
determine a round robin scheduling to generate the distilled magic states such that a first moment in time at which a given one of the distillation tiles has generated one or more distilled magic states of the distilled magic states is offset from a second moment in time at which at least one other one of the distillation tiles has generated one or more other distilled magic states of the distilled magic states.

2. The system of claim 1, wherein, to generate the distilled magic states, the one or more computing devices are further configured to cause the one or more quantum hardware devices to perform a temporally encoded lattice surgery based (TELS-based) magic state distillation protocol using the distillation tiles.

3. The system of claim 2, wherein the determination of the layout for the distillation tiles is based, at least in part, on one or more classical error-correcting codes to be used for the TELS-based magic state distillation protocol.

4. The system of claim 1, wherein respective distillation tiles of the magic state factory comprising distillation tiles, implemented via the rectangular patches of the topological quantum codes, comprise:
one or more rectangular patches, of the rectangular patches, configured to implement respective magic states used for the TELS-based magic state distillation protocol;
one or more additional rectangular patches, of the rectangular patches, configured to implement respective magic states used to perform, at least in part, π/8 rotations for the TELS-based magic state distillation protocol; and
one or more other rectangular patches, of the rectangular patches, configured to implement respective distilled magic state storage cells.

5. The system of claim 1, wherein:
respective distillation tiles of the magic state factory comprising distillation tiles, implemented via the rectangular patches of the topological quantum codes, comprise twist defects; and
to generate the distilled magic states, the one or more computing devices are further configured to further cause the one or more quantum hardware devices to perform a twist-based TELS-based magic state distillation protocol using the distillation tiles.

6. The system of claim 1, wherein:
the determination of the layout for the distillation tiles is such that a second boundary of the respective rectangular patch boundaries is also accessible, via the routing space or an additional routing space, by the processing core of the quantum computer; and the second boundary is a same logical boundary as the first boundary of the respective rectangular patch boundaries.

7. The system of claim 1, wherein:
the quantum algorithm is represented as a parallelizable Pauli set using Pauli-based computation; and
the one or more computing devices are further configured to determine a number of distillation tiles to be implemented in the magic state factory, wherein the determination of the number of distillation tiles is based, at least in part, on a size of the parallelizable Pauli set.

8. The system of claim 7, wherein:
to determine the round robin scheduling, the one or more computing devices are further configured to determine an amount of time used to generate a given one or more distilled magic states using the determined layout for the distillation tiles; and
the one or more computing devices are further configured to determine the number of distillation tiles to be implemented in the magic state factory additionally based, at least in part, on a relationship between the amount of time used to generate the given one or more distilled magic states and an additional time used during the execution of the quantum algorithm.

9. The system of claim 1, wherein the one or more computing devices are further configured to determine the round robin scheduling based, at least in part, on a time to generate a given one or more distilled magic states using the determined layout for the distillation tiles.

10. A method, comprising:
executing a quantum algorithm on a quantum computer that uses topological quantum codes, wherein executing the quantum algorithm comprises:
determining a round robin scheduling to be used in generating distilled magic states, using distillation tiles implemented in a magic state factory of the quantum computer, for the executing the quantum algorithm, wherein a first moment in time at which a given one of the distillation tiles has generated one or more distilled magic states of the distilled magic states is offset from a second moment in time at which at least one other one of the distillation tiles has generated one or more other distilled magic states of the distilled magic states; and
generating the distilled magic states, using the distillation tiles, for the executing the quantum algorithm, wherein the generating is based, at least in part, on the determined round robin scheduling.

11. The method of claim 10, wherein the generating the distilled magic states, using the distillation tiles, comprises performing a temporally encoded lattice surgery based (TELS-based) magic state distillation protocol using the distillation tiles.

12. The method of claim 10, wherein the determining a round robin scheduling comprises:
determining an amount of time used to generate a given one or more distilled magic states using the distillation tiles; and
determining a number of distillation tiles to be implemented in the magic state factory based, at least in part, on a relationship between the amount of time used to generate the given one or more distilled magic states and an additional time used during the execution of the quantum algorithm.

13. The method of claim 10, further comprising:
determining a size of a parallelizable Pauli set that represents the quantum algorithm using Pauli-based computation; and
determining a number of distillation tiles to be implemented in the magic state factory based, at least in part, on the size of the parallelizable Pauli set, and
wherein the determining the round robin scheduling to be used in the generating the distilled magic states is based, at least in part, on the determined size of the parallelizable Pauli set and on the determined number of distillation tiles to be implemented in the magic state factory.

14. The method of claim 10, wherein the executing the quantum algorithm on the quantum computer that uses topological quantum codes further comprises determining a layout for the distillation tiles implemented in the magic state factory of the quantum computer, wherein:
the distillation tiles are implemented via patches of the topological quantum codes; and
a first boundary of respective patch boundaries within the distillation tiles is accessible, via a routing space, by a processing core of the quantum computer.

15. The method of claim 14, wherein the determining the layout for the distillation tiles is based, at least in part, on a type of classical error-correcting code to be used for the executing the quantum algorithm.

16. A non-transitory, computer-readable, medium storing program instructions that, when executed on or across one or more processors, cause the one or more processors to:
cause a quantum algorithm to be executed on a quantum computer that uses topological quantum codes, wherein to execute the quantum algorithm on the quantum computer, the program instructions further cause the one or more processors to:
determine a round robin scheduling to be used in generating distilled magic states, using distillation tiles implemented in a magic state factory of the quantum computer, for the execution of the quantum algorithm, wherein a first moment in time at which a given one of the distillation tiles has generated one or more distilled magic states of the distilled magic states is offset from a second moment in time at which at least one other one of the distillation tiles has generated one or more other distilled magic states of the distilled magic states; and
generate the distilled magic states, using the distillation tiles, for the execution of the quantum algorithm, wherein the generation is based, at least in part, on the determined layout for the distillation tiles and the determined round robin scheduling.

17. The non-transitory, computer-readable medium of claim 16, wherein to generate the distilled magic states, using the distillation tiles, the program instructions further cause the one or more processors to perform a temporally encoded lattice surgery based (TELS-based) magic state distillation protocol.

18. The non-transitory, computer-readable medium of claim 16, wherein to generate the distilled magic states, using the distillation tiles, the program instructions further cause the one or more processors to determine a layout for distillation tiles implemented in a magic state factory of the quantum computer, wherein:
the distillation tiles are implemented via patches of the topological quantum codes; and a first boundary of respective patch boundaries within the distillation tiles is accessible, via a routing space, by a processing core of the quantum computer.

19. The non-transitory, computer-readable medium of claim 18, wherein:
a second boundary of the respective patch boundaries is also accessible, via the routing space or an additional routing space, by the processing core of the quantum computer, wherein the second boundary is a same logical boundary as the first boundary; and
to generate the distilled magic states, using the distillation tiles, the program instructions further cause the one or more processors to perform a parallelized TELS-based magic state distillation protocol.

20. The non-transitory, computer-readable medium of claim 16, wherein to generate the distilled magic states, using the distillation tiles, for the execution of the quantum algorithm, the program instructions further cause the one or more processors to:
apply the determined round robin scheduling, wherein the determined round robin scheduling is such that an amount of time to generate a given one or more distilled magic states is less than or equal to a total amount of time for the execution of the quantum algorithm.

* * * * *